US008849975B2

(12) United States Patent
Brayman

(10) Patent No.: US 8,849,975 B2
(45) Date of Patent: Sep. 30, 2014

(54) METHOD AND SYSTEM FOR TEST-DURATION ESTIMATION

(75) Inventor: Vladimir Brayman, Mercer Island, WA (US)

(73) Assignee: Webtrends Inc., Portland, OR (US)

( * ) Notice: Subject to any disclaimer, the term of this patent is extended or adjusted under 35 U.S.C. 154(b) by 888 days.

(21) Appl. No.: 13/019,997

(22) Filed: Feb. 2, 2011

(65) Prior Publication Data

US 2011/0224946 A1 Sep. 15, 2011

Related U.S. Application Data

(60) Provisional application No. 61/300,716, filed on Feb. 2, 2010.

(51) Int. Cl.

| | |
|---|---|
| ***G06F 15/173*** | (2006.01) |
| ***G06F 15/16*** | (2006.01) |
| ***G06F 11/34*** | (2006.01) |

(52) U.S. Cl.

CPC ........ *G06F 11/3419* (2013.01); *G06F 11/3452* (2013.01); *G06F 2201/86* (2013.01); *G06F 2201/875* (2013.01)

USPC ........... 709/223; 709/222; 709/224; 709/228; 709/229; 709/233

(58) Field of Classification Search

USPC .......................................................... 709/223

See application file for complete search history.

(56) References Cited

U.S. PATENT DOCUMENTS

| | | | | |
|---|---|---|---|---|
| 5,870,769 | A * | 2/1999 | Freund | 715/205 |
| 5,872,976 | A * | 2/1999 | Yee et al. | 717/127 |
| 5,991,705 | A * | 11/1999 | Klein et al. | 702/176 |
| 6,006,260 | A * | 12/1999 | Barrick et al. | 709/224 |
| 6,272,539 | B1 * | 8/2001 | Cuomo et al. | 709/223 |
| 6,563,517 | B1 * | 5/2003 | Bhagwat et al. | 715/735 |
| 6,587,878 | B1 * | 7/2003 | Merriam | 709/224 |
| 6,697,969 | B1 * | 2/2004 | Merriam | 714/46 |
| 7,216,168 | B2 * | 5/2007 | Merriam | 709/224 |
| 7,330,887 | B1 * | 2/2008 | Dharmadhikari | 709/224 |
| 2004/0103193 | A1 * | 5/2004 | Pandya et al. | 709/224 |
| 2004/0153792 | A1 * | 8/2004 | Merriam | 714/26 |
| 2011/0225265 | A1 * | 9/2011 | Dixon et al. | 709/217 |

FOREIGN PATENT DOCUMENTS

WO 2007-090460 A1 8/2007

* cited by examiner

*Primary Examiner* — Tauqir Hussain

(74) *Attorney, Agent, or Firm* — Olympic Patent Works PLLC

(57) ABSTRACT

Certain embodiments of the present invention are directed to test-duration estimation. A time needed to run an automated web-page test, or the remaining time needed to complete the automated web-page test, is estimated by estimating a sample size needed to ensure that observed differences in conversion rates are attributable, with a specified statistical significance, to selecting particular factor levels for particular factors that are varied during the automated testing. The estimated sample size is then divided by an average web-page access rate to obtain the remaining testing time to achieve a specified significance level.

19 Claims, 38 Drawing Sheets

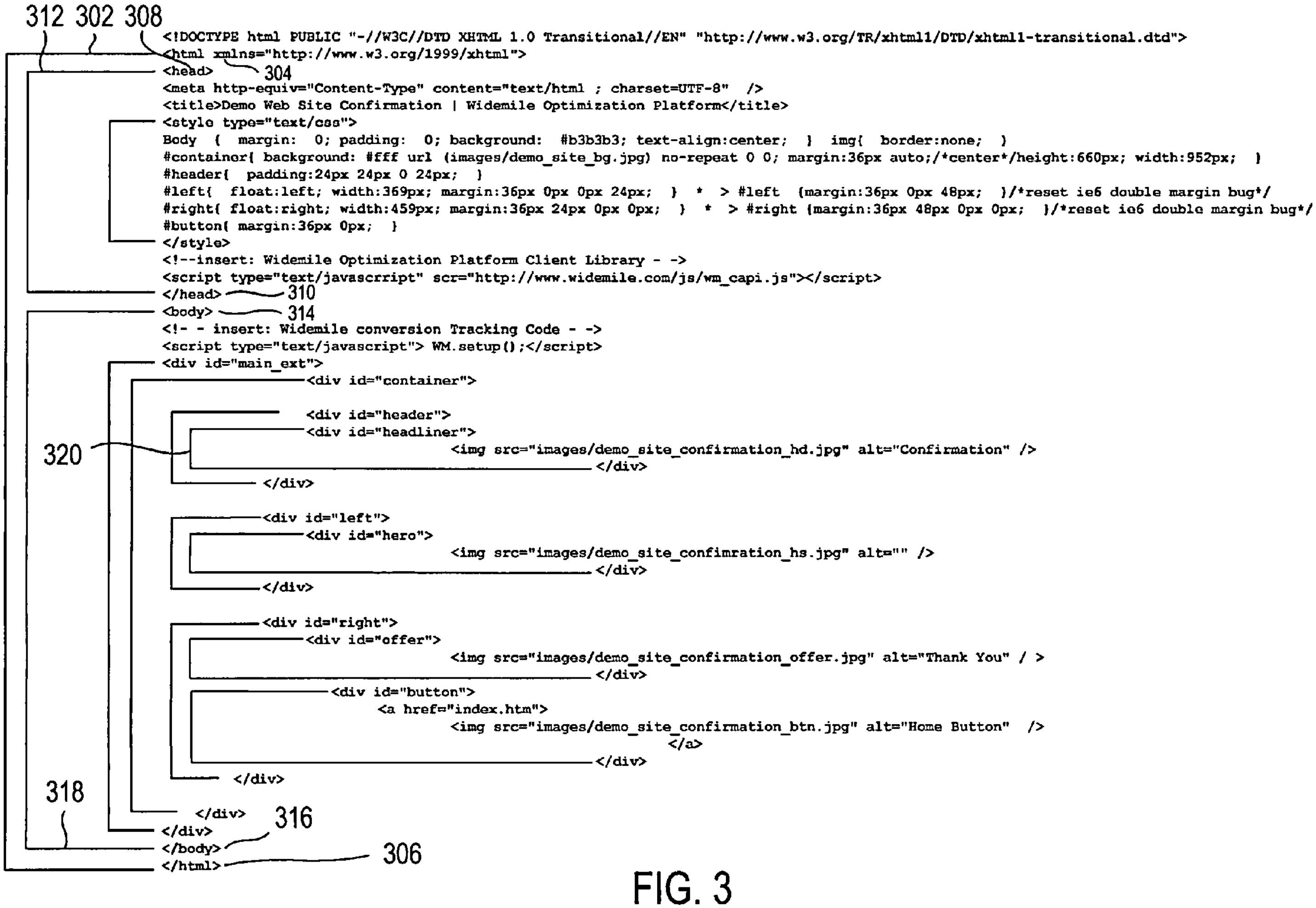

```
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site Confirmation | Widemile Optimization Platform</title>
<style type="text/css">
Body { margin: 0; padding: 0; background: #b3b3b3; text-align:center; } img{ border:none; }
#container{ background: #fff url (images/demo_site_bg.jpg) no-repeat 0 0; margin:36px auto;/*center*/height:660px; width:952px; }
#header{ padding:24px 24px 0 24px; }
#left{ float:left; width:369px; margin:36px 0px 0px 24px; } * > #left {margin:36px 0px 48px; }/*reset ie6 double margin bug*/
#right{ float:right; width:459px; margin:36px 24px 0px 0px; } * > #right {margin:36px 48px 0px 0px; }/*reset ie6 double margin bug*/
#button{ margin:36px 0px; }
</style>
<!--insert: Widemile Optimization Platform Client Library - ->
<script type="text/javascrript" scr="http://www.widemile.com/js/wm_capi.js"></script>
</head>
<body>
<!- - insert: Widemile conversion Tracking Code - ->
<script type="text/javascript"> WM.setup();</script>
<div id="main_ext">
            <div id="container">

            <div id="header">
            <div id="headliner">
                        <img src="images/demo_site_confirmation_hd.jpg" alt="Confirmation" />
                                  </div>
      </div>

      <div id="left">
            <div id="hero">
                        <img src="images/demo_site_confimration_hs.jpg" alt="" />
                                  </div>
      </div>

      <div id="right">
            <div id="offer">
                        <img src="images/demo_site_confirmation_offer.jpg" alt="Thank You" / >
                                  </div>
              <div id="button">
                   <a href="index.htm">
                        <img src="images/demo_site_confirmation_btn.jpg" alt="Home Button" />
                                       </a>
                                  </div>
    </div>

  </div>
</div>
</body>
</html>
```

| | factor 1 | factor 2 | factor 3 | factor 4 |
|---|---|---|---|---|
| level 1 | I DO LEGAL STUFF FOR YOU, REALLY | BOB'S LEGAL SERVICES |  | BILL ME NOW |
| level 2 | I'M YOUR PIT BULL, BABY | HONEST BOB'S LEGAL SERVICES |  | BILL ME HONESTLY NOW |
| level 3 | HEY, POINT ME AND I'LL BITE | CHECKS-IN-THE-MAIL LEGAL SERVICES |  | TAKE MY DOUGH |
| level 4 | I'M YOUR GREAT WHITE SHARK | PREDATOR FOR HIRE |  | BILL ME NOW AND FOREVER |
| level 5 | CONTRACTS, LICENSES, NON-ADVERSARIAL LITIGATION | |  | BILL ME SHAMELESSLY |
| level 6 | I DO ANYTHING FOR MONEY | | | |

FIG. 7

```
<!DOCTYPE html PUBLIC "-//W3C//DTD XHTML 1.0 transitional//EN" "http://www.w3.org/TR/xhtml1/DTD/xhtml1-transitional.dtd">
<html xmlns="http://www.w3.org/1999/xhtml">
<head>
<meta http-equiv="Content-Type" content="text/html ; charset=UTF-8" />
<title>Demo Web Site: Landing Page walkthrough | Widemile Optimization Platform</title>
<style type="text/css">
body { margin: 0; padding: 0; background: #b3b3b3; text-align:center; } img{ border:none; }
#container{ background: #fff url(images/demo_site_bg.jpg) no-repeat 0 0; margin:36px auto;/*center*/ height:660px; width:952px; }
#header{ padding:24px 24px 0 24px; }
#left{ float:left; width:369px; margin:36px 0px 24px; } * > #left { margin:36px 0px 0px 48px; }/*reset ie6 double margin bug*/
#right{ float:right; width:459px; margin:36px 24px 0px 0px; } * > #right { margin:36px 48px 0px 0px; }/*reset ie6 double margin bug*/
#wm_offer{ margin:36px 0px; }
</style>
<!-- insert: Widemile Optimization Platform Client Library - ->
<script type=:"text/javascript" src="http://www.widemile.com/js/wm_capi.js"></script>
</head>                                                                  — 1402
<body>
<!-- insert: Widemile PageView Tracking Code - ->
<script type="text/javascript">WM.setup();</script>
<div id="main_ext">                                                      — 1404
            <div id="container">

            <div id="header">
            <div id="wm_headline">
                        <img src="images/demo_site_hd_green.jpg" alt="Green Headline 1" />
                  </div>
      </div>

      <div id="left">
            <div id="wm_hero">
                        <img src="images/demo_site_hs_green.jpg" alt="Green Hero 1" />
                  </div>
      </div>

      <div id="right">
            <div id="wm_offer">
                        <img src="images/demo_site_offer_green.jpg" alt="Green Offer 1" />
                  </div>

                              <a href="conversion.htm"><div id="wm_button">
                                    <span id="wm_INSERT_BUTTON">
                                                <img src="images/demo_site_btn_green.jpg" alt="Green Button 1" />
                                    </span>
                              </div></a>
      </div>
    <div>
>/div>
</body>
</html>
```

FIG. 14 simplecapi.js

```
//modify the page based on the experiment data
var g_data=null;
var g_moniker=mull;
var g_uid=null;
function loadExperiment() {
            getExperimentDataFromServer();
            var replacements = g_data;
            //render the new elements that where loaded from the server
            for ( var i = 0; i < replacements.length; i++) {

      document.getElementById(replacements[i].divID).innerHTML=replacements[i].content;
            }
}

//this simulates the kind of data the widemile server would return.
//control.js contains contents of factors and levels to update on the page see below.
//control.js call setExperimentData(data)
//{divID:"hero",content:"<img src='pentagon.png'alt='pentagon'/>"},
//{divID:"info",content:"This is a green pentagon.Look how pretty it is."};

function getExperimentDataFromServer(){
   //create new script block and add to the browser DOM to load external server call
   var script=createElement("script",document.body);
   script.src="http://ots.server.com/js-control/"+g_moniker+"/"+g_uid+"/control.js";
}

//data[{divID:"hero",content;"<img src='pentagon.png'alt='pentagon'/>"},
//     {divID:"info",content:"This is a green pentagon. Look how pretty it is."}];
function setExperimentData(data){
   g_data=data;
}

function createVisitorID() {
   var value=null;
   if (document.cookie["uid]==null) {
      value=newDate().time+"-"+rand(10);
      document.cookie["uid"]=newCookie(value);
   } else {
      value=document cookie["uid"]
   }
    return value;
}

function setup(moniker) {
   g_moniker=moniker,
   g_uid=createVisitorID();
   loadExperiment();
}
```

FIG. 15 factor 1

| | | factor 1 | | | |
|---|---|---|---|---|---|
| 1802 | 1 | 0 | 0 | 0 | 0 |
| | 2 | 0 | 1 | 1 | 2 |
| | 3 | 0 | 2 | 2 | 1 |
| 1803 | 4 | 1 | 0 | 1 | 1 |
| | 5 | 1 | 1 | 2 | 0 |
| | 6 | 1 | 2 | 0 | 2 |
| 1804 | 7 | 2 | 0 | 2 | 2 |
| | 8 | 2 | 1 | 0 | 1 |
| | 9 | 2 | 2 | 1 | 0 |

for each of factors 2-4, each possible level $\in s$ occurs once in the three experiments 1-3 with factor 1 = 0

1702

1806 $\bar{F}_{1=0} = \sum_{i=1}^{3} result_i / 3$

1807 $\bar{F}_{1=1} = \sum_{i=4}^{6} result_i / 3$

1808 $\bar{F}_{1=2} = \sum_{i=7}^{9} result_i / 3$

| | $F_1$ | $F_2$ | $F_3$ | $F_4$ | $F_5$ | $F_6$ | $F_7$ | $F_8$ | $F_9$ | $F_{10}$ | $F_{11}$ | $F_{12}$ | $F_{13}$ | $F_{14}$ | $F_M$ |
|---|---|---|---|---|---|---|---|---|---|---|---|---|---|---|---|
| $Y_1$ | 0 | 0 | 0 | 0 | 0 | 0 | 0 | 0 | 0 | 0 | 0 | 0 | 0 | 0 | 0 |
| $Y_2$ | 1 | 0 | 1 | 1 | 2 | 3 | 1 | 3 | 1 | 0 | 0 | 0 | 1 | 3 | 0 |
| $Y_3$ | 2 | 0 | 2 | 0 | 3 | 2 | 1 | 2 | 0 | 0 | 1 | 0 | 2 | 1 | 1 |
| $Y_4$ | 0 | 0 | 3 | 1 | 1 | 0 | 0 | 1 | 2 | 0 | 1 | 1 | 3 | 2 | 1 |
| $Y_5$ | 1 | 1 | 0 | 0 | 4 | 1 | 1 | 0 | 1 | 0 | 0 | 1 | 4 | 0 | 2 |
| $Y_6$ | 2 | 1 | 1 | 1 | 0 | 2 | 1 | 3 | 1 | 1 | 0 | 1 | 5 | 1 | 2 |
| $Y_7$ | 0 | 1 | 2 | 0 | 2 | 0 | 0 | 2 | 1 | 1 | 1 | 2 | 6 | 2 | 3 |
| $Y_8$ | 1 | 1 | 3 | 1 | 3 | 3 | 1 | 1 | 2 | 1 | 1 | 2 | 7 | 3 | 3 |
| $Y_9$ | 2 | 0 | 0 | 0 | 1 | 1 | 1 | 0 | 2 | 1 | 0 | 2 | 8 | 0 | 4 |
| $Y_{10}$ | 0 | 0 | 1 | 1 | 4 | 0 | 0 | 3 | 0 | 1 | 0 | 0 | 0 | 2 | 4 |
| $Y_{11}$ | 1 | 0 | 2 | 0 | 0 | 2 | 1 | 2 | 2 | 0 | 1 | 0 | 1 | 3 | 0 |
| $Y_N$ | 2 | 1 | 1 | 1 | 3 | 3 | 0 | 0 | 1 | 0 | 1 | 2 | 8 | 3 | 4 |

METHOD AND SYSTEM FOR TEST-DURATION ESTIMATION

CROSS-REFERENCE TO RELATED APPLICATION

This application claims the benefit of Provisional Application No. 61/300,716, filed Feb. 2, 2010.

TECHNICAL FIELD

The present invention is related to automated testing and analysis, in particular, to a method and system for estimating the time needed for carrying out or for completing a test.

BACKGROUND

Methods have been developed for automated testing of web pages, web sites, and other types of information displayed to user on display devices of computer systems and other electronic devices and systems. In many cases, a test administrator my wish to know how long the test will take to run in order to achieve a specified significance level. A test-duration estimation may assist the test administrator or automated-testing-system user to choose a test design that best satisfies business requirements and that best manages the resources necessary to complete the test. Usually the test duration estimate is based on user-supplied information regarding a control-conversion rate. As an automated test is executed and more data is received, it could be inferred that a test duration estimate could be made with greater accuracy to facilitate decisions regarding when to terminate the test. Stopping a test run too early may result in a subsequent analysis of test data giving incorrect results. On the other hand, running a test longer than necessary for a pre-specified significance level unnecessarily consumes resources and delays implementation of improvements indicated by results of the test.

BRIEF DESCRIPTION OF THE DRAWINGS

FIG. 3 shows the contents of an HTML file that encodes the exemplary web page shown in FIG. 2 and that includes simple modifications to facilitate automated testing.

FIGS. 6-7 illustrate factors, factor levels, and test design.

FIG. 14 shows the HTML modifications used to virtually incorporate a testing service.

FIG. 15 provides an exemplary script library downloaded service.

FIG. 19 illustrates a number of orthogonal arrays.

FIG. 23 shows an example of an automated-test plan or design.

DETAILED DESCRIPTION

Certain embodiments of the present invention are directed to test-duration estimation. The present invention is described, below, in two main sections: (1) a first section that provides a background for automated testing systems in which embodiments of the present invention are incorporated; and (2) a second section that discusses embodiments of the present invention. The first section can be skipped by readers familiar with automated web-site testing and orthogonal-array-based experiment design.

Automated Testing

Figure 1:
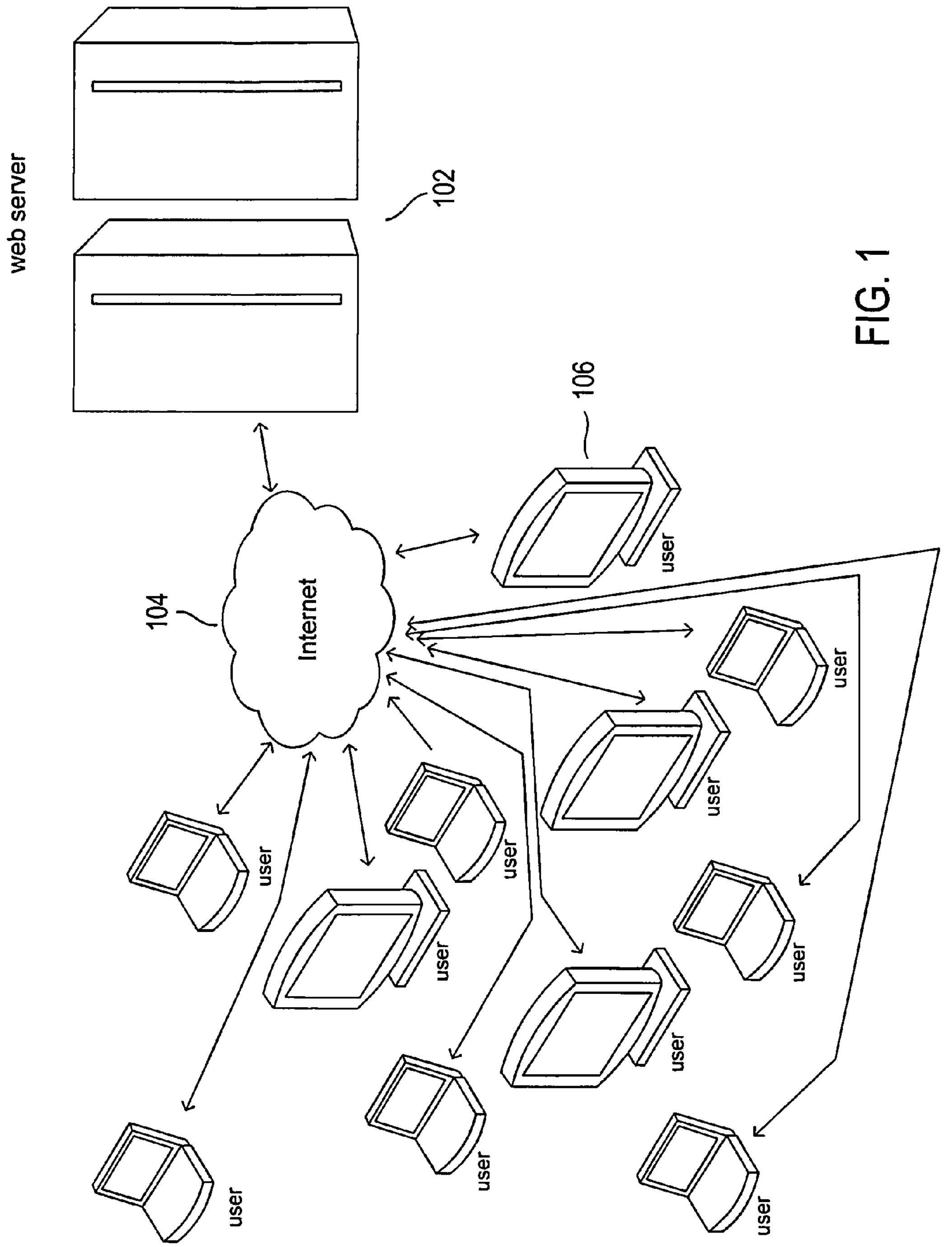
FIG. 1 provides a context for discussion of automated testing.

There are many different types of web sites and web-site servers that can be tested. In the following discussion, a generalized web site is tested by a described automated testing system that can incorporate an embodiment of the present invention. FIG. 1 provides a context for discussion of automated testing. In FIG. 1, a server 102, comprising one or more servers and/or other types of computer systems, transmits HTML-encoded web pages through the Internet 104 to a large number of user or customer computers, including as user computer 106. As discussed above, the web server may be owned and operated by an Internet retailing organization, an information-distribution system, a social-networking system, or another type Internet-based transactional or content-distribution system. In general, the web server runs continuously, at all times during the day and night, providing HTML-encoded web pages and, usually, additional types of information and services, including downloads of executable code, scripts, and other such information for specific types of web-based applications.

Figure 2:
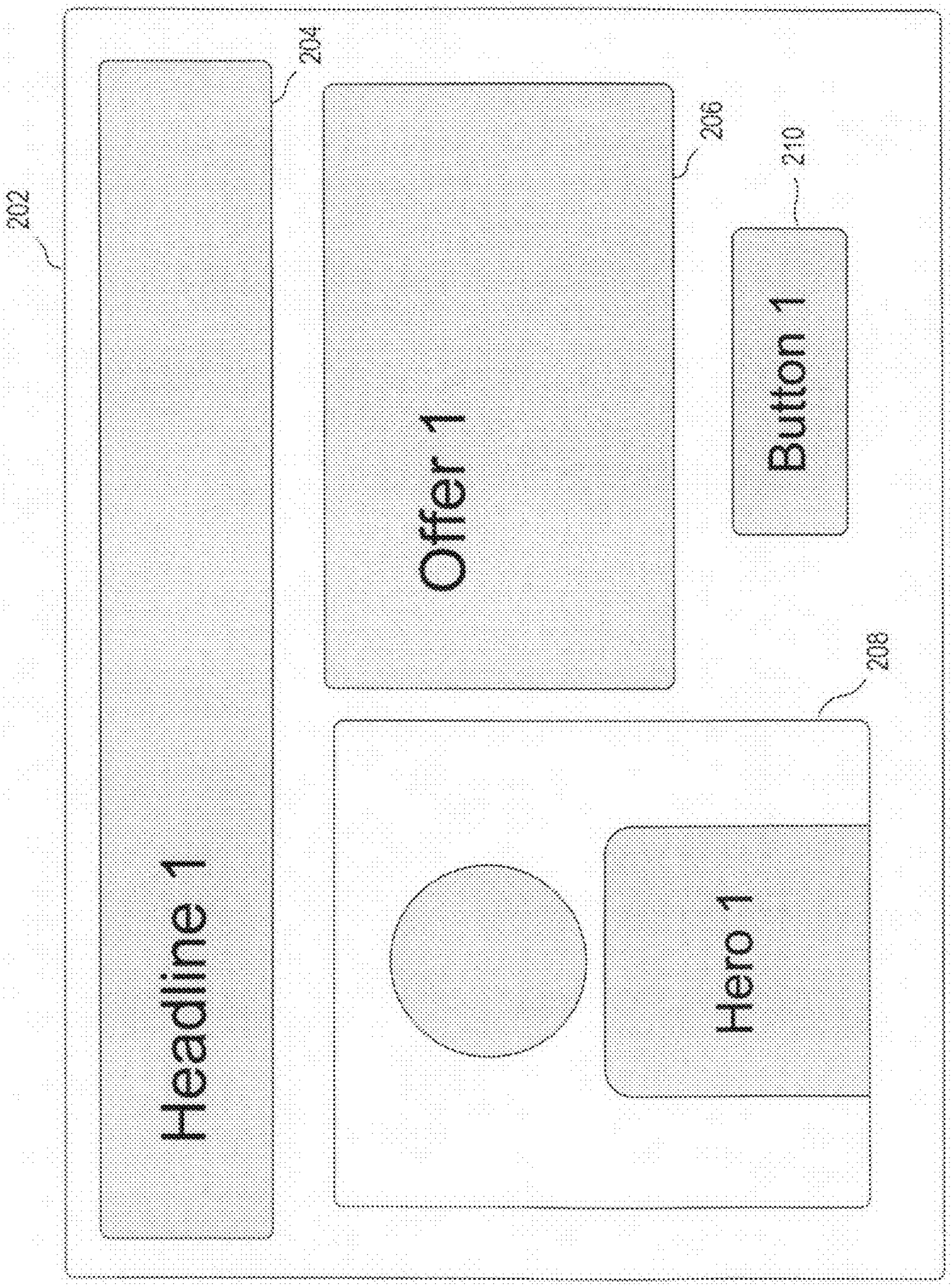
FIG. 2 shows a simple, exemplary web page.

FIG. 2 shows a simple, exemplary web page. A web page is described by an HTML file, discussed below, which is processed by a web browser executing on a computer in order to generate a web page, as shown in FIG. 2, that is displayed to a user on a display device. The exemplary web page 202 includes a headline graphic 204, an offer graphic 206, a hero graphic 208, and a button graphic 210. The exemplary web page is subsequently discussed in the context of tests and experiments in which altered versions of the web page are provided to users of the web server that serves the web page in order to test the effects of modifications to the web page.

FIG. 3 shows the contents of an HTML file that encodes the exemplary web page shown in FIG. 2 and that includes simple modifications to facilitate automated testing. Modifications, used to virtually incorporate a testing service into a website are discussed below, with reference to FIG. 14.

A complete discussion of HTML is beyond the scope of the current discussion. In FIG. 3, portions of the HTML file are correlated with features in the displayed web page shown in FIG. 2. In addition, general features of HTML are illustrated in FIG. 3. HTML is hierarchical, in nature. In FIG. 3, double-headed arrows, such as double-headed arrow 302, have been drawn to the left of the HTML code in order to illustrate tags and tag scoping within the HTML file. In general, HTML statements are delimited by a pair tags, and are hierarchically organized by scope. For example, an outermost statement begins with a first tag of a tag pair that begins with the text "<html xmlns=" (304 in FIG. 3) and ends with a last tag of the tag pair that begins with the text "</HTML" (306 in FIG. 3). The scope of outermost statement encompasses the entire HTML code. The double-headed arrow 302 at the left of the HTML code, which represents the scope of this statement, spans the entire HTML file. A second-level that begins with the first tag of a tag pair "<head>" 308 and ends with the last tag of the tag pair "</head>" 310 spans a first portion of the HTML file, as indicated by double-headed arrow 312, and a second statement bounded by the first and last tags of a tag pair "<body>" 314 and "</body>" 316 span a second portion of the HTML file, indicated by double-headed arrow 318. By examining the tags within the exemplary HTML file, shown in FIG. 3, and the double-headed indications of the scope of tag-delimited statements, the hierarchical nature of HTML can be readily appreciated.

Figure 4:
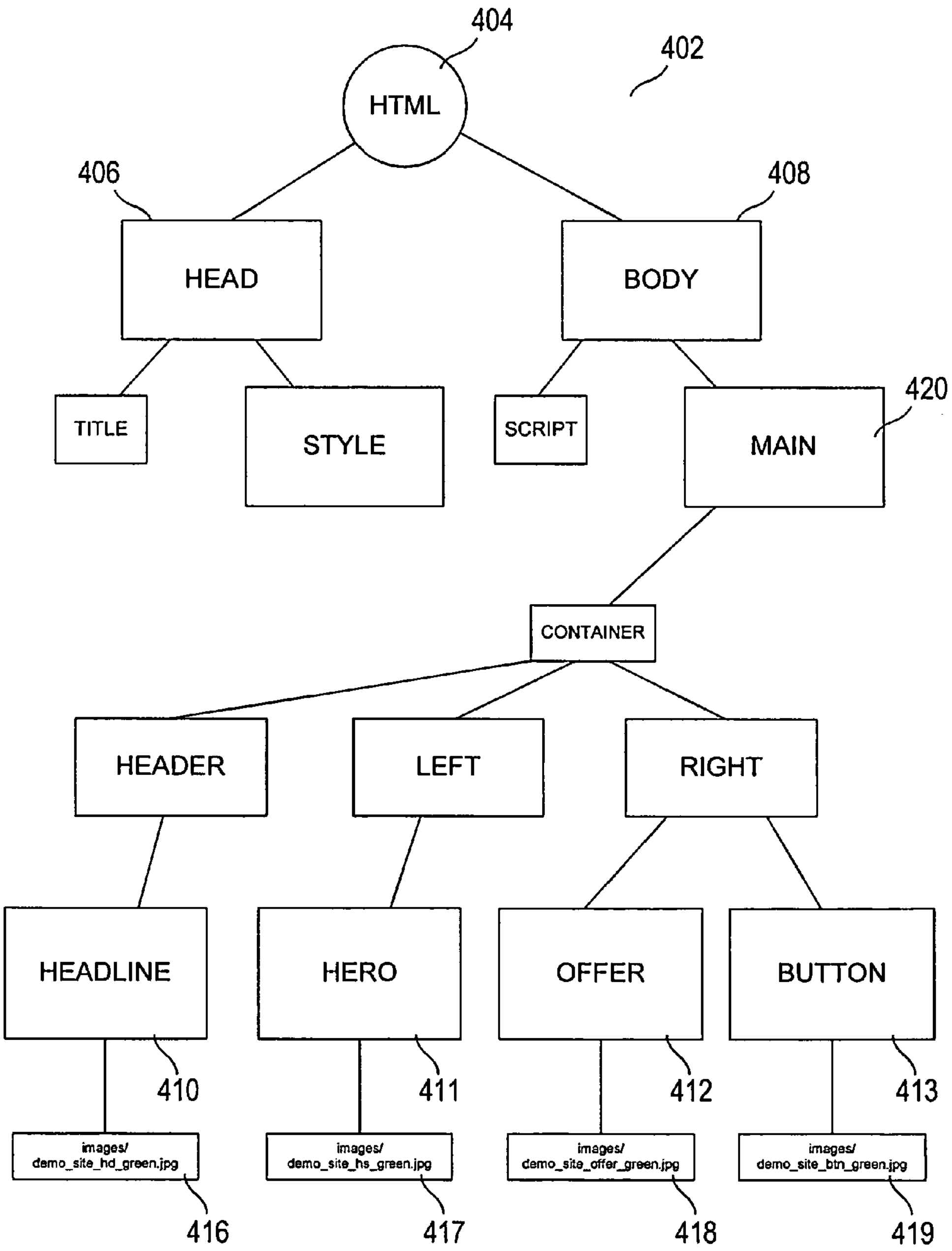
FIG. 4 provides a tree-like representation of the contents of the exemplary HTML file shown in FIG. 3.

FIG. 4 provides a tree-like representation of the contents of the exemplary HTML file shown in FIG. 3. The tree 402 shown in FIG. 4 is constructed from the double-headed arrows that annotate the HTML code, in FIG. 3, that span the scopes tag-delimited statements in the exemplary HTML file. For example, the root node 404 corresponds to double-headed arrow 302, and the second level "head" 406 and "body" 408 nodes correspond to double-headed arrows 312 and 318 in FIG. 3, respectively. Note that, at the very bottom of the tree representation of the HTML file, shown in FIG. 4, the four leaf nodes 416-419 represent the four features 204, 206, 208, and 210 of the displayed web page encoded by the exemplary HTML file, shown in FIG. 2. Each of these nodes is essentially a reference to an image file that contains a jpeg image of the corresponding web-page feature. The head statement, represented by node 406 in FIG. 4, includes formatting information, references to highest-level resource-location directories, and a great deal of additional information that is used by a browser to plan construction of a displayed web page. The body statement, represented by node 408 in FIG. 4, includes references to image files, text, and other features that are rendered by the browser into displayed features of the web page. Intermediate nodes include identifiers, particular metdata information, and references to scripts that are downloaded and run by the web browser during web-page rendering and/or display.

As a specific example, node 416, a direct and only descendant of the node labeled "headline" 410 in FIG. 4, corresponds to the headline feature 204 displayed in the exemplary web page shown in FIG. 2. This node also corresponds to double-headed arrow 320 in FIG. 3. The statement "<img src="images/demo_site_hd_green.jpg" indicates that the displayed object is encoded as a jpeg image "demo_site_offer_green.jpg" that can be found in a file-system sub-directory "images."

In order to transform an HTML file into a displayed web page, a web browser constructs a tree-like binary-encoded data object referred to as a "document object model" ("DOM"). Once a browser has created a DOM from the exemplary HTML file shown in FIG. 3, DOM-editing routines can be used to locate the node in the DOM corresponding to the node "headline" 410 in FIG. 4 and replace or modify that node to reference a different image. Following modification, the web browser would then display a modified web page in which the headline image 204 in FIG. 2 is replaced by a different image. To effect more dramatic changes, an entire subtree of a DOM, such as the subtree rooted by a node corresponding to the node "right" 420, can be removed or replaced, to change groups of display features.

Another feature of the exemplary HTML file shown in FIG. 3 is that the various features displayed in FIG. 2 are, in HTML, wrapped by tag-delimited identifiers. For example, the "wm_headline" tag indicated by double-headed arrow 320 and by node 410 in FIG. 4 is an identifier for the headline-image-reference statement 322. Alphanumeric identifiers, such as the identifier "wm_headline," are introduced into an HTML file in order to give easy-to-understand and easy-to-use labels or handles for various objects, particularly objects that correspond to displayed features in a web page. Although objects can be easily identified in this manner, other methods for identifying objects within an HTML file, as well as corresponding nodes of DOM trees and other such binary representations of a rendered page, can be used to reference display objects.

Figure 5:
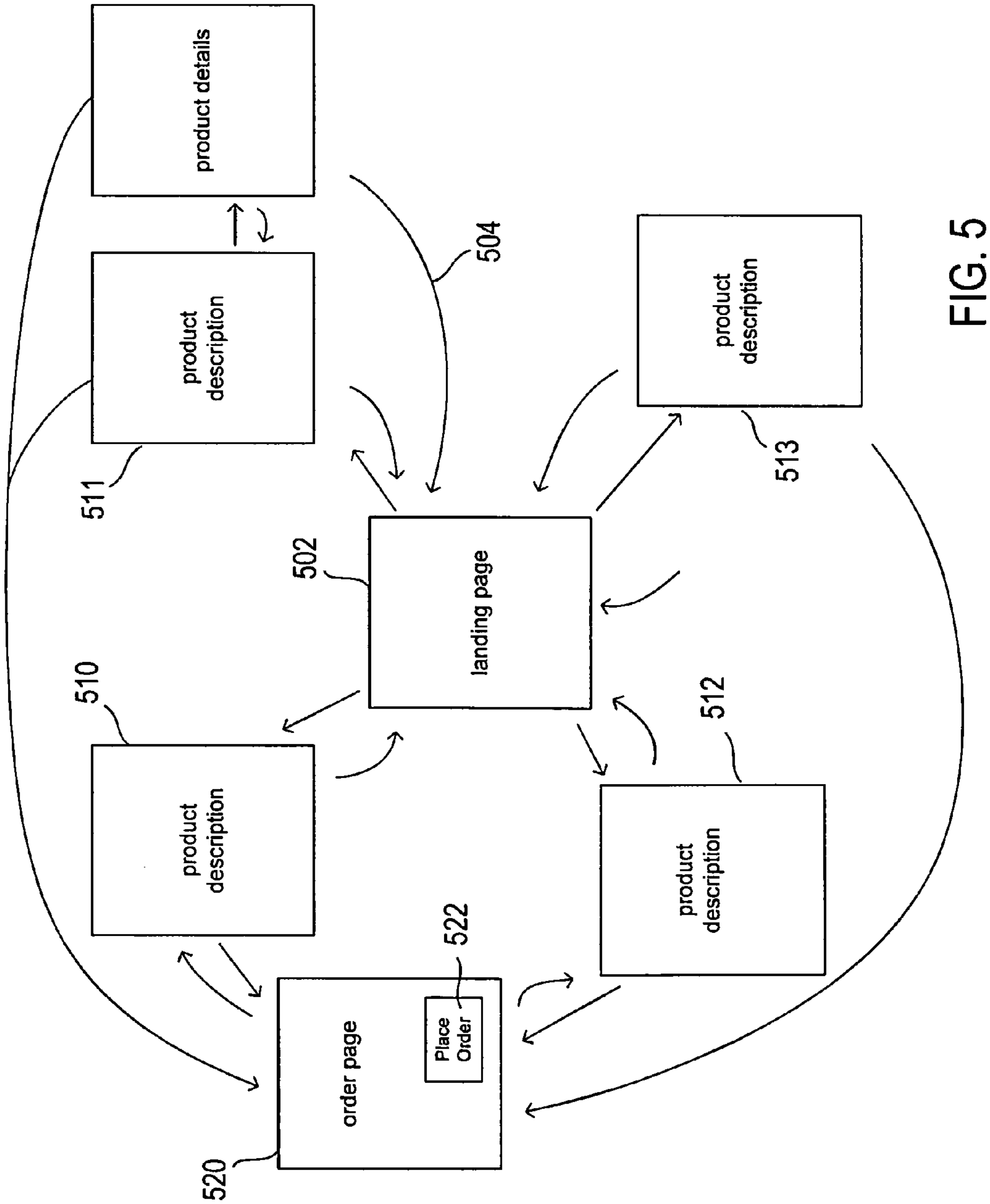
FIG. 5 illustrates a simple web site comprising seven web pages.

FIG. 5 illustrates a simple web site comprising seven web pages. Each web page, such as web page 502, is represented by a rectangle in FIG. 5. Curved arrows, such as curved arrow 504, indicate navigational paths between the web pages. Accessing the web site illustrated in FIG. 5, a user generally first accesses a landing page 502 as a result of clicking a link provided by another web page, such as a web page provided by a search engine, or provided in a list of bookmarked links by a web browser. The landing page is often, but not necessarily, a home page for the website. A home page is a central portal for access to all of the remaining web pages in the web site. In general, a user navigates through the web site by clicking on displayed links embedded in web pages. For example, the web site illustrated in FIG. 5 is a retailing web site. The landing page provides links to four different pages 510-513 that provide product descriptions for four different products. A user, after viewing the landing page 502, may click a link in order to navigate to a display of a product-description page 510. In the exemplary web site shown in FIG. 5, a user may subsequently navigate from a product-description page or product-details page to a central order page 520 that contains a button or feature 522 to which the user can input a mouse click in order to order one or more products. In certain cases, web sites may comprise a single page and, in other cases, a web site may comprise tens to hundreds or more pages, linked together in a network-like graph describing various navigational paths between web pages.

An example application of web-site testing would be to monitor access, by users, of the web pages shown in FIG. 5 in order to attempt to determine how often users end up navigating to the order page and clicking the place-order button 522. One might then modify one or more of the pages, and again monitor users' access to the pages and subsequent input to the place-order button 522. In this way, by testing collective user response various alternative web pages, web-site developers and managers may be able to determine an optimal set of web pages that provides the highest ratio of inputs to the place-order button 522 to user accesses of the landing page 502. In testing parlance, clicking the place-order button 522, in the exemplary web site shown in FIG. 5, is, in this example, considered to be a conversion event. One goal of optimizing the web site might be to increase the percentage of users clicking on the place-order button 522 after initially accessing the landing page 502. However, conversion events may be arbitrarily defined, and there may be multiple conversion events for a particular web site. Optimization of a web site may also involve multiple, often at-least partially contradictory goals. One goal may be to increase the number of accesses to any page other than the landing page by users who have initially accessed the landing page. Another goal may be to increase total accesses to the landing page, regardless of subsequent page accesses by users accessing the landing page. Another goal may be to obtain maximum possible conversion rates, even at the expense of decreasing the overall rate of page accesses.

Figure 6:
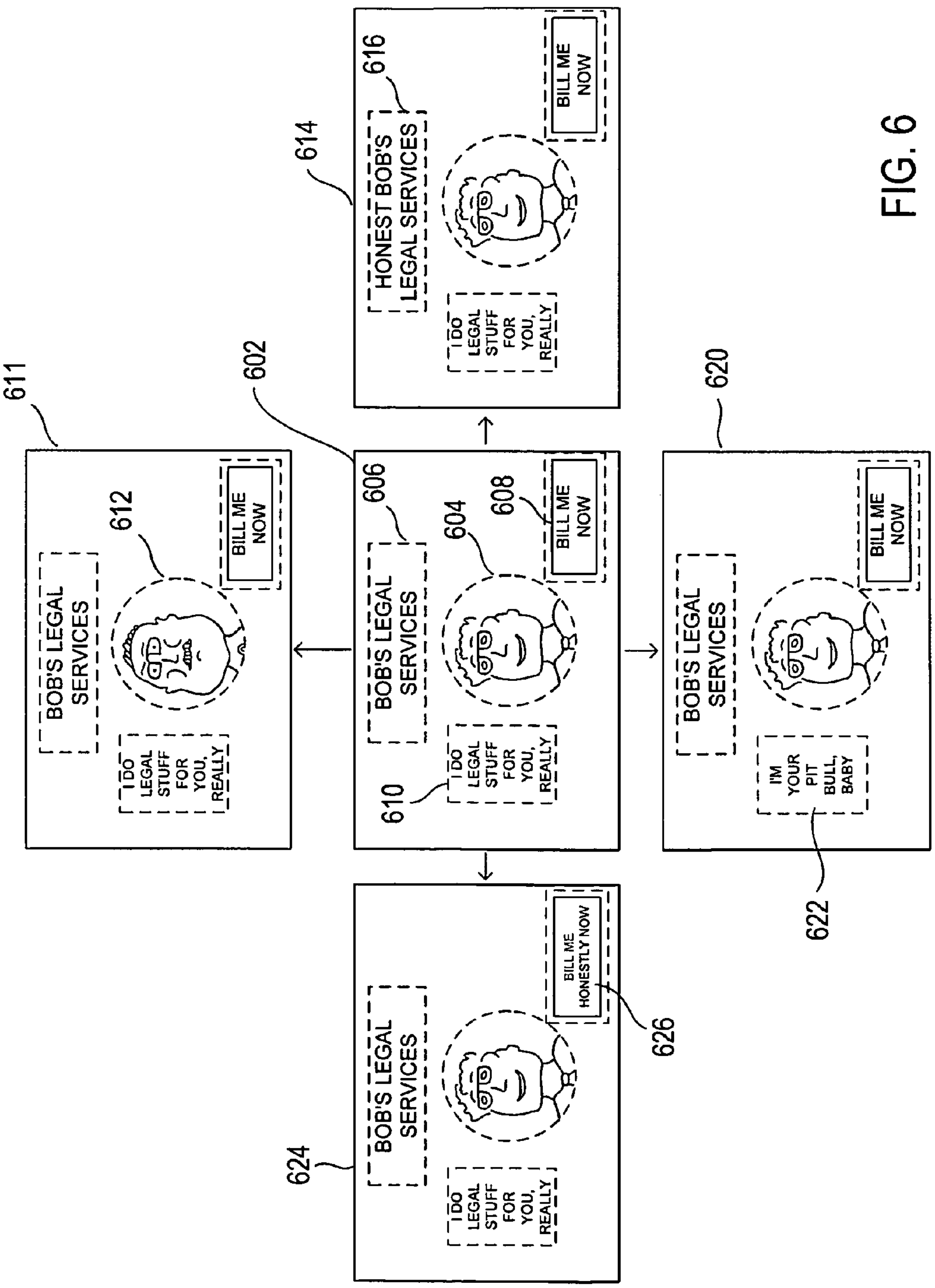

FIGS. 6-7 illustrate factors, factor levels, and test design. In FIG. 6, an initial, prototype web page 602 is shown. A web-site owner or developer may decide to systematically alter the prototype web page in order to test the effects of the systematic alterations, so that alterations that appear to maximize goals can be made to the web page in order to optimize the web page. The prototype web page includes a/portrait image 604, a title 606, a user-input feature 608, and an informational message 610. A systematic tester may decide to alter each of these web-page features, one-at-a-time, in order to determine the effects of the altered features on measured user response. For the web page shown in FIG. 6, the measured user response, or conversion event, would likely be user input to the user-input feature 608. As shown in FIG. 6, a tester may devise a first test web page 611 in which the prototype image 604 is replaced with a different image 612. The tester may devise a second test page 614 in which the title feature 606 is replaced with a different title feature 616. Similarly, the tester may devise a third test page 620 in which the informational message 610 of the prototype web page is replaced with a different informational message 622. Finally, the tester may create a fourth test web page 624 in which the user-input feature 608 of the prototype web page is replaced with a differently labeled user-input feature 626. The systematic tester may change a single feature, in each of the four test pages, in order to judge the effect of changing that feature in isolation from any other changes to the web page that might be contemplated. However, the strictly one-feature-change-at-a-time method would fail to provide data for the effects of various combinations of changes, such as changing both the headline and a portrait and, moreover, would require significant developer time and effort.

FIG. 7 illustrates a related approach to the testing approach discussed with reference to FIG. 6. In FIG. 7, the tester has prepared a table of factors and factor levels. Each factor in the table is represented by a column, such as the first column 702 corresponding to factor 1. Each factor is a feature, or group of related features, on a displayed web page that the tester wishes to alter in order to determine whether or not to alter the feature in order to optimize the web page with respect to one or more optimization goals. The various alternatives for each factor are referred to as levels. Thus, for example, factor 1, represented in the table by column 702, corresponds to the information message (610 in FIG. 6), for which the tester has devised six different alternatives, each corresponding to one of six different levels associated with that factor. The tester has devised four alternatives for factor 2, the title feature (606 in FIG. 6), five alternatives for factor 3, the portrait feature (604 in FIG. 6), and five alternatives for the fourth factor, the user-input feature (608 in FIG. 6). Then, having specified the factors, or web-page features, to be altered, and the various different alternatives for each feature, the tester might try generating all possible test pages corresponding to all possible combinations of level values for the factors in order to test the different alternative web pages to determine an optimal set of four levels corresponding to optimal alternatives for the four factors. Unfortunately, an exhaustive, combinatorial test, in most cases, is not feasible. Even for the very simple example of FIGS. 6 and 7, there are 1260 different alternative pages, including the prototype page, which can be constructed by varying between one and four factors according to the variations, or levels, provided in the table provided in FIG. 7. In general, for the statistics collected from testing to have significance, a sufficient number of tests need to be conducted so each of the different test pages is displayed a relatively large number of times during the test. In the example of FIGS. 6 and 7, each different alternative web page among the 1260 possible alternative web pages may need to be displayed hundreds or thousands of times to users in order to accumulate sufficient test data to make valid statistics-based judgments. In many cases, the number of factors and number of levels for each factor may be far larger than in the simple example shown in FIGS. 6 and 7.

The variations of factors, or levels, may include changes in content, display size, display color, object position in the displayed image, or many other different types of changes. Again, as discussed above, a factor may include multiple display features.

Because of the general infeasibility of full, exhaustive, combinatorial testing of all possible web-page variations, certain automated testing systems use an experimental-design method referred to as "the orthogonal-array method." This method devises a non-exhaustive test strategy that nonetheless gathers sufficient, well-distributed test data in order to make reasonable inferences with regard to the effects of altering the factors in all possible ways. In essence, the orthogonal-array method involves devising a sparse sampling of all possible variations of the web page that provides information about the various dependencies between the different levels of the different features. The orthogonal-array method involves specifying the factors and specifying the levels for each factor for a particular test run, and then, based on the factors and levels for each factor to be tested in a particular test run, devises a set of alternative web pages, by varying the specified factors according to the specified levels, that provide a good basis for collecting statistics for the features to be tested. The orthogonal-array method is well known in testing and statistics. Many additional types of test-design methods may also be used. Whatever test-design technique is employed, each test run defined by clients is associated with a test design that controls generation and distribution of experiments, or modified web pages.

Figure 8:
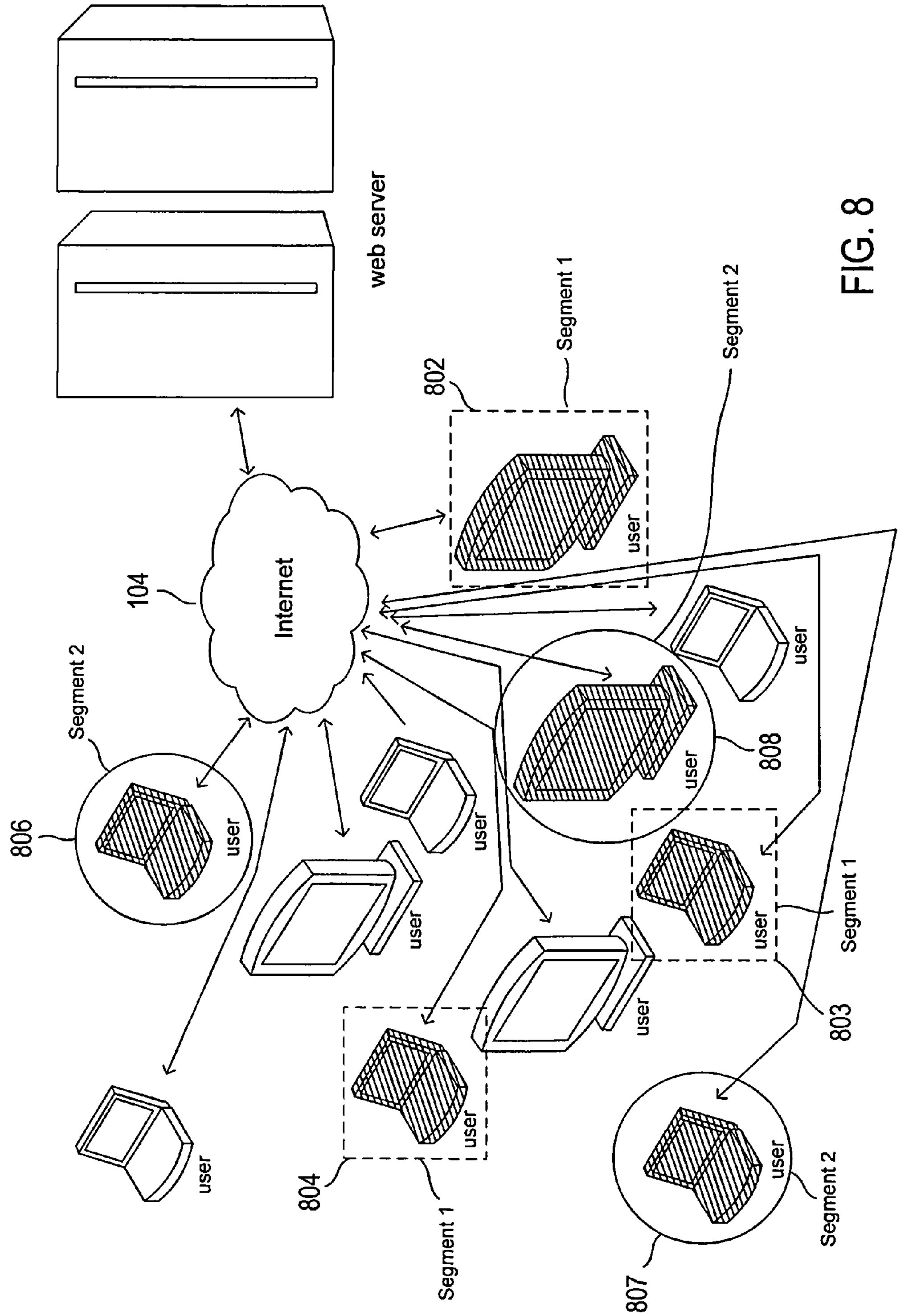
FIG. 8 illustrates the concept of segments in testing of web pages.

FIG. 8 illustrates the concept of segments in testing of web pages. FIG. 8 shows the web server and users of the web server using the same illustration conventions as used in FIG. 1. However, in FIG. 8, a first set of three users 802-804 are marked as belonging to a first segment, segment 1, and a second set of three users 806-808 are marked as belonging to a second segment, segment 2. During live, real-time testing of web sites, alternative versions of web pages are provided to subsets of the total number of users, or customers, accessing the web server. During a particular test run, altered web pages are provided to a specified segment of users. A segment of users, or customers, can be defined by any of a wide variety of different parameters. For example, a segment of users may be defined by the web page or link by which the users or customers navigated to a test page served by the web server. Segments may be defined by time periods, by the Internet domains through which users access the Internet, or by many other different criteria.

Figure 9:
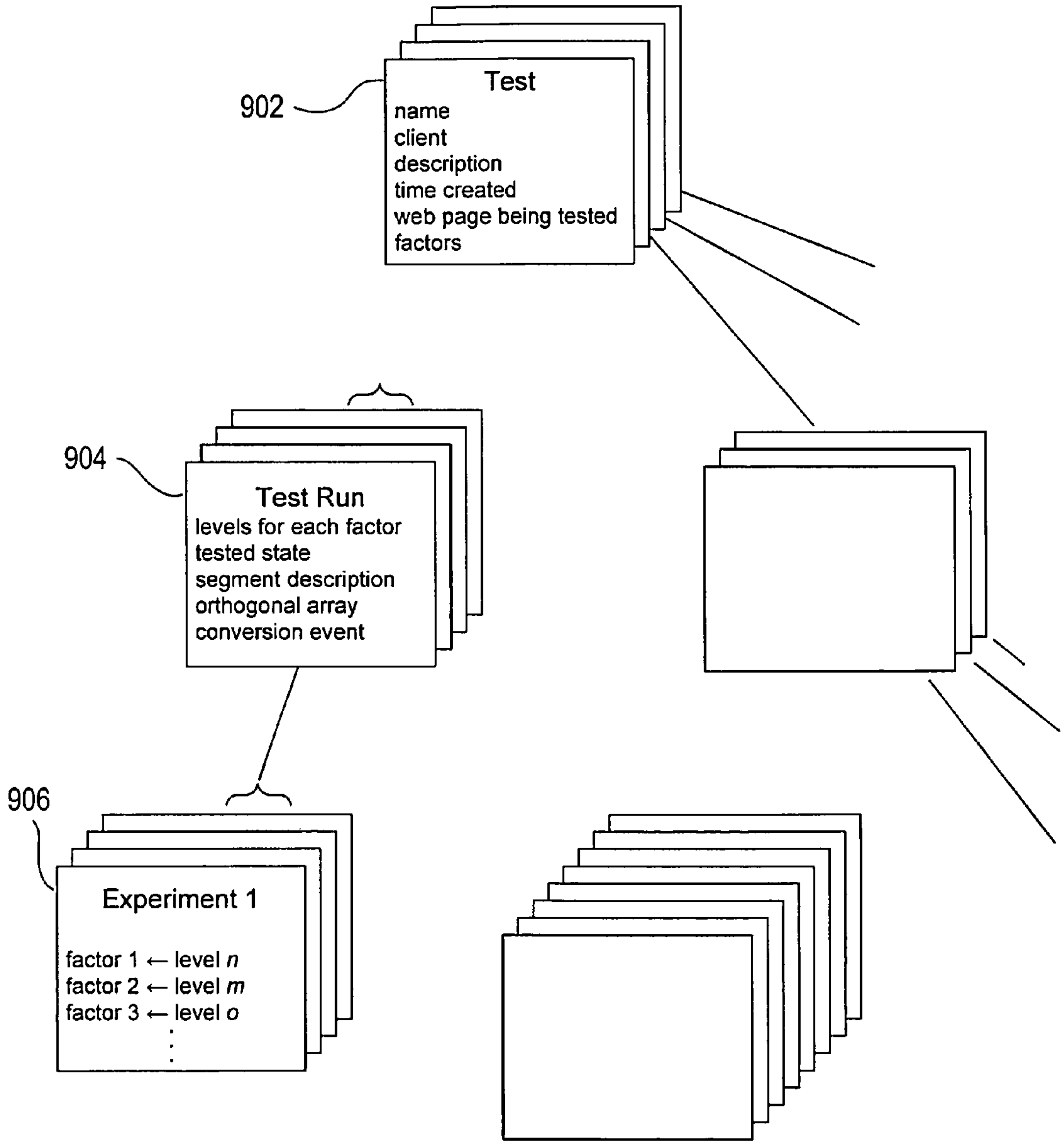
FIG. 9 illustrates the data and data structures that define tests, test runs, and experiments.

FIG. 9 illustrates the data and data structures that define tests, test runs, and experiments. A testing service may, at any given time, carry out a large number of different tests for many different client web-site-based organizations. Each test is defined by a test record, such as test record 902 in FIG. 9. Information contained in the test record includes an alphanumeric name of the test, an identifier for the client on behalf of whom the test has been created, a description of the test, an indication of the time that the test was created, an indication of the web page that is tested by the test, and a list of the factors that may be involved in any particular test run associated with the test. Note that the factors can be specified by the identifiers associated with features or objects displayed in the web page. For example, referring to FIGS. 2-4, a list of factors for a test of the exemplary web page shown in FIG. 2 may include the alphanumeric strings: "wm_headline," "wm_hero," "wm_offer," and "wm_button."

Any particular test may be carried out over a series of test runs. For example, each test run may be carried out at a different time, with respect to a different segment of users, and may test a different array of features and feature levels. Thus, each test record, such as test record 902 in FIG. 9, may be associated with one or more test-run records, such as test-run record 904 in FIG. 9. Test-run records include information such as the levels to be used for each factor, with the levels specified as URLs, or other references to images and other resources, or as text strings or other data directly displayed by the browser, a current state of the test run, a description of the segment to which the test run is directed, an indication of the particular orthogonal-array basis or other test design for the test run, and an indication of one or more conversion events for the test run. Finally, using the orthogonal-array basis or other test design selected for the test run, a test run is associated with a set of experiments, such as experiment 906 in FIG. 9. Each experiment corresponds to an altered web page that is displayed to users during the test run. An experiment is essentially defined by associating each factor, tested in the test run, with a particular level, or referenced resource, according to a matrix of test pages generated by the orthogonal-array basis or other test design selected for the test run.

Figure 10:
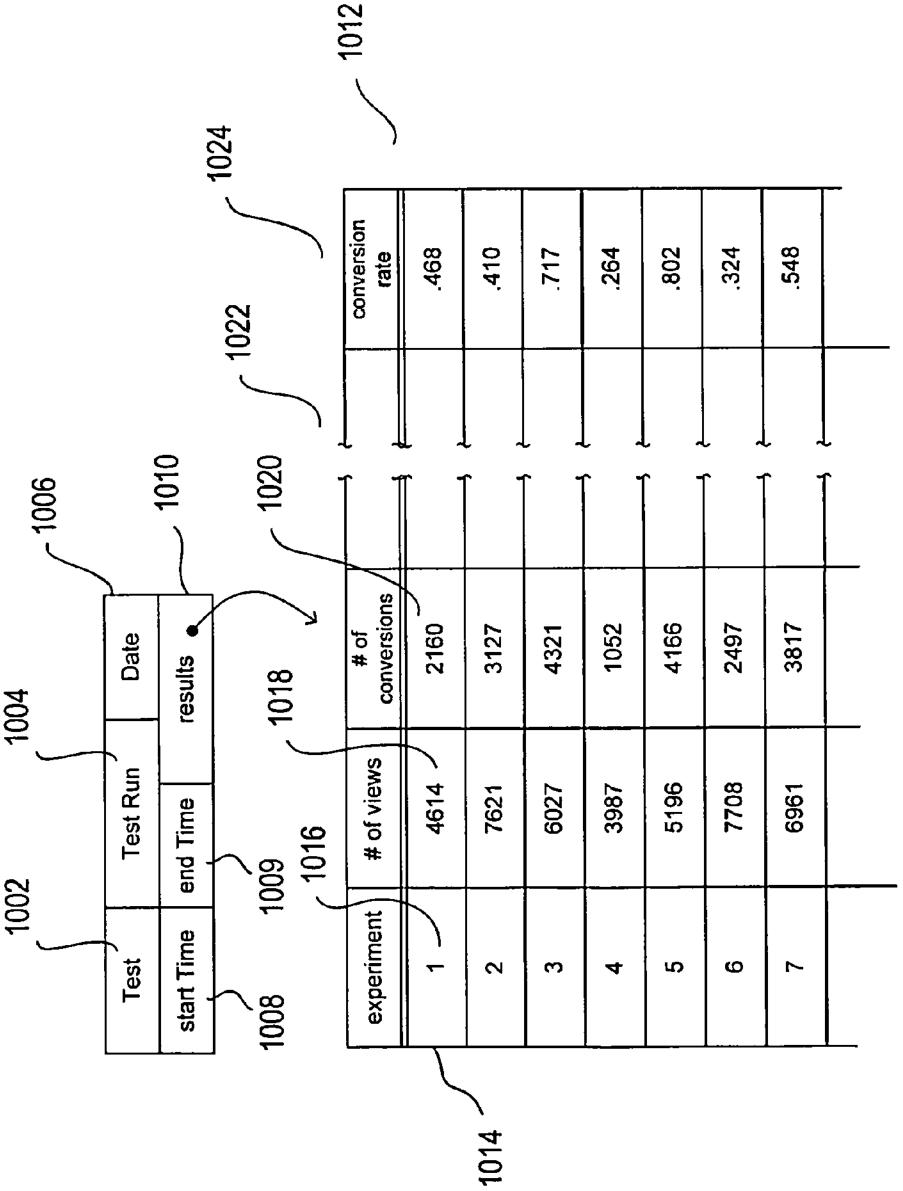
FIG. 10 illustrates the nature of the statistics, or test results, that are collected for a particular test run.

FIG. 10 illustrates the nature of the statistics, or test results, that are collected for a particular test run. The results include indications of the test 1002 and test run 1004, the date on which the test run was conducted 1006, a start time and an end time for the test run 1008-1009, and a reference 1010 to a results table 1012 in which test results are tabulated. The test results table includes a row for each experiment associated with the test run, such as row 1014 in experimental-results table 1012. The row includes an indication of the experiment to which the row corresponds 1016, a count of the number of the times that the page corresponding to the experiment was accessed by a user of an active segment 1018, an indication of the number of times that a user who accessed the test page generated a corresponding conversion event 1020, other similar numerical information in additional columns 1022, and, finally, a computed conversion rate 1024 for each experiment. The test results shown in FIG. 10 are but one example of the type of statistics and data that can be collected during a test run.

There are many different possible ways of testing a web server in order to accumulate test results, discussed above with reference to FIG. 10, for tests defined for particular web pages and factors associated with those web pages, as discussed above with reference to FIG. 9. One method would require the web server to design a test by creating all or a subset of possible alternative test pages and to then develop a test-page-serving system that would execute concurrently with, or as part of, the web server on an intermittent or continuous basis. As discussed above, testing methods and systems that require the web server to develop and run tests may be prohibitively expensive, both in time and resources, for web-site owners or web-site-based organizations. Furthermore, such testing methods can inadvertently cause serious financial losses and other non-financial damage to a web site. For example, were the test pages improperly constructed or served, sales or other activities generated by real-time users may be lost and, in worst cases, the web site could potentially lose business from particular customers and users altogether. Real-time testing additionally involves significant security risks. A malicious hacker or employee might be able to alter the test system to display fraudulent or offensive test pages, for example. Finally, similar to problems encountered in a variety of physical and behavioral systems, poorly or improperly design tests may so perturb the system being tested that the statistics collected from the tests are meaningless or, in worst cases, lead to false conclusions. For example, a poorly designed test engine may introduce significant delays in web-page service to customers or users. As a result, the conversion rate measured during a test run may fall precipitously, not because of particular alterations made to test web pages, but instead because the significant time delay encountered by users for whom the test page is constructed and to whom the test web page is transmitted. For these, and many other reasons, web-site-based-organization test design and execution can be undesirable and, in worst cases, disruptive and damaging to the web-site-based organization.

An alternative approach to testing involves using a third-party testing service, in tandem with the web server that serves the web site to be tested. However, simply conducting tests by a third-party server does not guarantee that the many pitfalls and disadvantages discussed above with respect to web-site-based-organization test design and execution are necessarily avoided. In fact, in many cases, the pitfalls and disadvantages discussed in the preceding paragraph may be exacerbated by third-party testing of web sites and web servers. For example, in the case that a test web page, requested by a customer, needs to be prepared by the third-party server, in response to a request generated by the web site as a result of a user request for the web page being tested, test-page serving may be significantly delayed, deleteriously perturbing the users' interaction with the web server to the point that the test statistics end up meaningless or misleading. As another example, security issues may be compounded by distributing testing tasks between a web-server computer system and a third-parting testing server. Automated testing systems may employ an array of techniques and features that address these pitfalls and disadvantages, and that provide minimally intrusive and cost-effective testing for web sites and web servers.

Figure 11:
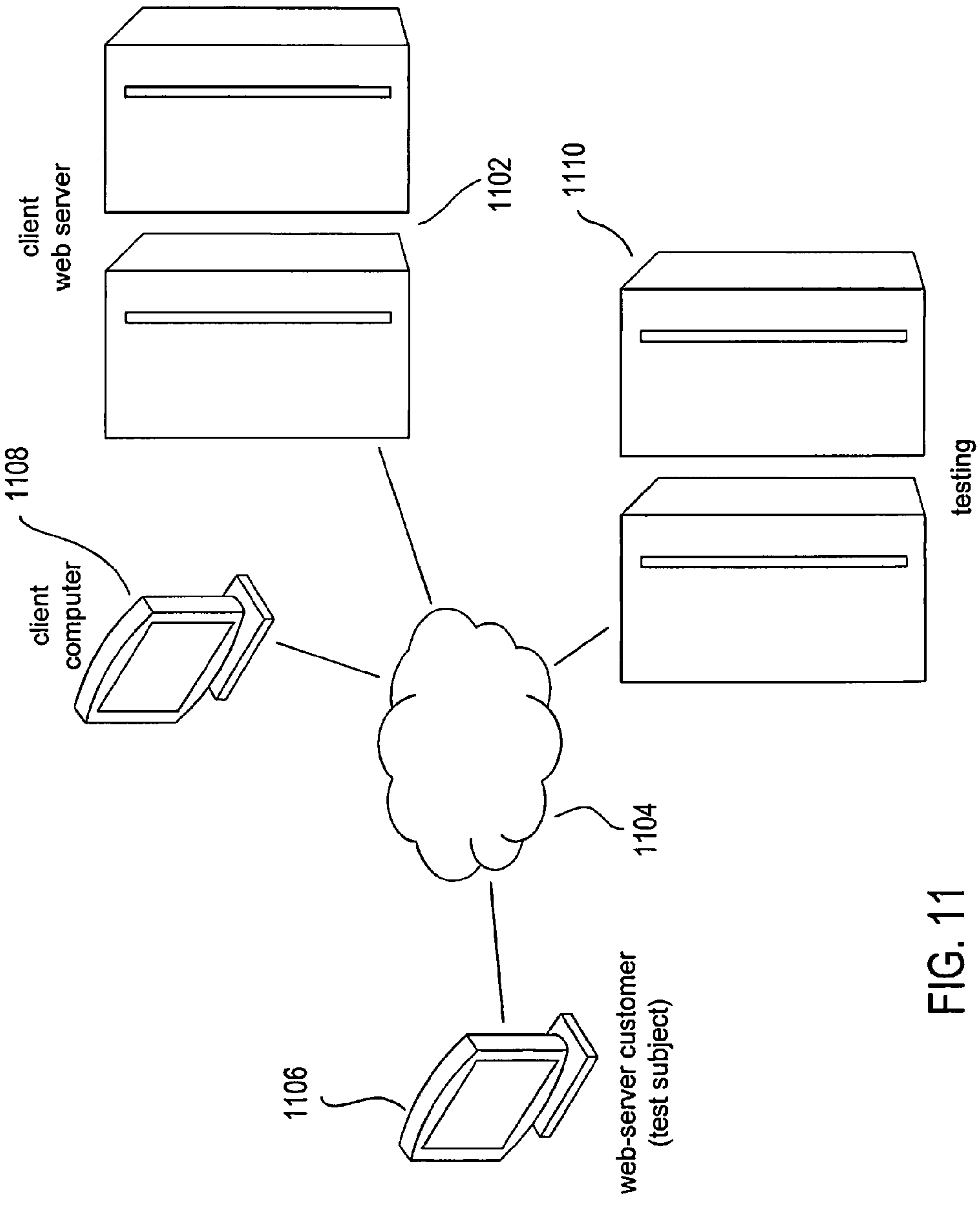
FIG. 11 illustrates an automated testing environment.

FIG. 11 illustrates an automated testing environment. In FIG. 11, the web site 1102 is represented as one or more servers or large computer systems that serve web pages through the Internet 1104 to a generally large number of web-site users or customers, including user 1106. The web site or web server is regarded, in the following discussion, as a client web server of the testing service. The client web server also includes a client computer 1108 by which the client web-server-based organization can access various third-party services and web servers through the Internet. Finally, a web-site testing service is provided by a distinct server or servers 1110 accessible to the client web server 1102, the web server customer 1106, and client computer 1108 via the Internet 1104.

The testing service is used by the client web-site-based organization, referred to as the "client," below, to design and run real-time, live tests of web pages provided by the client web server to users. A testing service may run on the same computer systems as the client web server. In general, the testing service is geographically distinct from the client web server, and is concurrently used by multiple, different clients for concurrently executing many different test runs on behalf of the multiple clients.

FIGS. 12A-H illustrate a general method and system for web-site testing. FIGS. 12A-H all use the same illustration conventions, in which large rectangles represent the four entities shown in FIG. 11.

Figure 12A:
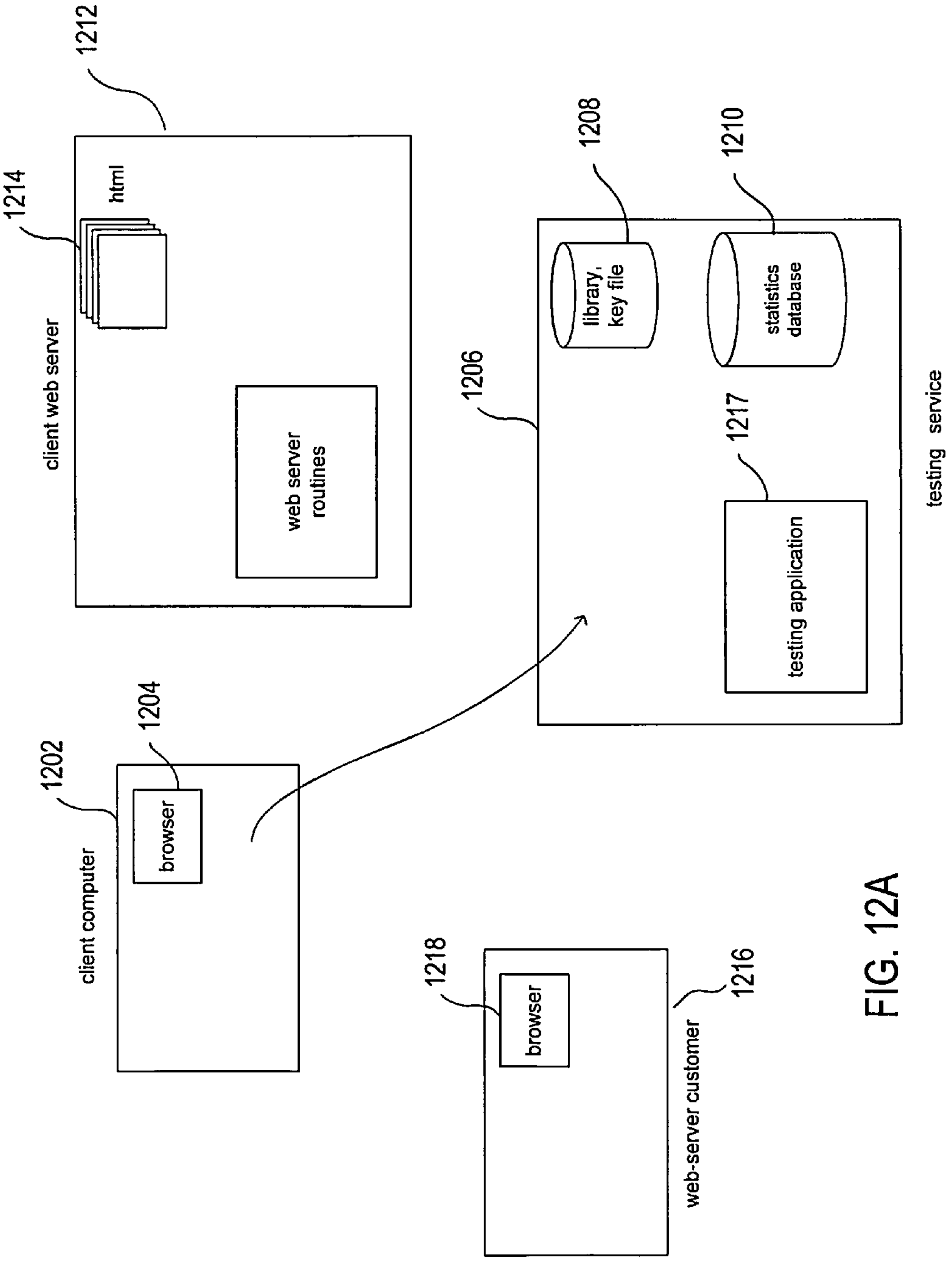
FIGS. 12A-H illustrate a general method and system for web-site testing.

A client establishes a relationship with the testing service, as shown in FIG. 12A, by accessing the testing service through a browser executing on the client computer. As shown in FIG. 12A, an employee or owner of the client web server uses the client computer 1202 to access a testing-service web site, via a browser 1204 running on the client computer, which allows the client web server to register as a client of the testing service. The testing service 1206 includes one or more databases 1208 and 1210 that store information used to construct library and key files that are downloaded to client web servers, store statistics collected during testing, and store various different data objects and records that describe clients, tests, test runs, experiments, and other data used to conduct web-site testing. The client web server 1212 serves a number of different web pages described by HTML files 1214 to users, represented by user 1216 who access the web pages served by the client-web server through a browser 1218 running on the customer computer 1216. The testing service and client web server additionally include web-server engines, application programs, and other components of servers and computer systems (1215 and 121 in FIG. 12A).

Figure 12B:
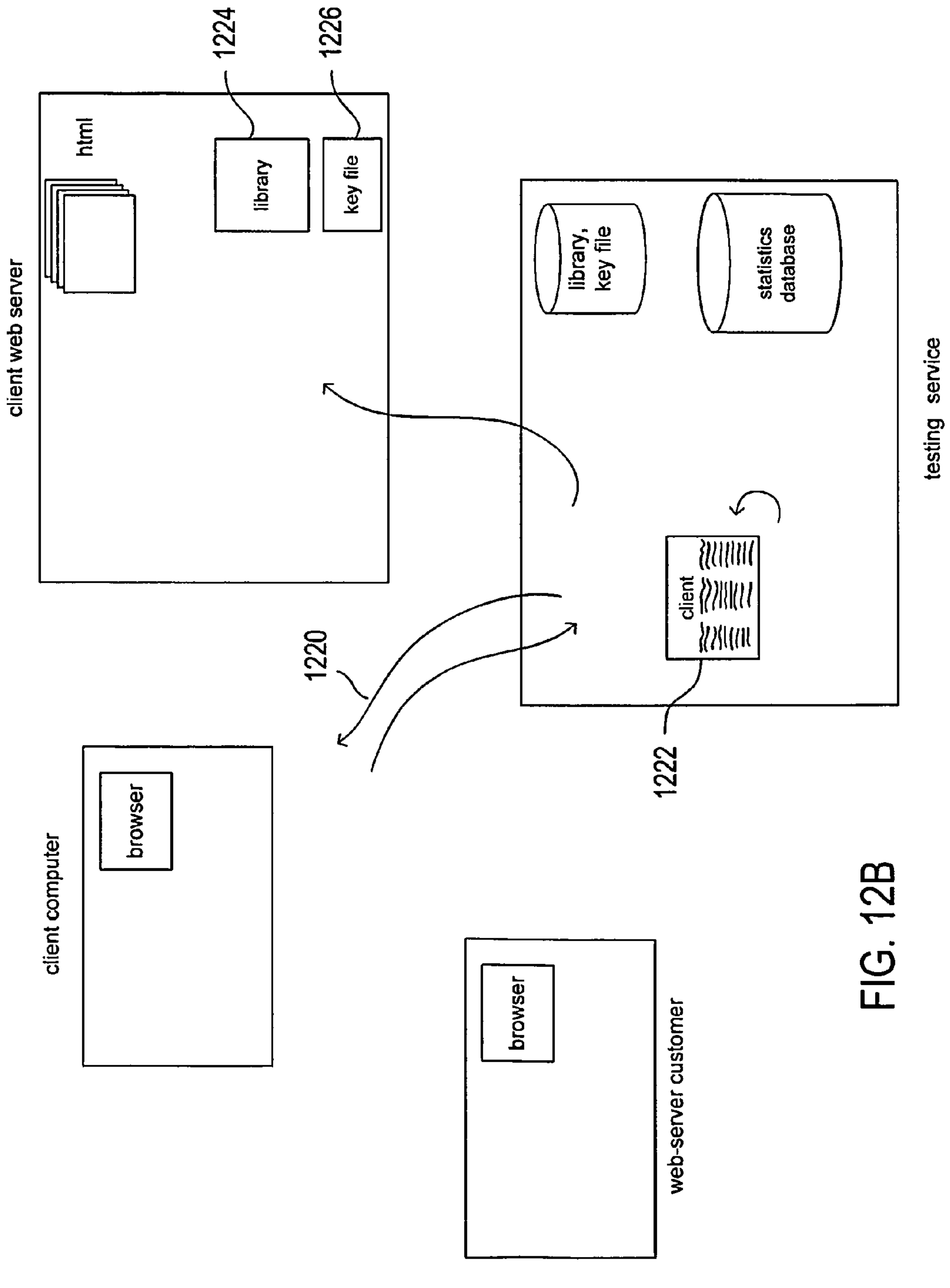

As shown in FIG. 12B, the client carries out a dialog 1220 with the testing service in order to provide the testing service with information about the client that allows the testing service to prepare a client record or records 1222 that describe the client and to store the client record or records in the database. In addition, the testing service may undertake various authorization and authentication steps to ensure that the client web server is a valid web server and that the client can transmit remuneration for testing services to the testing service. As part of client initialization, the testing service prepares a script library 1224 and a key file 1226 that the testing service downloads to the client web server. The script library 1224 includes routines that are called by client-web-server users during web-site testing. This library is referred to as a "script library" because script routines are often provided to browsers for execution. The key file 1226 includes cryptographic information that ensures that all information exchanges that occur between client users and the testing service are secure.

Figure 12C:
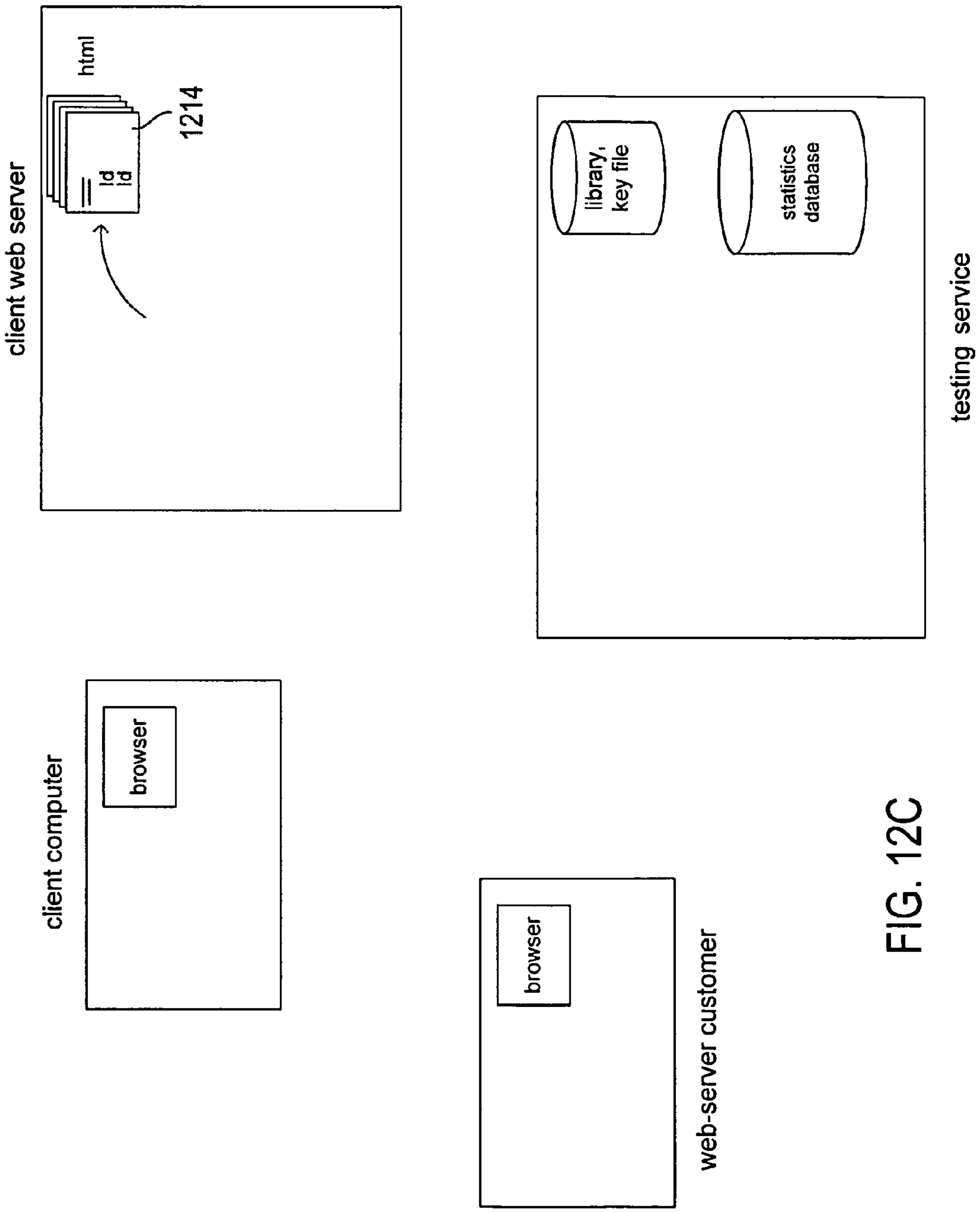

As shown in FIG. 12C, following client initialization, the client modifies any of the HTML encodings of web pages that may be altered during testing of the client-web server by the testing service. The alternations are minimal. To each HTML file that encodes a web page that may be tested, the client generally adds only two single-line statements and, in the case that display objects are not associated with identifiers, as discussed above with reference to FIG. 3, the client web server provide identifiers for each of the objects that may be specified as factors for testing of web pages. The single-line statements are generally identical for all client web pages, greatly simplifying the web-page modification carried out by the client. The first statement results in downloading of a script library from the client web server, and the second script launches one or more information exchanges between the testing server and user computer. In the case that a conversion event is tied to a specific user-activated display device, such as a button, a call to a conversion script is inserted into the HTML file, so that user activation of the user-activated display device generates an information-exchange transaction with the testing service corresponding to a conversion event. As discussed above, these may be the HTML identifiers discussed with reference to FIG. 3, or other types of identifiers. In many cases, simple changes to the HTML files can be automatically carried out by a script or by routines provided by a content-management-service application-programming interface.

Figure 12D:
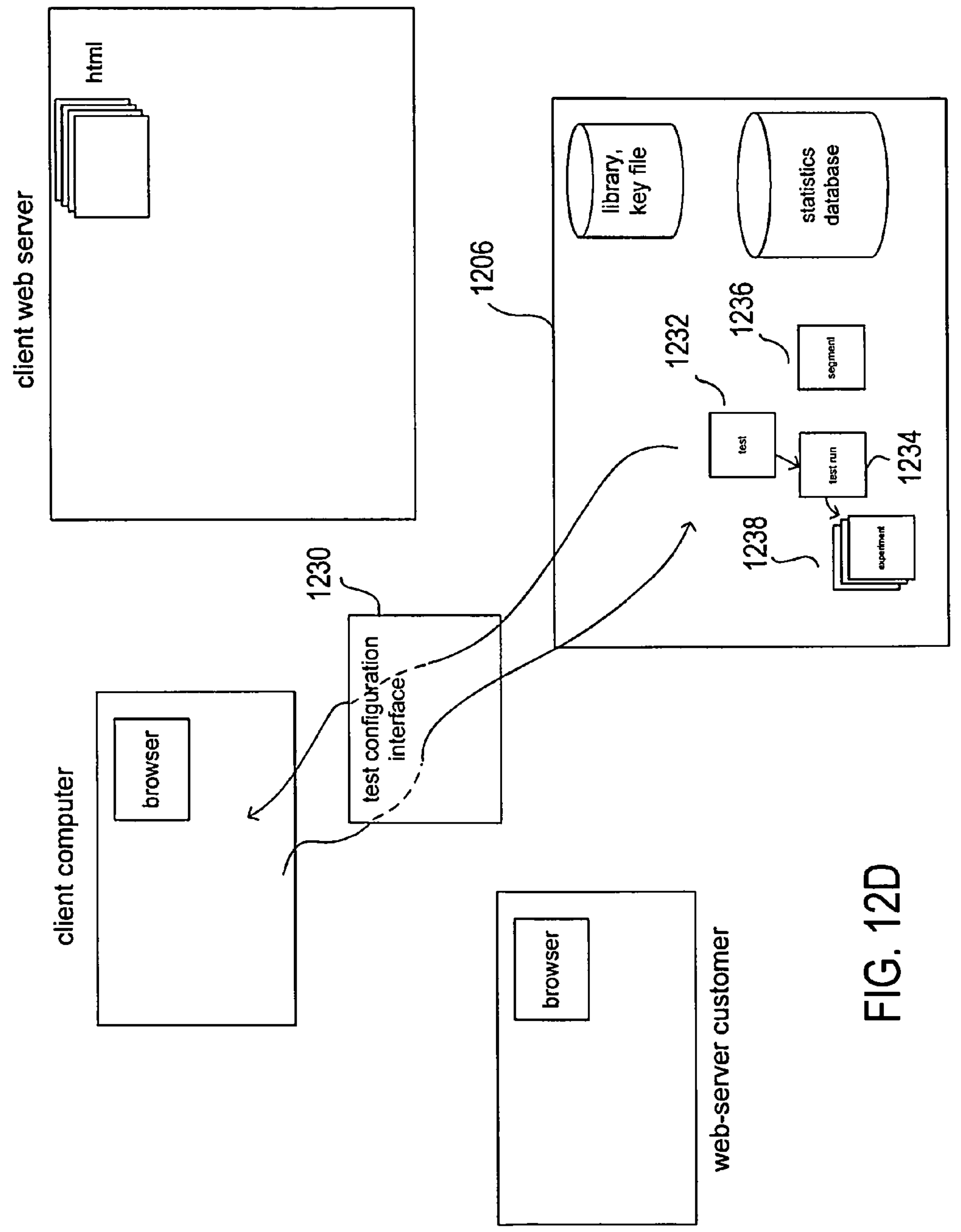

Following client initialization and modification of the HTML-file encodings of web pages that may be subsequently tested, the client can configure and run tests through a test-configuration interface provided as a website by the testing service to clients, as shown in FIG. 12D. The test configuration interface 1230 allows the client computer to define tests 1232, specify and modify already-specified test runs 1234, and specify segments 1236, and, using client-supplied test and test-run specifications, the testing service generates the experiments 1238 associated with each test run. All of the test, test-run, and segment information is stored in records associated with a reference to the client in one or more databases within the testing service. The test-configuration interface 1230 additionally provides run-time information to the client web server and allows the client web server to launch trial runs and test runs.

When a client web server has created a test and launched a test run for the test, the testing service provides modifications of the tested web page to users of the client-web-server during the test in order that the users receive altered web pages that constitute test experiments, and the testing service collects statistics based on users' access to web pages under test. This process is next described, with reference to FIGS. 12E-G.

Figure 12E:
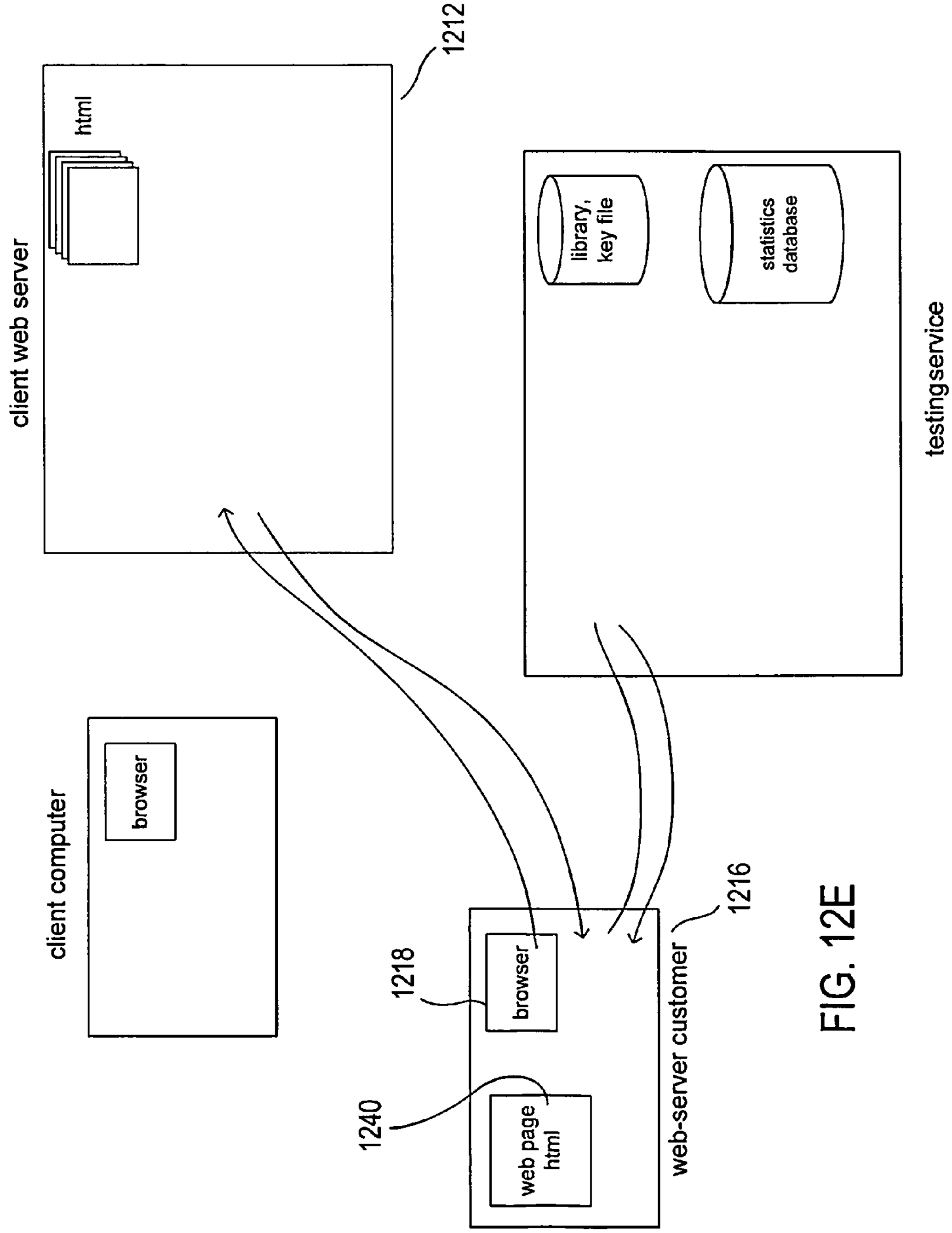

When a client-web-server user 1216 accesses a test web page, the client-web-server user sends an HTML-file request through the Internet to the client web server 1212, as shown in FIG. 12E, which returns the requested HTML page to the client-web-server user 1216 for rendering and display by the browser 1218 executing within the user's computer. As the browser begins to process the HTML file, the browser encounters a statement 1240 that causes the browser 1218 to request the script library from the client web server. When the script library is downloaded by the client web server, the HTML file is modified, on the user computer, to launch an additional information exchange with the testing service to download additional library routines from the testing service. This additional information exchange is carried out only when the web page being processed is an active test page, the user computer is a valid test subject for an active test, and the additional library routines are not already cached in the user computer's browser. Insertion of the library-routine-fetch statement is one of the two modifications to the HTML files corresponding to tested web pages made by the client.

Figure 12F:
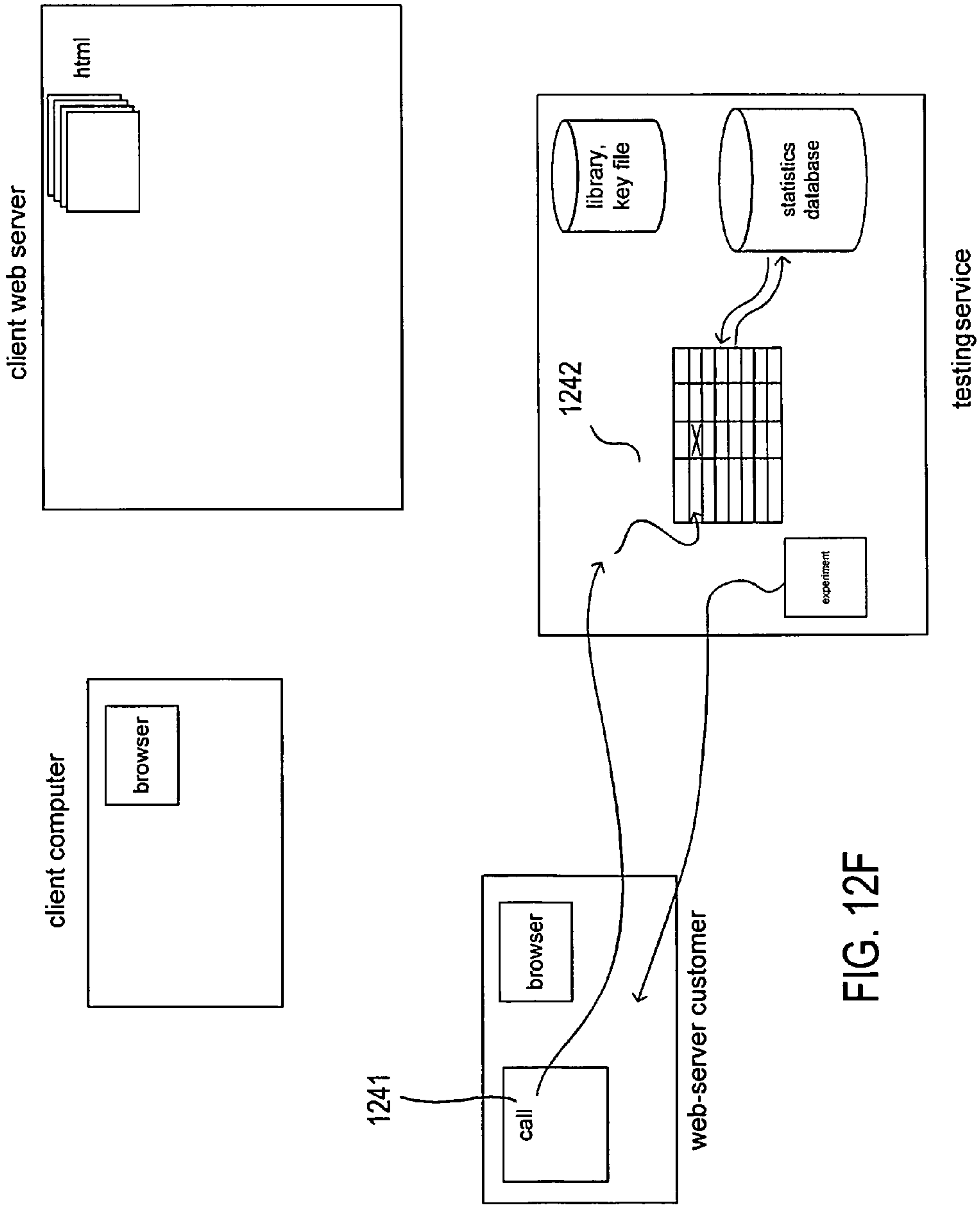
Figure 12G:
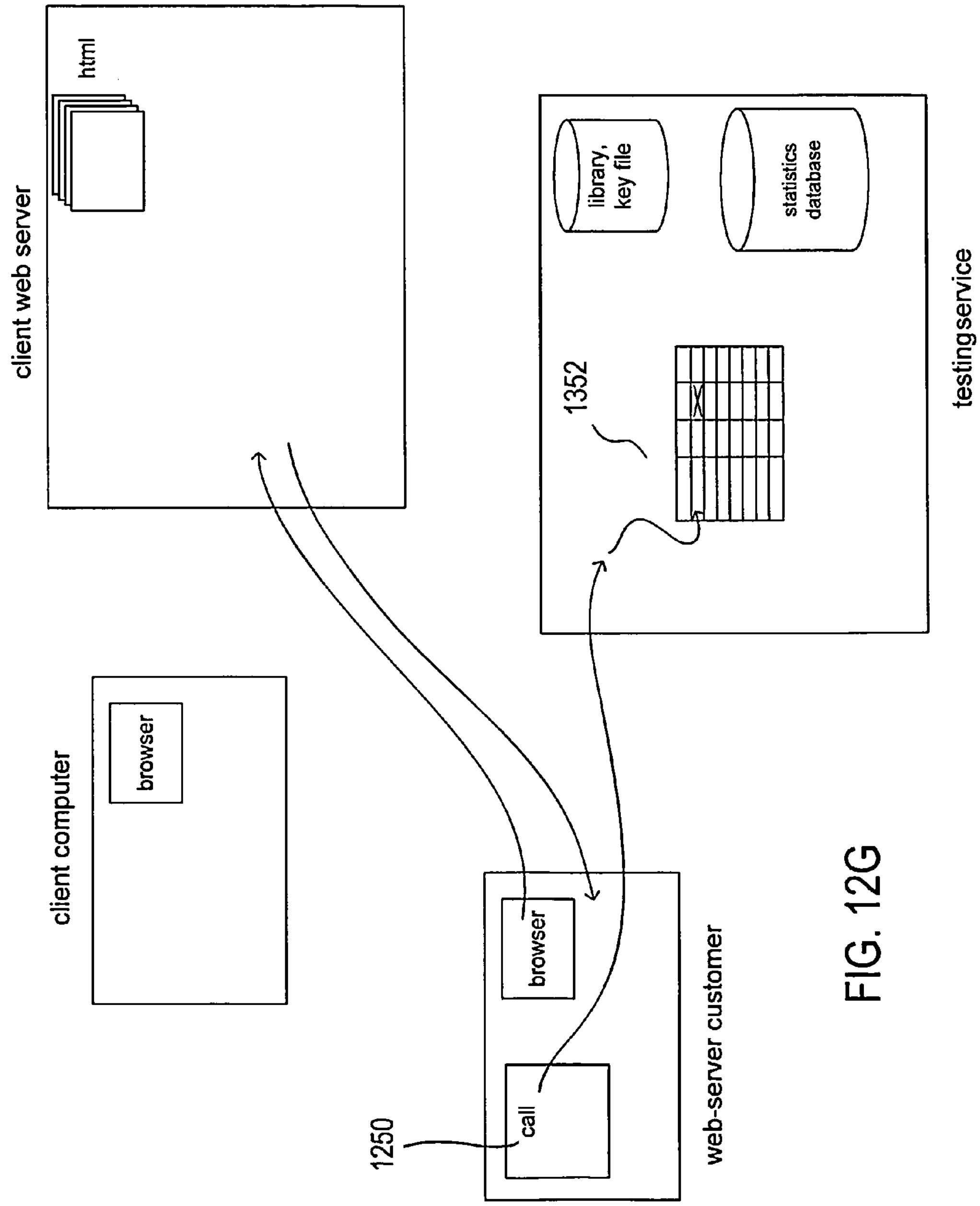

Next, as the browser continues to process the HTML, as shown in FIG. 12F, the browser encounters a call to the library routine "WM.setup" 1241. When executed by the browser, WM.setup initiates one or more information exchanges with the testing service during which the testing service can access cookies and other information associated with the web page on the user's computer, and the user computer receives web-page modifications from the testing service. Cookies can be used, for example, to ensure that a test subject who repeatedly accesses a landing page receives the same experiment, or test page, each time. Only when the web page being processed by the user computer is an active test page, and the user computer is an active test subject, are web-page modifications returned to the user computer by the testing service, and information uploaded by the testing service from the user computer. When this web page and user are validated, the testing service records the page accessed by the user, an identifier of the user, and a time of access in one or more database entries 1242 and returns a snippet, representing one or more nodes or sub-trees of the DOM corresponding to the web page, to the user computer, which modifies the DOM constructed by the browser to incorporate the snippet downloaded by the testing service to the user. In other words, the testing service downloads modifications that transform the web page downloaded by the user to a particular altered web page representing an experiment. Thus, following the information transaction illustrated in FIG. 12F, the user's browser alters the DOM and displays, to the user, the altered web page corresponding to an experiment as part of the test run. The snippet is constructed or retried by the testing service based on the orthogonal-array test basis or other test design. The stored test design defines the experiments, from which the testing service selects experiments for provision to users in order to obtain a well-distributed sampling of experiments during the test. Subsequently, as shown in FIG. 12G, should the user download a page, or invoke a feature on a page, corresponding to a conversion event, the user's browser, in processing the HTML file, encounters a library call 1250 that results in an information transaction between the user and testing service. The testing service checks to ensure that the web page is a valid conversion page for an active test, that the user is a valid test subject. When all of these tests are valid, the conversion event is recorded 1352 for the experiment by the testing service.

Figure 12H:
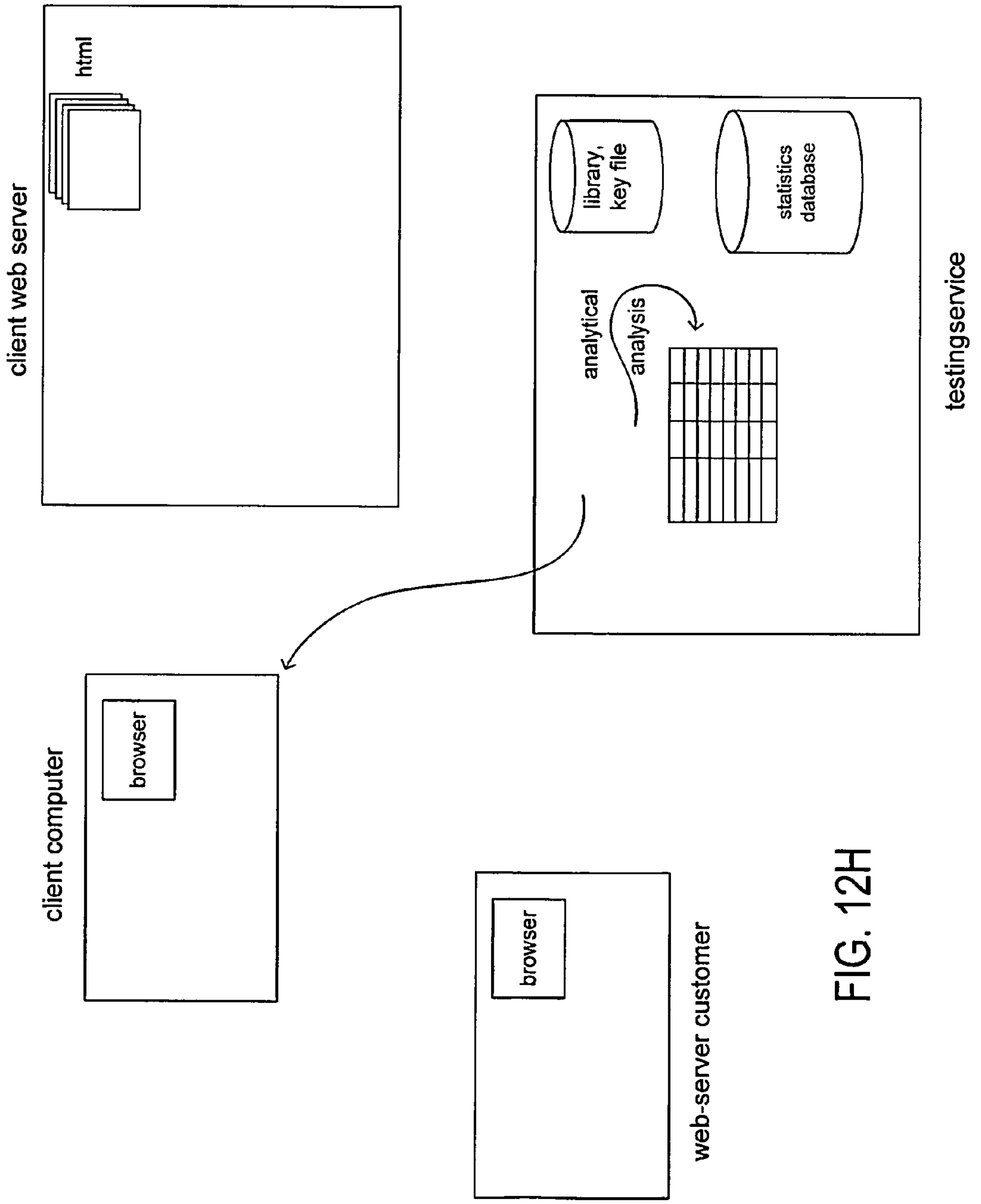

Finally, as shown in FIG. 12H, when the testing service has collected sufficient data to consider the test run to be complete, the testing service changes the status of the test run to complete, and may then undertake analysis and reporting of the test results. The test results may be automatically returned to the client web server, or may be subsequently returned, on demand, when the client checks the status of the test run and determines that the test run has been completed.

Figure 13A:
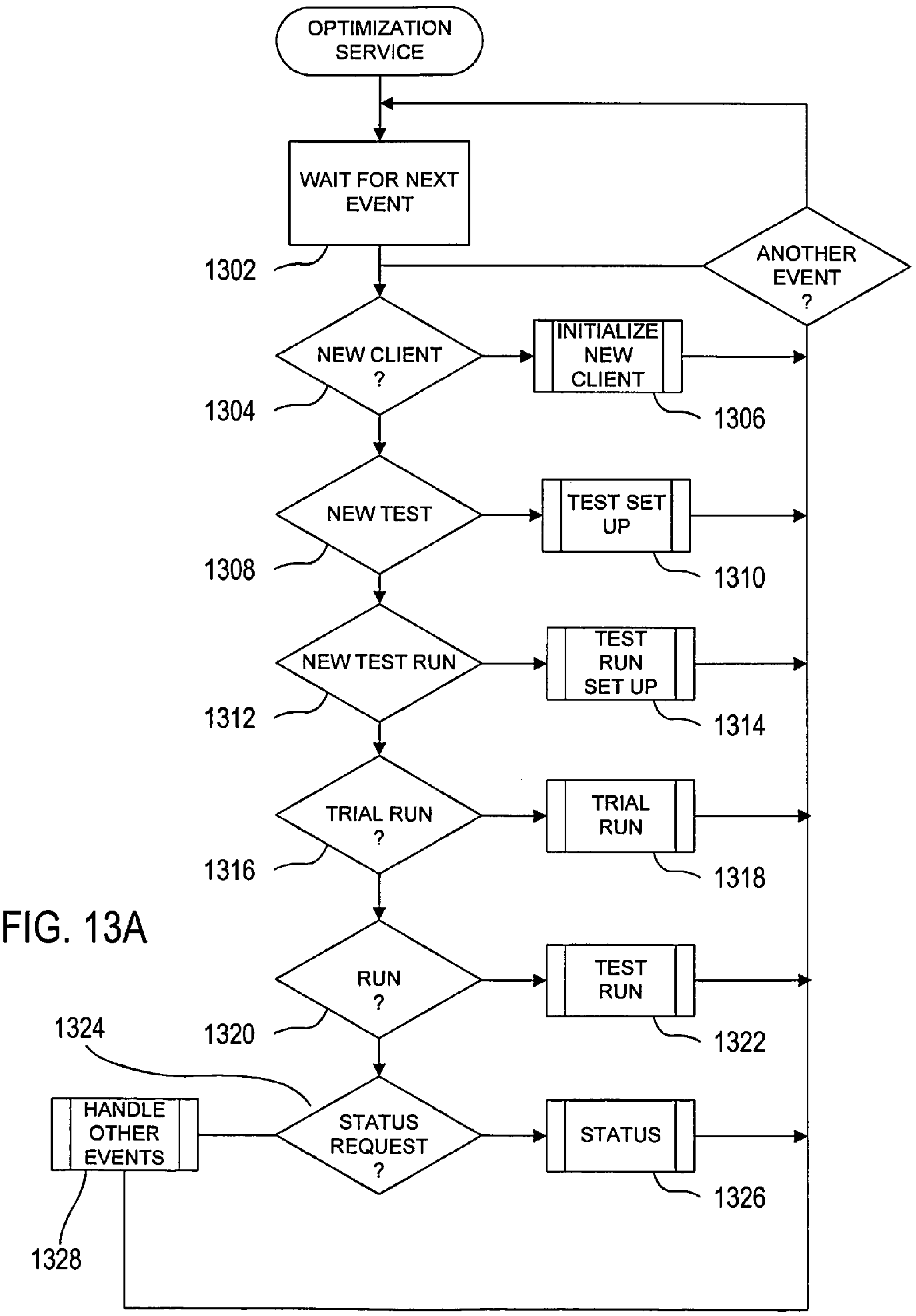
FIGS. 13A-H provide control-flow diagrams for a web-site testing service.

FIGS. 13A-H provide control-flow diagrams for a web-site testing service. FIG. 13A provides a high-level event loop carried out by the testing service on behalf of one or more clients. In step 1302, the testing services waits for a next client-generated event. When the event corresponds to access of the testing-service website for registration by a new client, as determined in step 1304, the routine "initialize new client" is called in step 1306. When the event is a request to construct a new test by an already-registered client through the test-configuration interface, as determined in step 1308, the routine "test setup" is called in step 1310. When the event is a request to configure a new test run, as determined in step 1312, the routine "test run setup" is called in step 1314. When the event is a request to launch a trial run, as determined in step 1316, the routine "trial run" is called in step 1318. When the event is a request to launch a test run, as determined in step 1320, the routine "test run" is called in step 1322. When the event is a status, information request, or information-update request, as determined in step 1324, then the routine "status" is called in step 1326. For example, a client can obtain test-result information during a test run, and can additional obtain analysis results following completion of a test run. Any of various additional types of events are handled in a default event handler in step 1328. Additional events include log-ons to the testing service web site by registered clients, during which clients are authorized and authenticated.

Figure 13B:
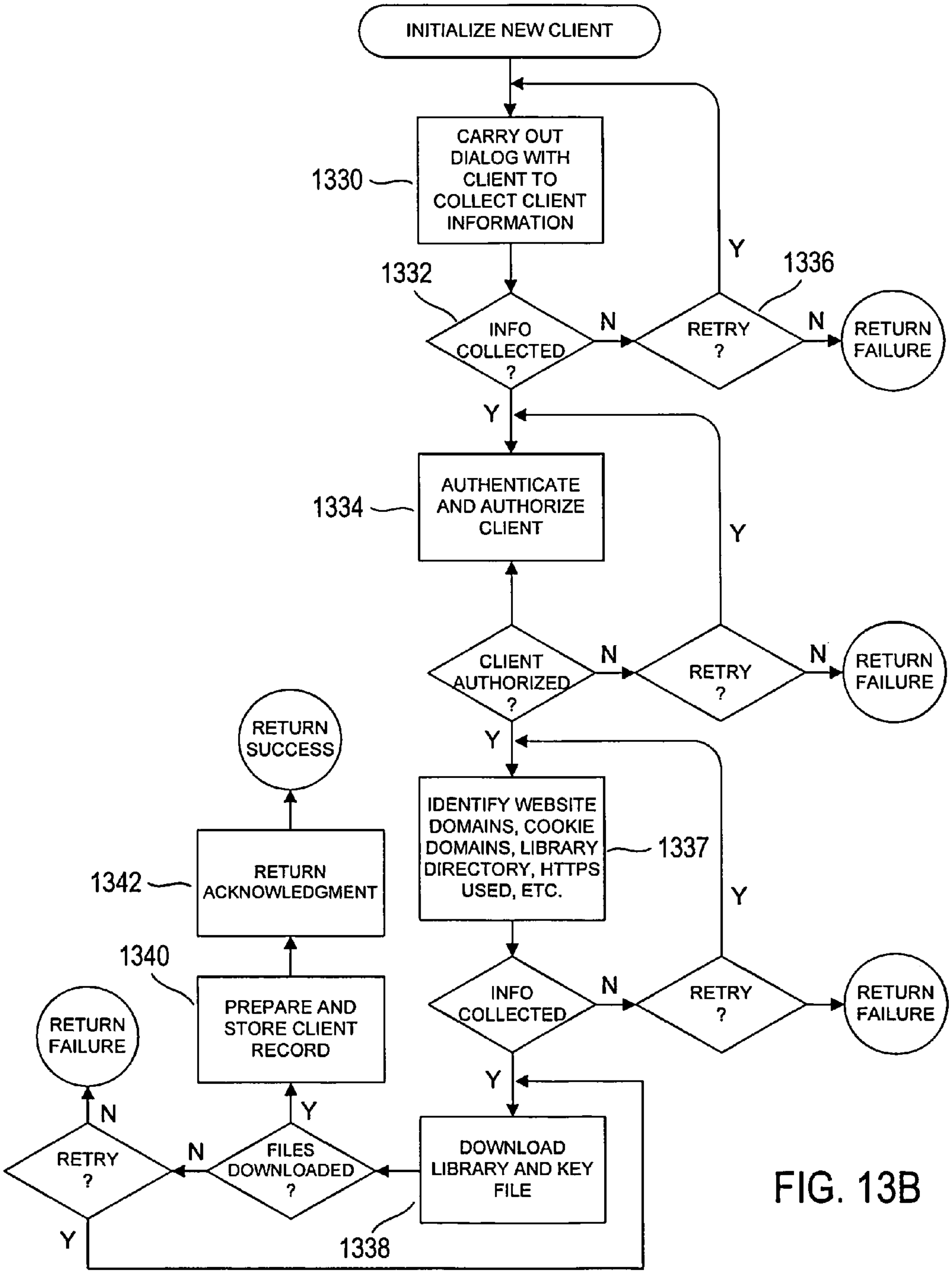

FIG. 13B provides a control-flow diagram for the routine "initialize new client" called in step 1306 of FIG. 13A. In step 1330, the testing service carries out a dialog, through the testing service web site interface, with a prospective client in order to collect information about the client. This information may include the client's name, address, billing address, web site URL, and other such information. If all needed information has been collected through this dialog, as determined in step 1332, then the testing service proceeds to authenticate and authorize the prospective client, in step 1334. Otherwise, as with most of the steps carried out by the testing service during dialogs with clients of the testing service, the testing service may elect to retry a previous step, as determined in the current case in step 1336, in order to make an attempt to acquire the remaining needed information or, in certain cases, may simply return an error message and fail. Once a client has been authorized, the testing service, in step 1337, either through a dialog or via automated methods, determines the web site domains and cookie domains of the client web server, and obtains, from the client, specification of a file-system location at which to download to the client web server the library and key files. In addition, the testing service determines whether or not to use a secure protocol when communicating with client-web-server users and any other information needed for executing tests. Then, in step 1338, the testing service creates and downloads the script library and key files to the client web server. In step 1340, the testing service prepares and stores one or more client records that describe the client and provide a basis for further interactions with the client and, finally, in step 1342, return an acknowledgement to the client. In an actual testing service system, client initialization may contain many additional steps, and may involve solicitation and acquisition of many additional different types of information.

Figure 13C:
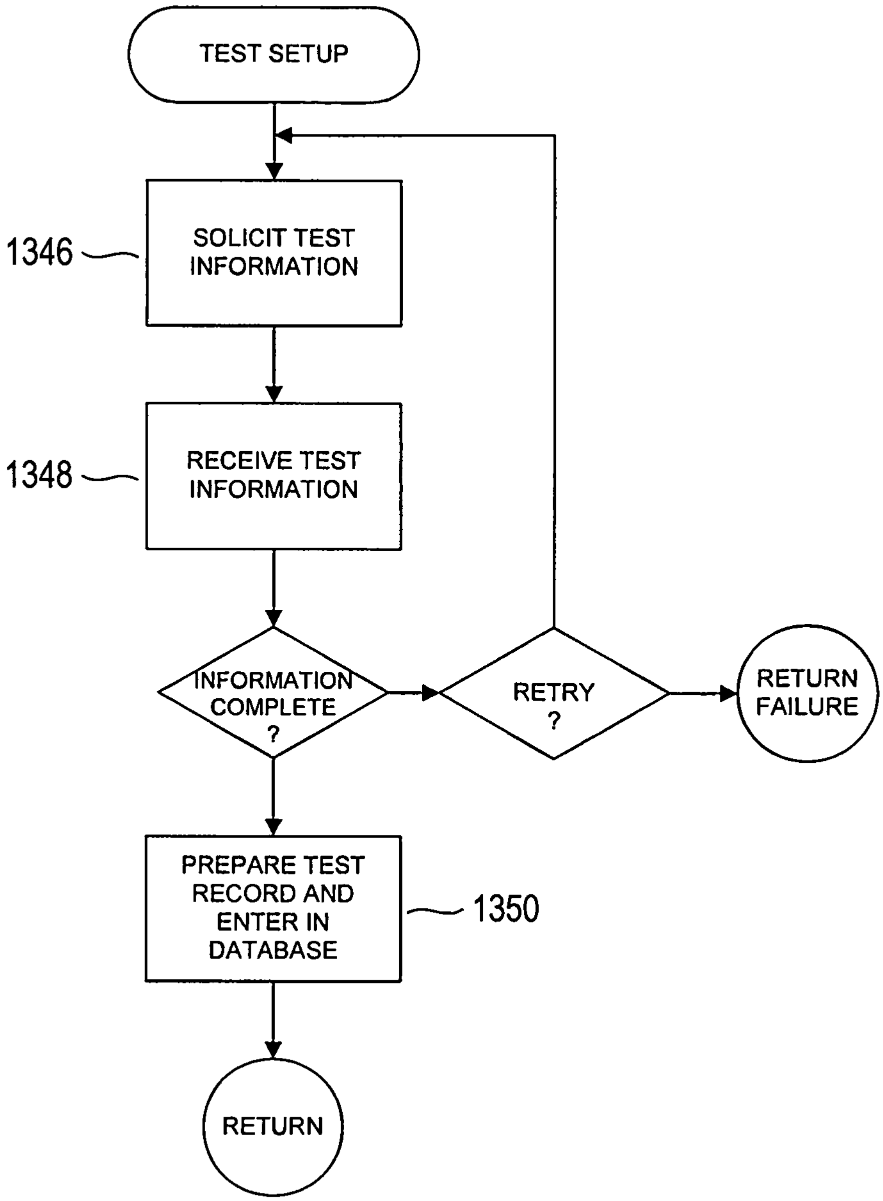

FIG. 13C provides a control-flow diagram for the routine "test set up" called in step 1310 of FIG. 13A. In step 1346, the testing service solicits test information from the client and receives the solicited information in step 1348. Steps may be iterated in order to carry out a dialog during which the needed information to prepare and store a record describing a test is acquired by the testing service. Once the information is received, the testing service prepares a test record and enters the test record in the testing service's database in step 1350 in association with, or referenced by, one or more client records. As discussed above, test information may include a test name, creation date, description, list of factors, and other information that provide a basis for subsequent construction of test runs.

Figure 13D:
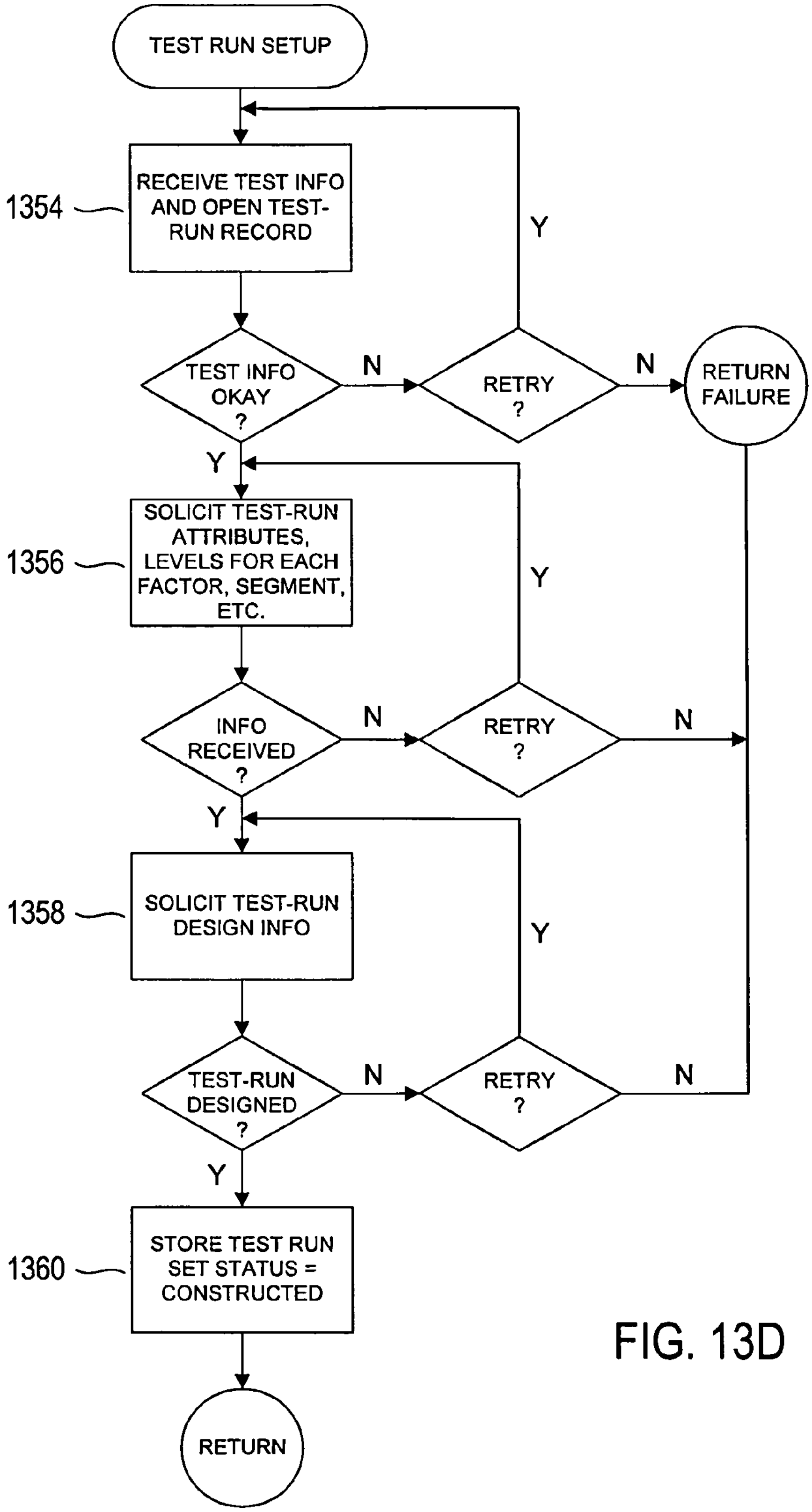

FIG. 13D provides a control-flow diagram for the routine "test run setup" called in step 1314 of FIG. 13A. In step 1354, the testing service receives information about a next test run and opens a test record for the test run. Step 1354 may involve multiple information exchanges with the client. It should also be noted that the client may elect to update or modify an already existing test run, in which case an already existing test-run record is accessed in step 1354. Next, in step 1356, the testing service carries out an information exchange with the client to obtain all the information that defines a test run, including various attributes, the levels for each factor, a specification of a test segment, and other such information. Once that information is received, then, in step 1358, the testing service provides various orthogonal-array-based or other test-design-based testing alternatives to the client, from which the client web server selects a particular test design. Various different orthogonal-array-based test designs or other types of test designs may be associated with different advantages and disadvantages, and selection of an orthogonal-array-based test or other test design may involve consideration of a number of different trade-offs, including potential length of the test run, computational requirements on the testing service, and many other such factors. Finally, in step 1360, the testing service prepares and stores a test-run record and, in addition, sets the test-run status to "constructed."

Figure 13E:
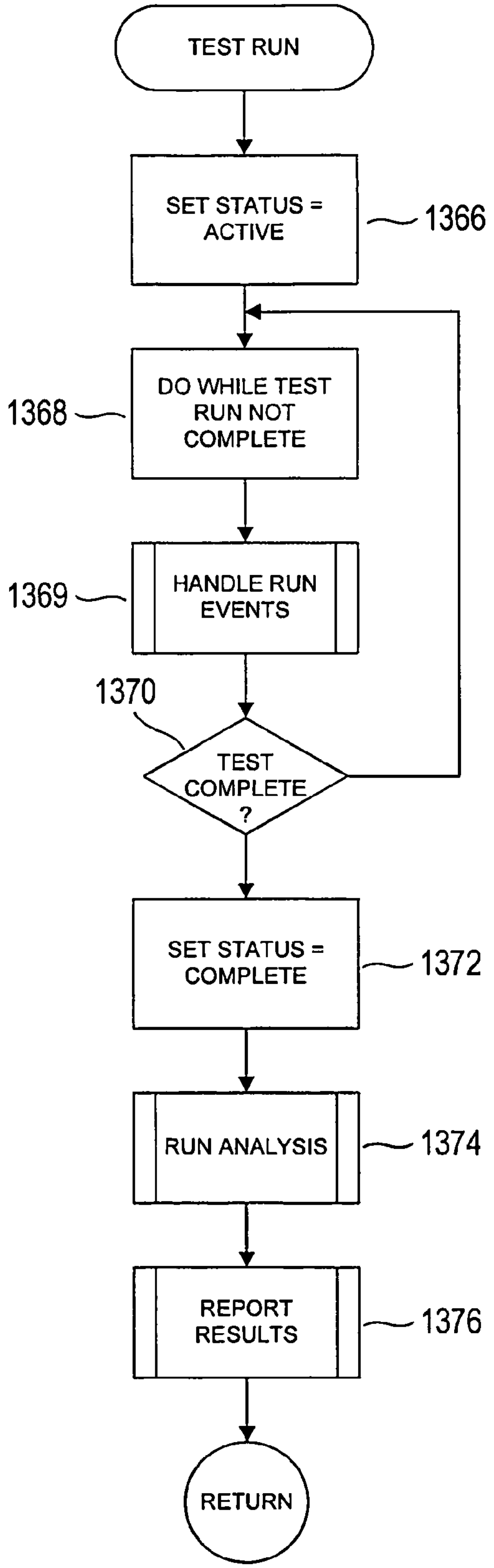

FIG. 13E provides a control-flow diagram for the routine "test run," called in step 1322 of FIG. 13A. In step 1366, the testing service sets the status of the test run to "active." Then, in a continuous loop comprising steps 1368-1370, the testing service continues to handle test-run events, primarily information exchanges with test subjects' computers invoked by execution of script-library routines by users' browsers, until the test is complete, as determined in step 1370. In general, a test run continues until sufficient data has been collected to provide statistically meaningful results. Once a test run is completed, the testing service sets the status of the test run to "complete," in step 1372, and then may undertake analysis of the test results and reporting of results of the analysis, in steps 1374 and 1376. As briefly discussed, above, results may also be reported to a client during the test run, through the web-site interface.

Figure 13F:
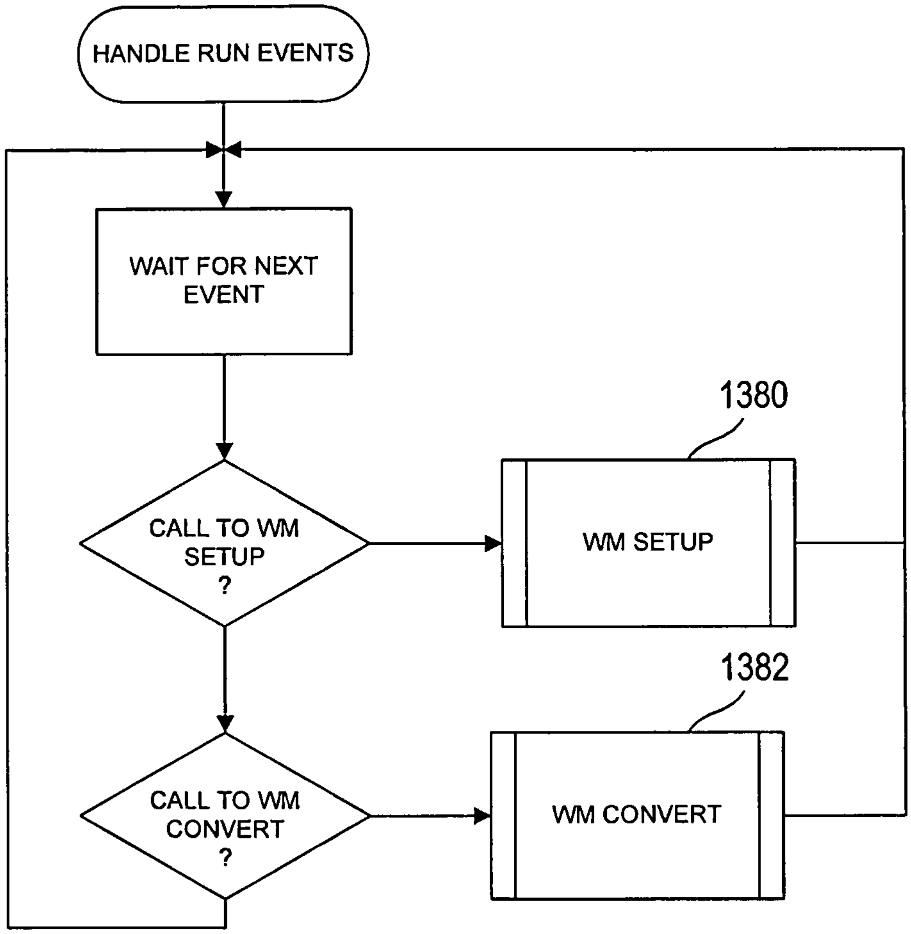

FIG. 13F is a control-flow diagram of the routine "handle run events" called in step 1369 of FIG. 13E. This routine is a simple event handler, in which messages sent from user computers as a result of calls to the script-library routine "WM.setup" by user browsers are handled by a call to the routine "wmsetup," in step 1380, and messages sent from user computers as a result of calls to the script-library routine "WM.convert" by user browsers are handled by a call to the routine "wm convert," in step 1382. Note that the script-library routines "WM.setup" and "WM.convert" are called by a browser running on the user computer, and those script routines, in turn, call routines that initiate an information transmission with the testing service.

Figure 13G:
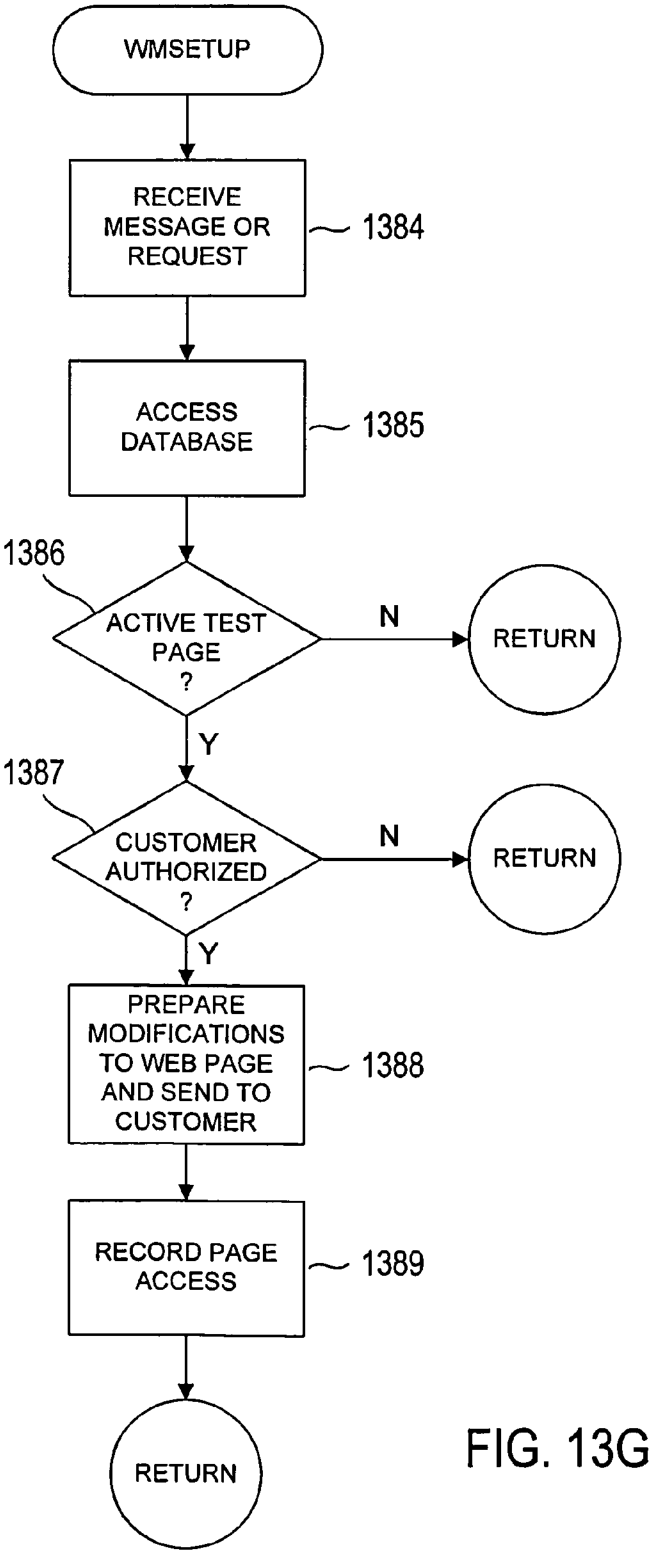

FIG. 13G provides a control-flow diagram of the routine "wmsetup" called in step 1380 of FIG. 13F. In step 1384, the testing service routine receives a message, for request, from a user computer as a result of execution, by a user's browser, of the script-library routine "WM.setup." In step 1385, the testing service uses a URL for the web page being processed to access the database or databases maintained by the testing service in order to determine whether or not the call to WM.setup represents a page-access event or a conversion event, the type of test being run, whether or not the web page is an active test page and the user computer is a valid and active test subject, and other such information. When the test page that included a call to "WM.setup," which, in turn, generated the message or request received in step 1384, is an active test page, as determined in step 1386 by the testing service, and when the user computer is an authorized test subject, as determined in step 1387, then, in step 1388, the testing service then in the case that the call to WM.setup represents a landing-page-access event, prepares the DOM modifications needed to generate an experiment for display on the user computer and transmits those modifications to the user computer. Finally, in step 1389, the testing services records either a landing-page-access event by the user computer or a conversion event, depending on the web page. Note that, in the case that the page from which the call to "WM.setup" was made is not an active test page, or in the case that the user computer is not an active and authorized test subject, the routine "wmsetup" simply returns. In other words, there is almost no performance penalty and no perturbation to the client's web server in the case that a user accesses an inactive test page or in the case that non-test-subject users access test pages. Steps 1384 and 1385 may include one or more information exchanges between the user computer and testing service.

Figure 13H:
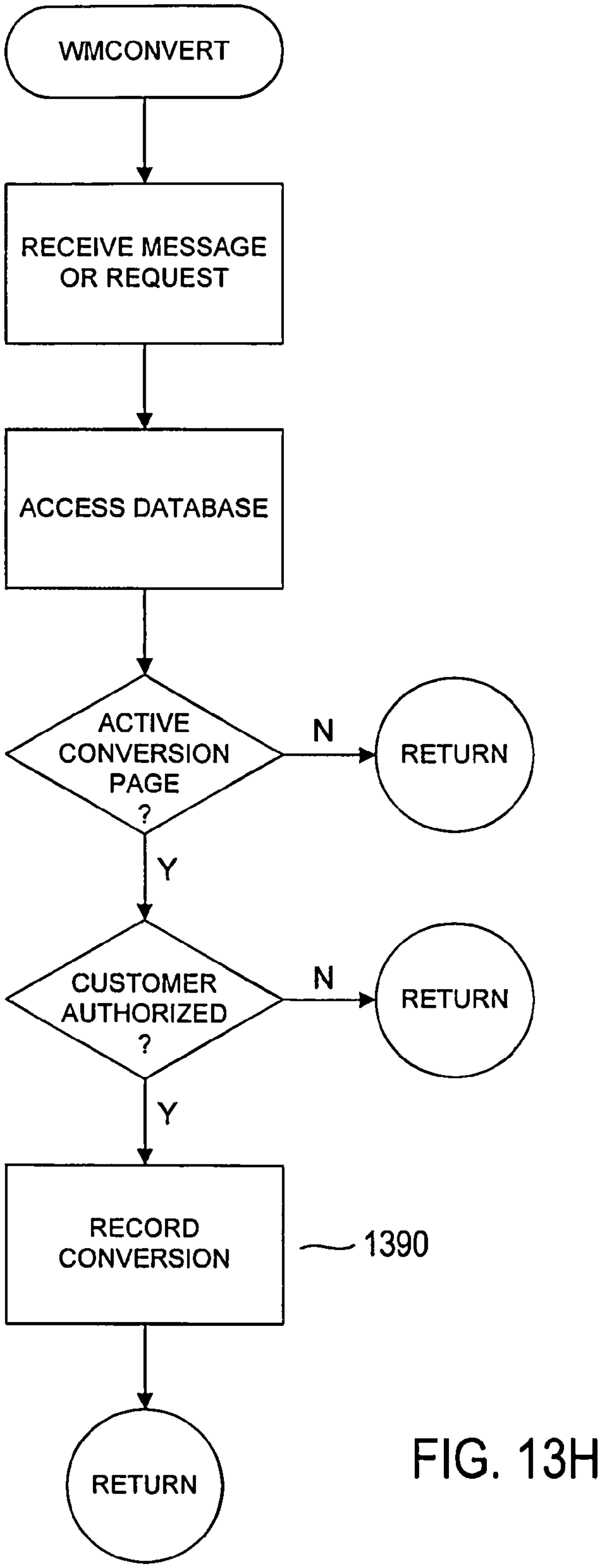

FIG. 13H is a control-flow diagram for the routine "wmconvert" called in step 1382 of FIG. 13F. This routine is similar to the routine "wmsetup," described with reference to FIG. 13G. The primary difference is that this routine is only called for a conversion event, which is recorded, in step 1390, as conversion event in a testing-service database.

The routine "trial run," called in step 1318 of FIG. 13A, is similar to the routine test-run, discussed above, with the exception that a trial-run status may be set for the test run during a trial run. The routine "trial run" is not further discussed. The routine "status," called in step 1326, returns status information with respect to test runs and other information about tests, test runs, and clients. Implementation of this routine is strongly dependent on the particular database organizations used by the testing service and on the particular web-site interface provided to clients, and is not further discussed.

FIG. 14 shows the HTML modifications used to virtually incorporate a testing service. The HTML code, previously shown in FIG. 3, includes first statement 1402 that directs a browser to download the script-routine library and a second statement 1404 that calls a script-library entry point "WM.setup" that results in sending a message or request to the testing service to indicate a landing-page-access event or page-access-conversion event. A page that includes a displayed object, activation of which is defined to be a conversion even, is similarly modified to include a call to the library routine "WM.convert." By merely adding two statements to an HTML file, or three in the case that the page corresponds both to a landing-page-access event and to a conversion event, the HTML file becomes a potential test web page, and the testing service is virtually incorporated into the client web server. Again, the statements used to modify landing-access-event-associated web pages are identical for all such web pages, as is the statement that is used to modify display-objects associated with conversion events. A client can easily write a script or other program, or use a content-management-system programming interface to introduce these identical statements into web pages. FIG. 15 provides an exemplary script library downloaded service.

Consider the problem of designing an experiment in which the effects of four different variables, or factors, are desired to be ascertained. As one example, a web page provided by a web site for marketing a particular product may include a number of different images, text features, and data-input features, including pictures of the product, textural descriptions of the product, product-order-initiation buttons, and other such features. The web site provider may wish to optimize the web page by considering four factors, or variables, and systematically altering the web-page features corresponding to the four variables in order to determine how the variables, or factors, affect the overall efficiency or effectiveness of the web page. The systematic variation of the four factors represents an experiment design. In this situation, the web-site provider may wish to systematically alter the web page, with respect to the four factors, to display, for each factor, one of three possible variations. For example, there may be three different product images, three different text captions for the product images, three different product-description paragraphs, and three different product-ordering-initiation buttons or other user-input features. The features may differ in content, form, size, color, or in any other manner that changes the appearance of the features to viewers of the web page.

Figure 16:
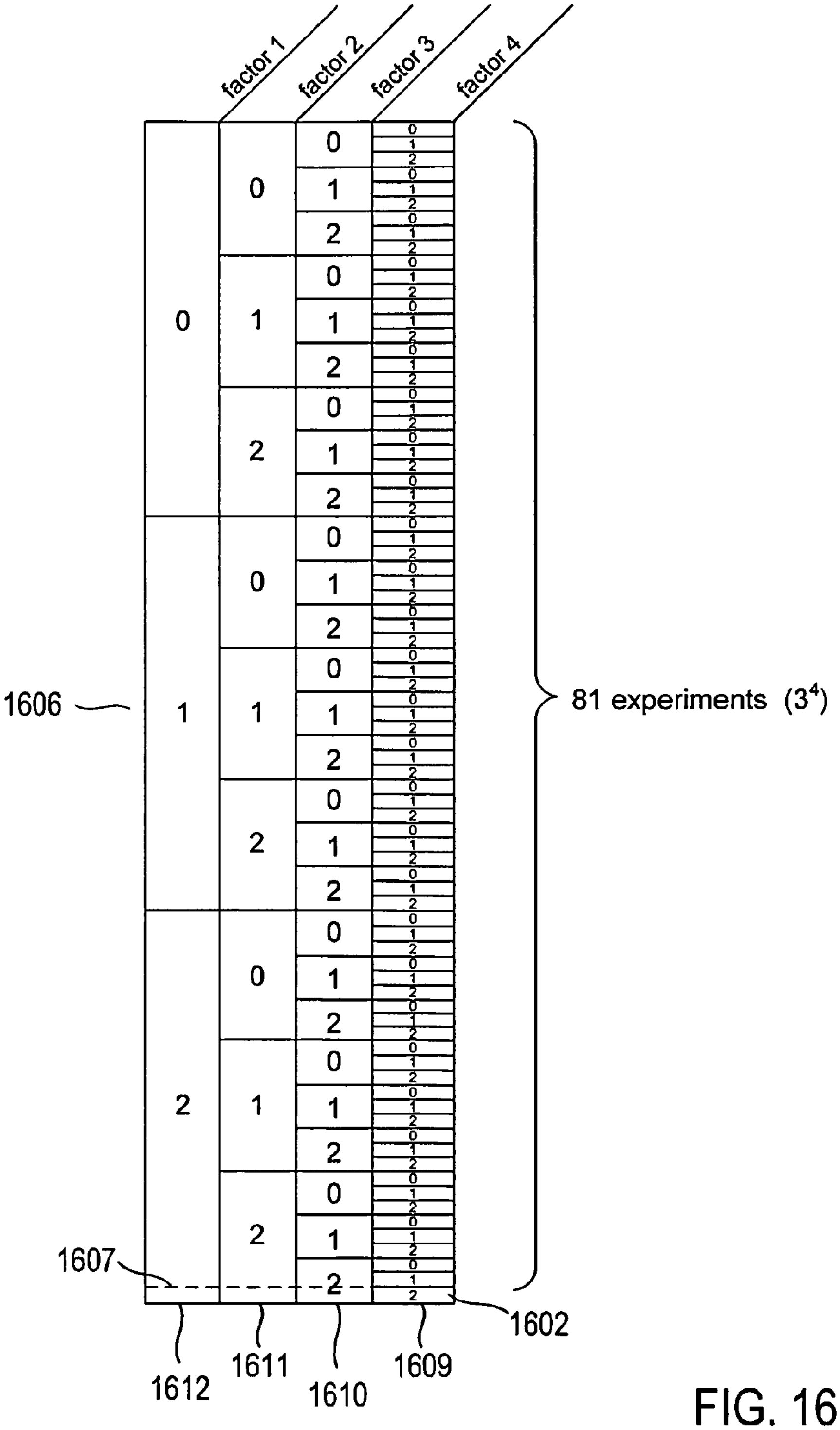
FIG. 16 illustrates a full combinatorial experimental design for a four-factor experiment.

One way in which to design an experiment to test the effects of the four factors is to carry out an exhaustive, combinatorial experiment in which each of all possible combinations of the three different variations for each factor are tested, over a period of time. FIG. 16 illustrates a full combinatorial experimental design for a four-factor experiment. In FIG. 16, each small rectangle, such as small rectangle 1602, in the right-most column 1604 of the displayed table 1606 represents a different combination of factor values, or factor levels, which, in a full combinatorial experiment, constitutes a separate test run. For example, small rectangle 1602 indicates that the third level, where the levels for the factors are numerically designated {0,1,2}, for factor 4 is used in the test run represented by that rectangle 1602 and corresponding values for the other three factors shown in regions of the table collinear with that rectangle. The levels for the remaining factors are indicated at the same horizontal level within a table. For the final test run, which includes level 2 for factor 4, the remaining factors also have level 2, since expanding the small rectangle 1602 leftward, as indicated by dotted line 1607, overlaps regions of columns 1610-1612, representing factors 3, 2, and 1, respectively, indicated in table 1606 to have the value 2. A full combinatorial experiment comprises a total of $3^4$, or 81, separate test runs. Thus, in order to carry out the combinatorial experiment, one might either proceed sequentially, down the table, selecting values for each of the factors from each row of the table to specify each successive test run, or randomly select test runs from the table. In general, a similar or equal number of web-page displays are carried out for each of the test runs. Test run results may be measures, as one example, as the percentage of viewers, to whom a particular version of the web page is displayed, order the marketed product from the web page.

By using a full combinatorial experiment, it is possible to statistically analyze the data in order to determine the effects of all different factors, considered alone, on the experimentally-determined results of displaying the web page as well as to determine the joint effects of all possible pairs and triplets of the four factors. As one example, given that a factor 4 presents the color of a particular web-page feature, with levels 0, 1, and 2 representing the colors red, blue, and green, experimental analysis of the results obtained from a full combinatorial experiment may reveal that web-page viewers are twice as inclined to order the product displayed by the web page when the web-page feature represented by factor 4 is colored red. Additionally, the experiment may reveal that, with factor 3 representing font size for a product description included in the web page and with factor-3 levels 0, 1, 2 representing font sizes 10, 20, and 30, a small font size combined with a red-colored feature most effectively motivates viewers to order the product, while, in general, larger font sizes are more effective combined with colors other than red. Such interdependencies between factors are referred to as "factor interactions," or simply as "interactions."

While a full combinatorial experiment is easily designed, and provides complete support for subsequent statistical analysis, a full combinatorial experiment design is often infeasible. The number of test runs grows exponentially with respect to both the number of factors and the number of factor levels. In a larger, many-factor and many-factor-level version of the above example, in which a web page is systematically altered and results collected by displaying the various different variations of the web page to users, over time, a full combinatorial experiment design may require months, years, or more time for accumulating statistically meaningful result sets, and may be associated with prohibitive costs and resource expenditures. Therefore, experiment designs generally feature only a subset of the total possible test runs. For example, in the experiment-design problem discussed with reference to FIG. 16, above, a practical experiment design may use only ten or less of the possible 81 test runs for an experiment that tests four different 3-level factors.

Orthogonal arrays have been developed for experiment design to systematically select, as an experiment design, a subset of all possible test runs for a particular number of factors and levels. The subset is selected to provide results that can be efficiently, robustly, and reliably analyzed to determine the independent effects of factors as well as specified interdependencies between factors, or interactions. FIG. 2 illustrates an orthogonal array that can be used as the experiment design for the above-discussed four 3-level factor experiment, a full combinatorial experiment design for which is shown in FIG. 16. In FIG. 2, the orthogonal array 202 is a 9×4 matrix, or two-dimensional array, in which each of the rows represents a test run, each of the columns represents a factor, and the numbers in each cell of the matrix represent a particular level, or value, for a particular factor within a particular test run. For example, in orthogonal array 202, the first row 204 represents a test run in which the level, or value, for all four factors is 0. Again, factors are variables in the experiment, and the levels are numeric representations of different values that a factor may have. In pure orthogonal arrays, all factors have the same number of levels. In mixed orthogonal arrays, the number of levels associated with factors may vary.

Figure 17:
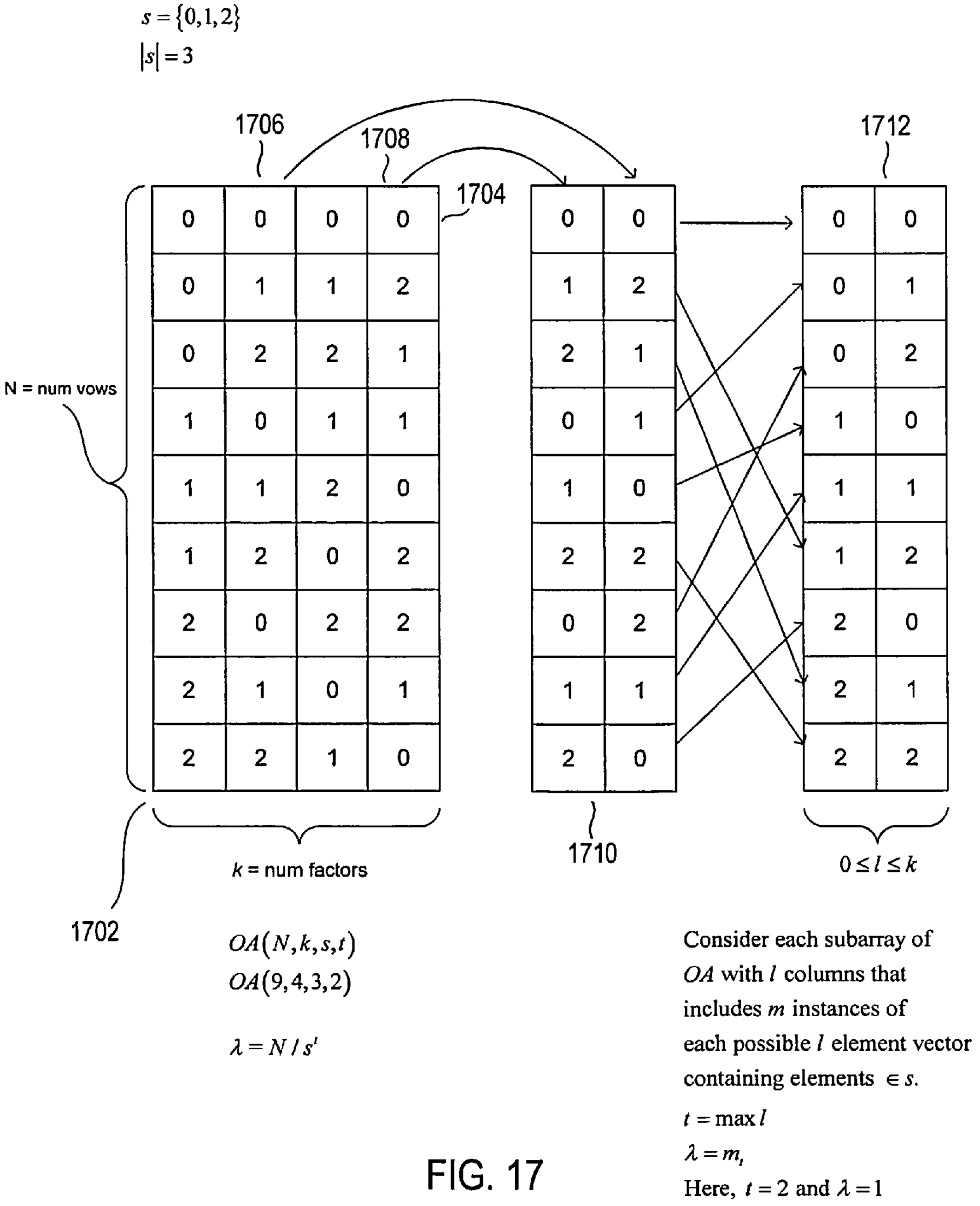
FIG. 17 illustrates an orthogonal array that can be used as the experiment design for the above-discussed four 3-level factor experiment, a full combinatorial experiment design for which is shown in FIG. 1.

Orthogonal arrays have a number of interesting properties. FIG. 17 illustrates one of these properties. In general, in an orthogonal array, there is an integer t that specifies a maximum number of columns that can be selected from the array such that a sub-array containing only the selected columns includes a fixed number of all possible t-tuples. For example, in FIG. 17, by selecting columns 2 1706 and 4 1708 to form subarray 1710, and permuting the rows of the subarray to produce the ordered subarray 1712, it can be observed that each possible two-element tuple, or vector, for three levels is represented as a row in the ordered subarray 1712. Any two columns selected from the orthogonal array include all possible two-tuples. The value of t may range from 1 up to k, the total number of columns in the orthogonal array.

An orthogonal array can be represented using various different notations. In one notation, the orthogonal array is represented as:

$$OA(N,k,s,t)$$

where N=number of rows;
k=number of columns;
s=number of levels;
t=maximum number of columns that can be selected to form a subarray containing all possible t-vectors as rows.

There is an additional parameter λ, referred to as the index, which indicates how many copies of each possible t-tuple are contained in a t-column subarray of the orthogonal array. In the example of FIG. 17, λ=1, since the ordered subarray 1712 contains a single copy of each possible 2-tuple. The parameter λ can be derived from the other parameters by:

$$\lambda = N/s\sqrt[t]{b^2-4ac}$$

It should also be noted that the subarrays with numbers of columns {1, . . . , t−1} also have the above-described property of the subarrays with t columns.

Figure 18:
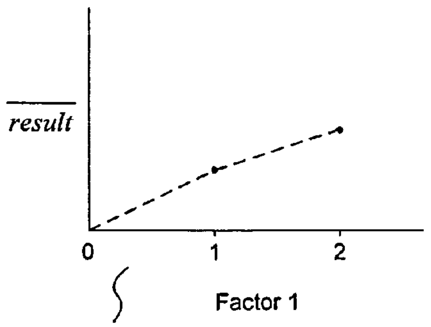
FIG. 18 illustrates analysis of experimental results produced by an orthogonal-array experiment design.

The above-described property of orthogonal arrays provides advantages in experiment design. Orthogonal arrays are balanced, in that, in the experiment design, each level occurs an equal number of times for each factor. Although an orthogonal-array-based experiment design does not provide all possible test runs, the test runs that are provided by the orthogonal array are well balanced, so that the independent effects of each factor can be readily determined. FIG. 3 illustrates analysis of experimental results produced by an orthogonal-array experiment design. FIG. 18 shows the same orthogonal array 1702 shown in FIG. 2. Consider a determination, from the test runs specified by the orthogonal array, of the effect of factor 1. Notice that, in the first three rows of the orthogonal array, factor 1 has level "0" 1802. In the next three rows, factor 1 has level "1" 1803. In the final three rows of the orthogonal table, factor 1 has level "2" 1804. Thus, the three-row blocks 1802-1804 represent three subsets of the orthogonal array in which the level of factor 1 is constant. Note also that, in each of these three subsets, or blocks, all possible levels of the remaining three features each occurs once. Thus, as shown in FIG. 18, an average result for the experiment when the first factor has level "0" can be computed by averaging the results obtained from the test runs in the first block 1802, as shown in expression 1806. Similarly, average results for factor 1 having level 1 and factor 1 having level 2 are obtained by averaging the results obtained from test runs in the second and third blocks, as shown in expressions 1807 and 1808, respectively. A plot of these averaged results versus the level of factor 1 1810 may reveal a trend or dependency of the results on the value, or level, of factor 1. In similar fashion, the rows of the orthogonal array can be permuted to generate similar sub-blocks for each of the other factors. Thus, the effect of each factor can be obtained by similar averaging operations.

Figure 19:
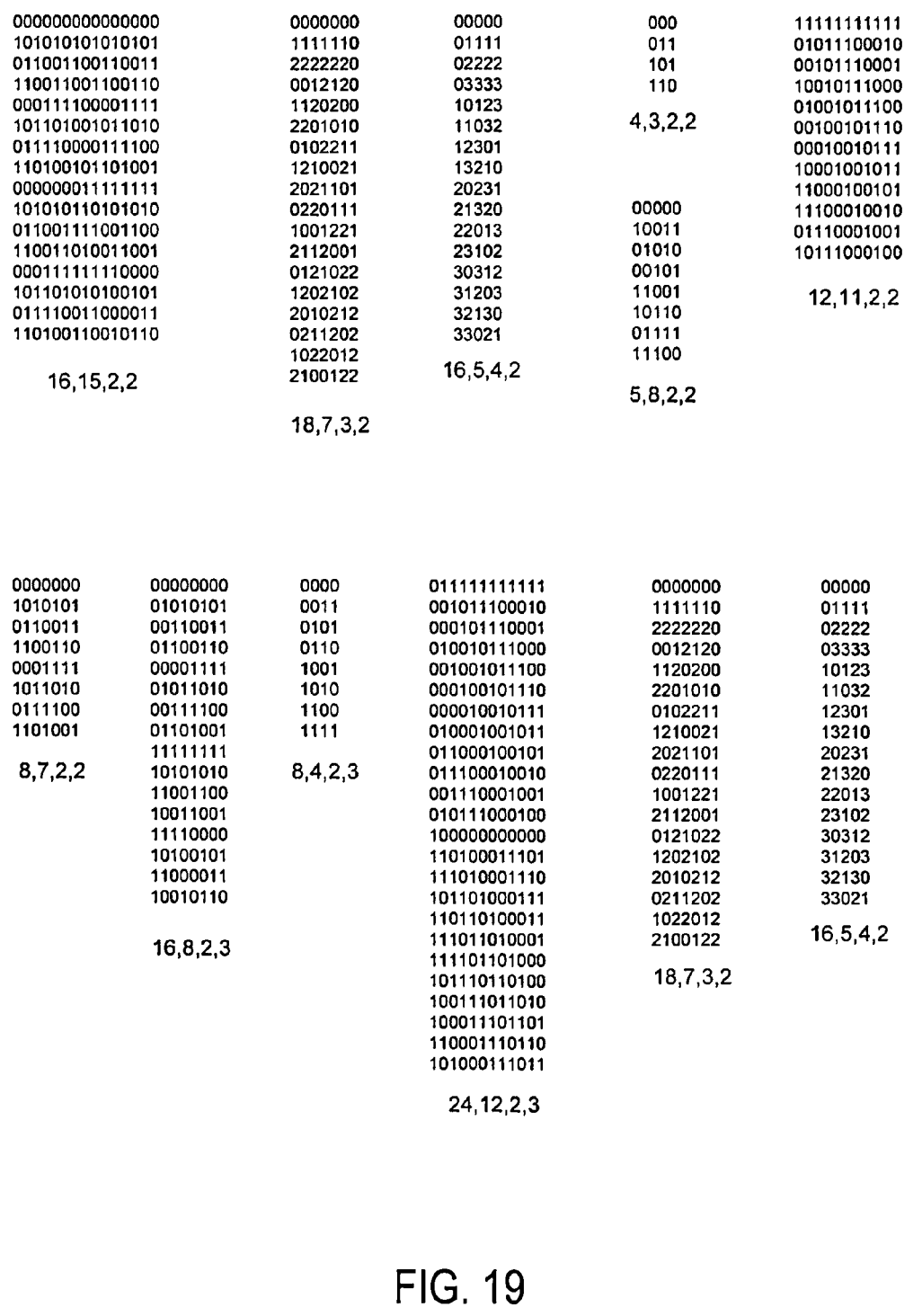

There are a large number of known orthogonal arrays. FIG. 19 illustrates a number of orthogonal arrays.

Figure 20:
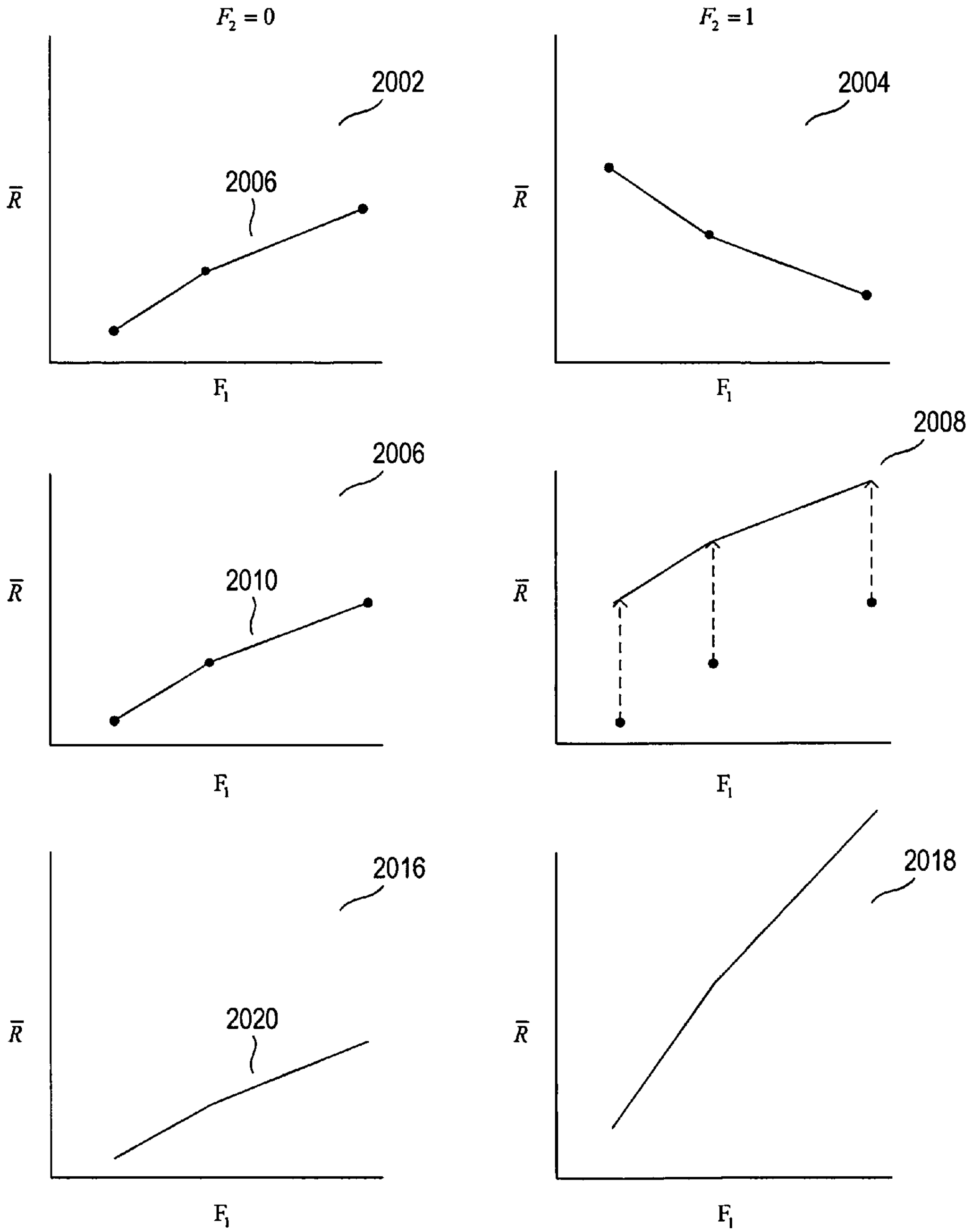
FIG. 20 illustrates the concept of interaction between experiment-design factors.

FIG. 20 illustrates the concept of interaction between experiment-design factors. In FIG. 5, each pair of graphs, such as graphs 2002 and 2004, represent a plot of the averaged results for a first factor, as shown in graph 1810 in FIG. 18, when a second factor is held to one of two constant levels. For example, graph 2002 shows a plot of the averaged results for various values of factor F1 when factor F2 is held to the level "0" and all other factors vary according to the experimental design represented by an orthogonal array. Graph 2004 plots the averaged results for the first factor when the second factor is held to level "1" while other factors vary. In the case shown in graphs 2002 and 2004, the slope of the curve 2006 changes from positive to negative when the level of the second factor changes from "0" to "1." In the second pair of graphs 2006 and 2008, the slope of the plotted curve 2010 does not change when the level of the second factor changes from "0" to "1," although the curve is translated upward, or shifted by a scale factor. In the third pair of graphs 2016 and 2018, the slope of the plotted curve 2020 increases when the level of factor 2 changes from "0" to "1." When the slope of the curve changes, as in the pairs of graphs 2002-2004 and 2016-2018, factors 1 and 2 are considered to be dependent, or, in other words, an interaction is present between factors 1 and 2. By contrast, when the slope of the curve does not change more than some threshold, maximum value, as in the pair of graphs 2006 and 2008, the factors are regarded as being independent. An orthogonal array can be used to determine the effects of dependencies, or interactions, between factors by assigning columns to represent the interactions. Thus, one set of columns in an experiment design may represent factors, and an additional set of columns may represent various different interactions between the factors. Assignment of factors and interactions to columns of an orthogonal array constitutes development of an experiment design from the orthogonal array.

EMBODIMENTS OF THE PRESENT INVENTION

Automated testing and evaluation of web sites, web pages, and other similar types of displayed information, as discussed above, provides a useful method and system for evaluation of the effectiveness of web pages, web sites, and other displayed information with respect to any of various goals identified by web-page, web-site, and other displayed-information providers. The methods and systems of the present invention can be employed for general evaluation of displayed information with respect to specified goals. Automated testing of displayed information is frequently employed in marketing analysis and web-site optimization to allow commercial web-site owners and administrators to evaluate and optimize web sites in order to achieve a maximum rate of purchase of products and services advertised within the web sites or, in other cases, a maximum rate of further user interaction with the web site with respect to advertised products and services, such as users requesting additional information about advertised products and services. For these purposes, automated testing is carried out for a sufficient period of time in order to make well-founded, statistically justified determinations of the most effective web-site content and organization to achieve a particular goal, frequently a conversion rate indicating the percentage or fraction of users viewing a web page who purchase an advertised item or service, request additional information about the advertised product or service, or do some additional operation that represents a desirable outcome of the web-page viewer's access of the web page.

The amount of time over which testing occurs is often an important factor in determining whether or not to embark on a particular type of test. While automated testing is generally relatively non-obtrusive, and can be carried out while a web site continues to be operable, in many cases, testing of non-optimal web-site configurations and content may represent lost sales and revenues during the time when the test is run. Therefore, providing test administrators and automated-testing users with estimated times over which a test needs to be run can greatly facilitate rational decision making with regard to embarking on automated testing for particular web sites and other displayed information. Additionally, the test administrator or automated-testing user may wish to, over the course of time during which a test is run, evaluate how much longer the test needs to be run in order to achieve a specified level of confidence in the test results. The statistical significance of test results generally increases with the sample size of the test, where the sample size, for web-site testing, is the number of web-site viewers who access a displayed web page under test. The time needed to achieve statistical confidence for a particular test is therefore generally related to a base-level access rate, or page-view rate for the web page under test. However, as discussed below, obtaining accurate estimates for the amount of time that a particular test needs to be run is a relatively complex process.

Figure 21:
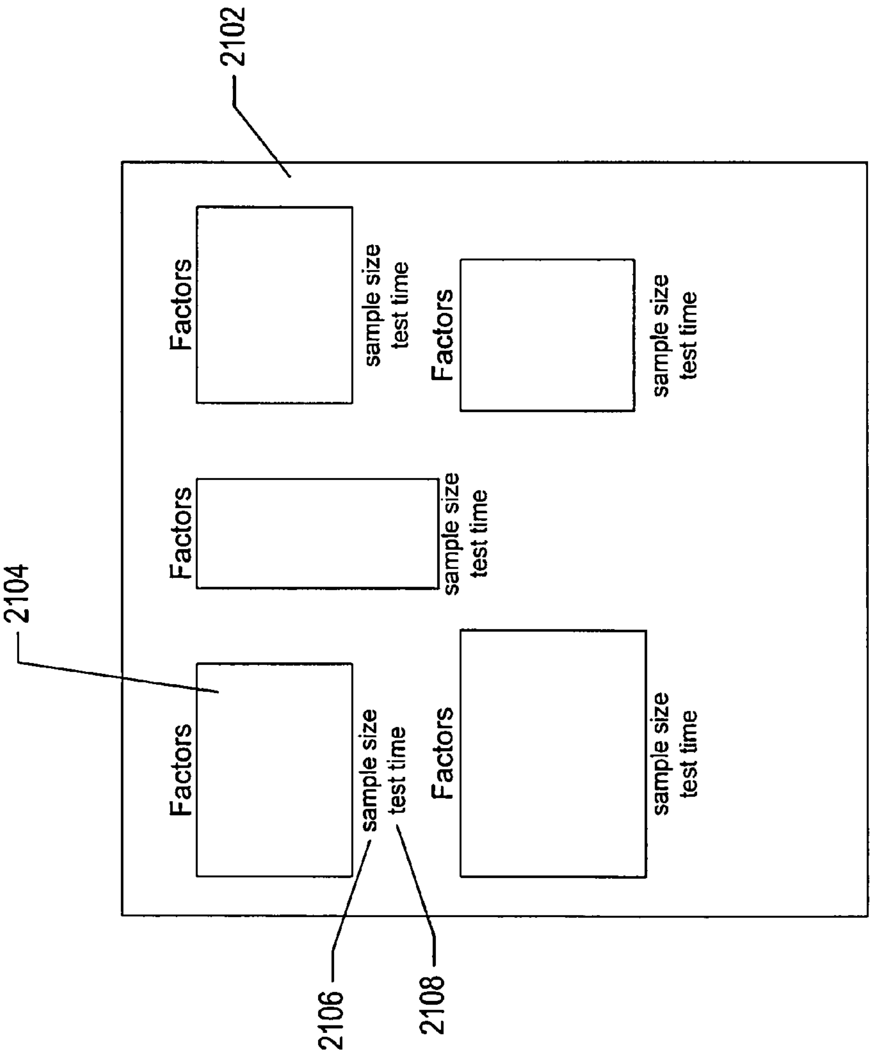
FIG. 21 illustrates a first example of the use of test run-time estimates to facilitate automated testing according to one embodiment of the present invention.

FIG. 21 illustrates a first example of the use of test run-time estimates to facilitate automated testing according to one embodiment of the present invention. In FIG. 21, an automated-testing service displays an administrative page 2102 which includes descriptions of five different tests, or candidate tests, that a test administrator can run in order to test particular features of a particular web page. As shown in FIG.

21, in addition to information concerning the number of factors, factor levels, number of experiments within the candidate-test design, and other such information, the administrative web page displays, for each candidate test, a sample size and total test time, such as displayed sample size 2106 and test time 2108 for the candidate test represented by displayed information 2104. The displayed estimated test times, in particular, provide a useful piece of information to facilitate a test administrator's selection of a particular candidate test with which to undertake automated testing of a web page.

Figure 22:
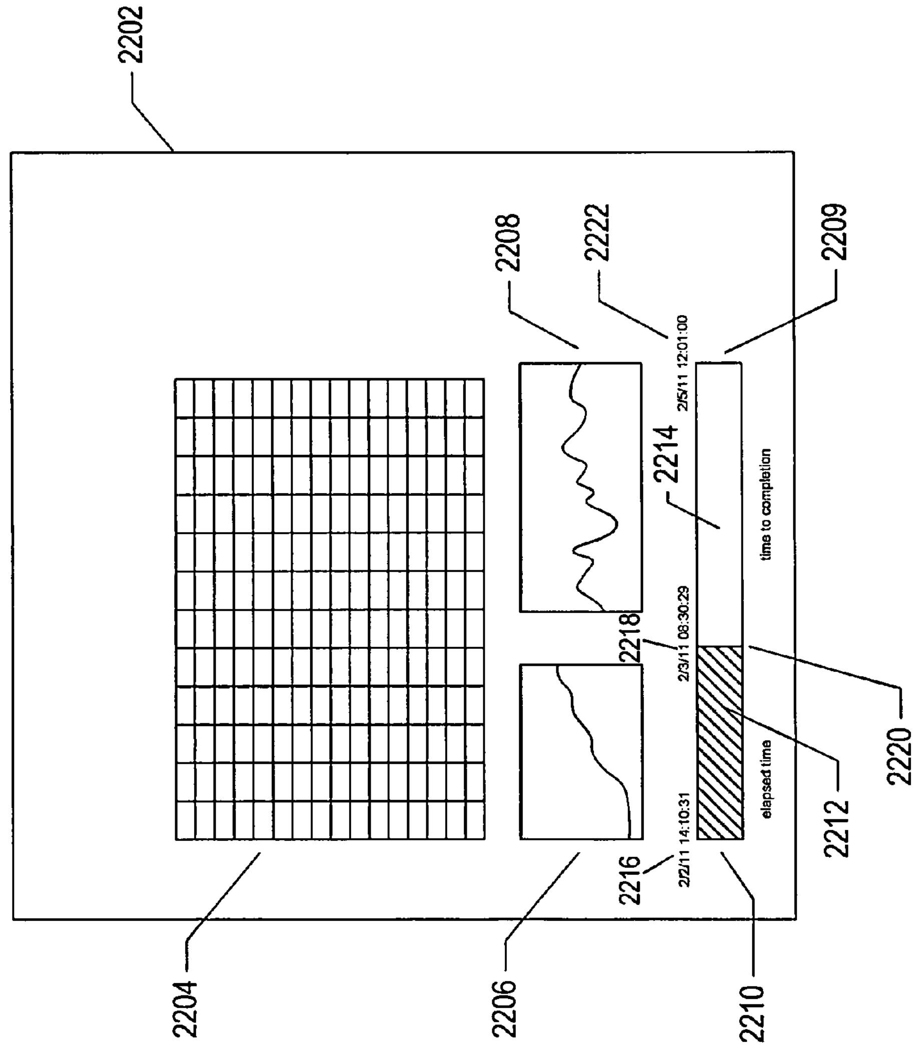
FIG. 22 shows a run-time administrative page that displays information about an on-going automated test, according to one embodiment of the present invention.

FIG. 22 shows a run-time administrative page that displays information about an on-going automated test, according to one embodiment of the present invention. The run-time administrative page 2202 may include various different types of information that is automatically and continuously updated over the course of a test for evaluation by a test administrator. This information may include cumulative conversion rates for particular experiments, factor levels, and factors 2204, continuously updated graphs of cumulative page views 2206 and other information 2208, as well as a test-progress feature 2209 that represents one embodiment of the present invention. The test-progress feature includes a horizontal, displayed bar 2210, the left-hand portion of which 2212 represents the total elapsed time over which the test has already occurred, and a right-hand portion 2214 representing the remaining time needed to complete the test according to parameters that specify a desired statistical confidence for the test. The test-progress feature may include indications of the time at which the test began 2216, indication of the current time 2218, also represented by vertical bar 2220 within the horizontal bar, and an indication of the estimated time of test completion 2222. As shown in FIG. 22, the left-hand portion of the horizontal bar may be differently colored or shaded from the right-hand portion, and the proportion of the length of the right-hand portion with respect to the length of the left-hand portion reflects the ratio of the remaining time needed for the test to the time over which the test has already run.

The test-time estimation methods, next discussed, can be employed to provide the initial test-time estimates for candidate tests, as discussed above with reference to FIG. 21, as well as to provide the time-progress feature discussed above with reference to FIG. 22. The time-progress feature may be updated continuously, at regular, fixed intervals, or at specific points within a test run, and the method, discussed below, can correspondingly be carried out continuously, at fixed points of time, or at specific points of time during the test to provide estimates of total time and remaining time for a particular automated test.

It should be noted, at this point, that while the following discussion of test-time-estimation methods employs mathematical notation and descriptions, these test-time-estimation methods are computational, in nature, and are carried out by a component of an automated testing system that represents one embodiment of the present invention. These test-time-estimation processes involve very large numbers of exceedingly tedious computations that could not possibly be carried out mentally or by hand in order to provide test-time estimates either for the administrative page discussed above with reference to FIG. 21, the run-time administrative page discussed above with reference to FIG. 22, or for any other user display or user interface provided by an automated testing service to users of the automated testing service. It should also be pointed out that the following mathematic notation does not represent abstract mathematical principles or laws of nature, but instead precisely describes computational processes, carried out by computer instructions stored within a computer-readable medium within a computer system, that determine test times and remaining test times for an automated testing system.

In order to facilitate discussion of the test-time-estimation methods, FIG. 23 shows an example of an automated-test plan or design. The test design can be represented as a two-dimensional array 2302, with columns associated with factors, such as column 2304 associated with a first factor, $F_1$ 2306, and rows associated with particular experiments conducted as part of the overall test, such as row 2310 associated with a first experiment $Y_1$ 2312. Each cell in the two-dimensional array represents the factor level incorporated by a particular factor within a particular experiment. As one example, cell 2316 in the test design shown in FIG. 23 indicates that, in experiment $Y_6$, the third factor, factor $F_3$, is incorporated or displayed at level "1." As discussed above, test designs are, in certain embodiments of the present invention, based on orthogonal arrays or modified orthogonal arrays.

In certain test-time-estimation procedures that represent embodiments of the present invention, the observed conversion rates for particular experiments, $y_i$, are modeled as the sum of a number of feature-level effects and first-order feature-level-interaction effects, as follows:

$$
\begin{aligned}
y_i = \beta_0 &+ \beta_1^0 x_1^0(i) + \beta_1^1 x_1^1(i) + \ldots\ \beta_1^{L_1} x_1^{L_1}(i) + \\
&\beta_2^0 x_2^0(i) + \beta_2^1 x_2^1(i) + \ldots\ \beta_2^{L_2} x_2^{L_2}(i) + \\
&\vdots \\
&\beta_M^0 x_M^0(i) + \beta_M^1 x_M^1(i) + \ldots\ \beta_M^{L_M} x_M^{L_M}(i) + \\
&\beta_{1,2}^{0,0} x_{1,2}^{0,0}(i) + \beta_{1,2}^{0,1} x_{1,2}^{0,1}(i) + \ldots\ \beta_{1,2}^{L_1,L_2} + \\
&\beta_{1,3}^{0,0} x_{1,3}^{0,0}(i) + \beta_{1,3}^{0,1} x_{1,3}^{0,1}(i) + \ldots\ \beta_{1,3}^{L_1,L_3} + \\
&\vdots \\
&\beta_{M-1,M}^{0,0} x_{M-1,M}^{0,0}(i) + \\
&\beta_{M-1,M}^{0,1} x_{M-1,M}^{0,1}(i) + \ldots\ \beta_{M-1,M}^{L_{M-1},L_M} x_{M-1,M}^{L_{M-1},L_M}(i)
\end{aligned}
$$

where $\beta_0$ is a constant effect;

$\beta_i^j$ is an effect for level j of factor i;

$\beta_{i,k}^{j,l}$ is a first-order interaction between level j of factor i and level l of factor k;

M is the number of factors, and $L_i$ is one less than the number of levels for factor i.

Analysis of the observed conversion rates $y_i$ for each of the experiments $Y_i$ run during the course of an automated test provides estimates of the feature-level effects $\beta_m$ and first-order feature-level-interaction effects $\beta_{l,m}^{p,q}$ for each of the feature levels and first-order feature-level interactions within the test design. The test is run until these feature-level effects and first-order feature-level-interaction effects can be estimated at a predefined, statistical significance level.

Figure 24:
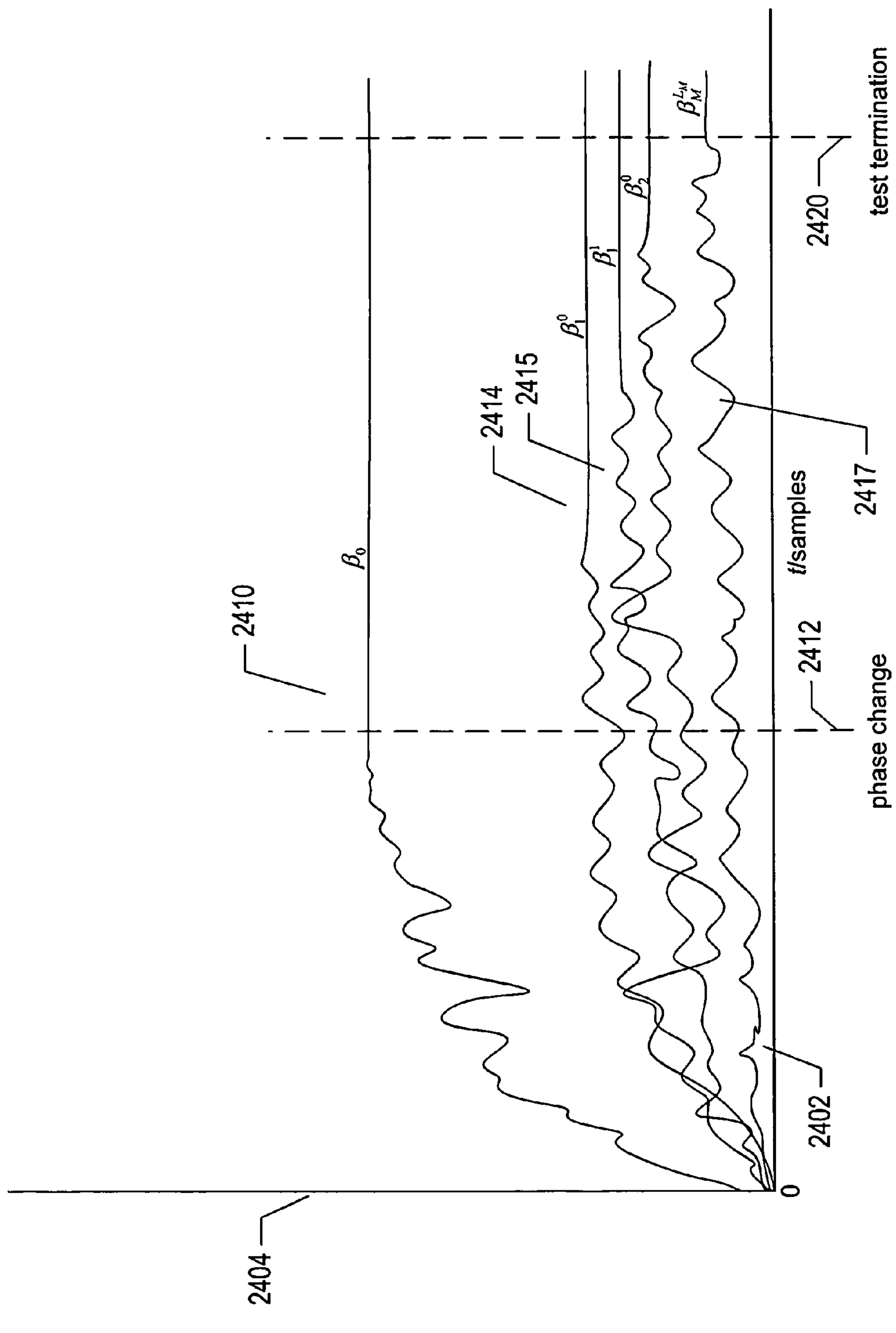
FIG. 24 illustrates, in general, feature-level and first-order feature-level-interaction effect estimation over the course of automated testing based on a particular test design, according to one embodiment of the present invention.

FIG. 24 illustrates, in general, feature-level and first-order feature-level-interaction effect estimation over the course of automated testing based on a particular test design, according to one embodiment of the present invention. In FIG. 24, the horizontal axis 2402 represents time and/or the sample size for the test, which, as discussed above, are related. The vertical axis 2404 represents the magnitudes of feature-level effects and first-order feature-level-interaction effects. The constants $\beta_0$ in the above-described model represents a mean conversion rate for the web page under test that does not depend on the displayed levels of the particular features that are varied in the test. It is a kind of constant or static conversion rate for the web page, as a whole. FIG. 24 is a graph of the estimated value of $\beta_0$ at various times during the test run, using the data available at those times. The functional relationship between the estimated value of $\beta_0$ and the time for which the test has been run is shown as curve 2410. Initially, prior to the point in time represented by dashed, vertical line 2412, referred to as the "phase change" for the test, the estimated value of $\beta_0$ may vary significantly with respect to time or the number of page views. However, after the "phase change" time 2412, the value of $\beta_0$ stabilizes, and exhibits low variation over the remainder of the test. Similar behavior is expected for each of the feature-level effects and first-order feature-level-interaction effects, such as a few of the feature-level effects and first-order feature-level-interaction effects for which estimated values are plotted with respect to time as curves 2414-2417 in FIG. 24. In general, the test completes, at the test-termination time represented by a second vertical dashed line 2420 in FIG. 24, when the estimated values of the feature-level effects and first-order feature-level-interaction effects have all stabilized, and exhibit sufficiently low variability, over time, to satisfy the predefined statistical confidence desired for the test. Thus, the test-time-estimation methods discussed below are directed to estimating test-termination time 2420 for automated tests which determine feature-level and first-order feature-level-interaction effects.

The goals of web-site and web-page optimization tests include: (1) detecting the best (optimal) content; and (2) predicting a value of a performance measure, such as the conversion rate, when optimal content is provided through a web site. Tests are carefully designed in order to accomplish these goals by ensuring that, a sufficient sample of the data is obtained and that a relevant analysis is performed. Given an average rate of page access, run duration can be computed by first finding a data sample size necessary to achieve a pre-specified level of statistical significance and by then dividing the sample size by the average rate of page access. Thus, a test-duration computation is reduced to the problem of a sample size computation.

Sample-size computation, according to embodiments of the present invention, is related to the computation of the factor-level effects and first-order factor-level interactions. In other words, the problem can be formulated as follows: one would like to compute a sample size, a number of visitors that are shown a each factor level for the factor, such that the estimates of the factor-level effects satisfy a pre-specified significance level. Notice that various test-duration-estimation input parameters, including a control conversion rate and expected lift, are given in terms of experiments rather than factor levels. The first step in the procedure is to computationally transform the input parameters from the experiment domain to the factor-levels domain. This step is defined in a following subsection entitled "Factorial Transformation."

Two methods for sample-size computation are described, below, according to two different embodiments of the present invention. The first method is based on Dunnett's procedure and can be applied to a test and test design with an arbitrary number of factor levels. This first method is described in a following subsection entitled "Sample Size Computation Using Dunnett's Procedure." The second method is based on the idea of statistical monitoring of clinical trials. This method can be used for cases in which there are only two factor levels to compare. This second method is described in a following section entitled "Sample Size Computation Using Stochastic Curtailment."

It should be again noted that the method embodiments of the present invention are necessarily implemented by software programs that are executed on electronic computers. Hand calculation would not be possible for providing real-time estimates through automated testing services, and would generally be infeasible even for non-real-time applications for all but the most trivial cases. The method embodiments of the current invention are designed for incorporation into automated services, and therefore are necessarily components of computational systems.

Factorial Transformation

In this subsection, a transformation that allows for converting data given for experiments to factor-level-effects data is described. A statistical model used for computation of factor-level effects and influences is first presented, following which a model used for the factorial transformation is described. The basic quantities to be estimated are the factor-level effects. An example statistical model used for estimation of factor-level effects is provided, below, for a specific two-factor test:

$$y_i=\beta_0+\beta_1{}^0x_1{}^0(i)+\beta_1{}^1x_1{}^1(i)+\beta_1{}^2x_1{}^2(i)+\beta_2{}^0x_2{}^0(i)+\beta_2{}^1x_2{}^1(i)+\beta_{12}{}^{00}x_{12}{}^{00}(i)+\ldots+\beta_{12}{}^{21}x_{12}{}^{21}(i)+\epsilon_i \quad \text{(Equation 0.1)}$$

where $y_i$ is a conversion rate for the i-the experiment (an observable), $\beta_0$ is the overall mean, discussed above, $\beta_i^j$, i=1, 2 are factor level effects, $\beta_{ij}{}^{l_il_j}$, i=1, 2 are first-order factor-level interactions effects, and $\epsilon_i$ is an error that includes the variability in the data and the modeling error. The notation x(i) is used to indicate that the value of x is "1" when the x-containing term is included in the sum of terms for conversion rate $y_i$, and the value of x is "0" when the x-containing term is not included in the terms that provides conversion rate $y_i$. Thus, the right-hand side of the equation is a generalized list of possible candidate terms that can be included in the sum that represents conversion rate $y_i$ for experiment $Y_i$, and from this list of candidate terms, only those terms are selected for inclusion in the particular sum for conversion rate $y_i$ which the term x(i) has the value "1." It is assumed that $\epsilon_i$ are independent and identically distributed with mean zero. The quantities to be estimated are the variously subscribed βs.

Taking expectation on the both sides of Equation 1, Equation 1.1 can be written in matrix form as follows:

$$\hat{y}=X\beta \quad \text{(Equation 0.2)}$$

where $\hat{y}$ is a vector of expectations of $y_i$, X is a matrix of $x_k^j(i)$, and β is a vector of $\beta_k^j$ effect values. For example, for the two-factor test, with a full-factorial test design including six experiments $Y_1, Y_2, \ldots, Y_6$:

$$\begin{bmatrix}\hat{y}_1\\ \hat{y}_2\\ \hat{y}_3\\ \hat{y}_4\\ \hat{y}_5\\ \hat{y}_6\end{bmatrix}=\begin{bmatrix}1&1&0&0&1&0&1&0&0&0&0&0\\ 1&1&0&0&0&1&0&1&0&0&0&0\\ 1&0&1&0&1&0&0&0&1&0&0&0\\ 1&0&1&0&0&1&0&0&0&1&0&0\\ 1&0&0&1&1&0&0&0&0&0&1&0\\ 1&0&0&1&0&1&0&0&0&0&0&1\end{bmatrix}\begin{bmatrix}\beta_0\\ \beta_1^0\\ \beta_1^1\\ \beta_1^2\\ \beta_2^0\\ \beta_2^1\\ \beta_{12}^{00}\\ \beta_{12}^{01}\\ \beta_{12}^{10}\\ \beta_{12}^{11}\\ \beta_{12}^{20}\\ \beta_{12}^{21}\end{bmatrix} \quad \text{(Equation 0.3)}$$

In addition, the following model constraints need to be satisfied:

$$\beta_1^0 + \beta_1^1 + \beta_1^2 = 0$$

$$\beta_2^0 + \beta_2^1 = 0$$

$$\beta_{12}^{00} + \beta_{12}^{10} + \beta_{12}^{20} = 0$$

$$\beta_{12}^{01} + \beta_{12}^{11} + \beta_{12}^{21} = 0$$

$$\beta_{12}^{00} + \beta_{12}^{01} = 0$$

$$\beta_{12}^{10} + \beta_{12}^{11} = 0$$

$$\beta_{12}^{20} + \beta_{12}^{21} = 0 \qquad \text{(Equation 0.4)}$$

Essentially, these constraints indicate that all of the different factor-level effects, for a given factor, sum to 0, which is another way to state, or constrain the model, to consider the factor-level effects as perturbations with respect to the overall mean effect $\beta_0$. A similar constraint on the first-order feature-level-interaction effects are also provided in the above equations. Equations (0.2) and (0.4) are written together in matrix form as:

$$\begin{bmatrix} \hat{y} \\ 0 \end{bmatrix} = \begin{bmatrix} X \\ H \end{bmatrix} \beta \qquad \text{(Equation 0.5)}$$

where 0 is a vector of zeros of the appropriate dimension and H is the constraint matrix:

$$H = \begin{bmatrix} 0 & 1 & 1 & 1 & 0 & 0 & 0 & 0 & 0 & 0 & 0 & 0 \\ 0 & 0 & 0 & 0 & 1 & 1 & 0 & 0 & 0 & 0 & 0 & 0 \\ 0 & 0 & 0 & 0 & 0 & 0 & 1 & 0 & 1 & 0 & 1 & 0 \\ 0 & 0 & 0 & 0 & 0 & 0 & 0 & 1 & 0 & 1 & 0 & 1 \\ 0 & 0 & 0 & 0 & 0 & 0 & 1 & 1 & 0 & 0 & 0 & 0 \\ 0 & 0 & 0 & 0 & 0 & 0 & 0 & 0 & 1 & 1 & 0 & 0 \\ 0 & 0 & 0 & 0 & 0 & 0 & 0 & 0 & 0 & 0 & 1 & 1 \end{bmatrix} \qquad \text{(Equation 0.6)}$$

It can be shown that, for the full factorial model (0.3), the columns of matrix X are not linearly independent, and the least square estimates of $\beta$ are therefore not well defined. However, the columns of matrix $$\tilde{X} = \begin{bmatrix} X \\ H \end{bmatrix}$$

are linearly independent and the least square estimates $$\hat{\beta} = (\tilde{X}^T \tilde{X})^{-1} \tilde{X}^T y \qquad \text{(Equation 0.7)}$$

are well-defined. Denote by $X^F$ an X matrix that corresponds to a fractional factorial case which includes fewer rows corresponding to fewer experiments. $X^F$ can be constructed from the X matrix for the full factorial case by eliminating some of the rows according to a design matrix. In this case, the least square estimates are computed as follows:

$$\hat{\beta} = \frac{N}{N^F} (\tilde{X}^T \tilde{X})^{-1} (X^F)^T y \qquad \text{(Equation 0.8)}$$

where $N^F$ is the number of rows in the fractional factorial design and N is the number of rows in the full factorial design.

Methods for computing estimated values of level effects $\beta$ are next derived. The estimated values of the level effects $\beta$ are computed by making assumptions with regard to the values of the conversion rates $y_i$, when the conversion rates have not been, or may not have been completely, observed. In other words, the methods address the problem of determining a needed sample size for a test before the test has begun or at different points in time while the test is being run, but before the test has terminated, with test termination determined as discussed above with reference to FIG. 24. The control experiment is generally the first experiment in which all factor levels are 0, as shown in the first row of the experiment design illustrated in FIG. 23. Often, a conversion rate for the control experiment is known prior to embarking on a test, since the web page corresponding to the control experiment is a web page that has been used over some period of time prior to embarking on testing. Optimal level effects, $\beta$s, are the level-effect values corresponding to a set of factor levels that produce an optimal conversion rate. Three different methods are employed, depending on three different sets of assumptions. The first method is derived based on the assumption that the conversion rates of all experiments but control and optimal are equal. The second method is based on the assumption that the difference between optimal and control level effects are equal for all factors. Finally, the third method is based on the assumption that conversion rates $y_i$ of all experiments other than control and optimal are equal and all control effects $\beta^c$ are equal. Analysis of the available data showed that the second method is the most realistic.

Denote the variables of the control experiment by subscript or superscript c. Suppose that the conversion rate for the control experiment, $y_c$, is given. Then equation (0.1) for the control experiment becomes, $$y_c = \beta_0 + \beta_1^c + \beta_2^c + \beta_{12}^c \qquad \text{(Equation 0.9)}$$

where $\beta_{ij}^c$ denote the factor-level-interaction effect for the control experiment and the overall mean $\beta_0$ is $$\beta_0 = \frac{1}{N} \sum_{i=1}^{N} y_i \qquad \text{(Equation 0.10)}$$

where N is the number of experiments. Now, assume that a lift $\rho$ of an optimal experiment with respect to the control experiment is also given such that the conversion rate of the optimal experiment $y_o$ is given by, $$y_o = y_c + \rho y_c \qquad \text{(Equation 0.11)}$$

Define $\delta_1^{exp} = y_o - y_c$ to be a difference between the optimal and control experiment. From (0.11), $$\delta_1^{exp} = \rho y_c \qquad \text{(Equation 0.12)}$$

Also define $\delta_2^{exp} = y_i - y_c$ to be a difference between any other non-optimal experiment and the control experiment. By definition, $|\delta_2^{exp}| \leq |\delta_1^{exp}|$ and the deltas have the same sign. Assuming that the ratio $$0 \leq r = \frac{\delta_2^{exp}}{\delta_1^{exp}} \leq 1$$

is given, $\delta_2^{exp}$ can be computed from $\delta_1^{exp}$.

Method 1: In order to compute the overall mean $\beta_0$, notice that, from (0.10) and the assumption that conversion rates of all other experiments, $y_i$, with the exception of the control and the optimal experiments, are equal, the following identity holds:

$$\beta_0 = \frac{1}{N}(y_c + y_o + (N-2)y_i) \quad \text{(Equation 0.13)}$$

In some cases, when additional run-time data is available, it is preferable to use the overall mean (0.10) as an input instead of the conversion rate of the control experiment. In such cases, identity (0.13) gives a convenient way of computing the conversion rate of the control experiment, $$y_c = \frac{N\beta_0}{N + \rho(1 + (N-2)r)} \quad \text{(Equation 0.14)}$$

where N is the number of experiments, and ρ and r are defined above. Now, in order to compute the factor-level effects, transformation (0.8) is used with $y_c$, $y_o$, and $y_i$ estimated using the procedure described above.

Method 2: Alternatively, if one does not assume that that conversion rates of all other experiments, $y_i$, with the exception of the control and the optimal experiments, are equal, but instead assumes that the difference between optimal and control levels for all effects are equal, the second method is employed. Define $\delta_1^i$, i=1, . . . , k to be a difference between the control and optimal levels of effect i. Notice that $$\begin{aligned} y_o - y_c &= (\beta_1^c + \delta_1^1 + \ldots + \beta_k^c + \delta_1^k) - (\beta_1^c + \ldots + \beta_k^c) \\ &= \delta_1^1 + \ldots + \delta_1^k \end{aligned} \quad \text{(Equation 0.15)}$$

Assume that $\delta_1^1 = \ldots = \delta_1^k \equiv \delta_1$. Then from (0.12) and (0.15): (Equation 0.16)

Assume also that if an effect has more than 2 levels, these levels are distributed uniformly in the interval $[\beta_i^c, \beta_i^c + \delta_1^i]$. Define $\delta_2^i$, i=1, . . . , k to be a difference between the levels. Notice that $$\delta_2^i = \frac{\delta_1^i}{lev_i - 1} \quad \text{(Equation 0.17)}$$

where $lev_i$ is the number of levels of effect i. Then constraints (0.4) can be written as, $$\beta_i^c + (\beta_i^c + \delta_1^i) + (\beta_i^c + \delta_2^i) + \ldots + (\beta_i^c + (lev_i - 2)\delta_2^i) = 0 \quad \text{(Equation 0.18)}$$

From(0.18), $$\beta_i^c = -\frac{(1 + 2 + \ldots + (lev_i - 2) + (lev_i - 1))\delta_2^i}{lev_i} \quad \text{(Equation 0.19)}$$

Also, an approximation to the overall mean is computed as follows:

$$\beta_0 = \frac{y_c + y_o}{2} = \frac{y_c + (1+\rho)y_c}{2} = \frac{2+\rho}{2}y_c \quad \text{(Equation 0.20)}$$

If the overall mean is specified as input, then, from (0.20):

$$y_c = \frac{2\beta_0}{2+\rho} \quad \text{(Equation 0.21)}$$

Method 2a: A variation of method 2. Suppose it is not assumed that the difference between optimal and control levels for all effects are equal, but instead a lift η is defined to represent a lift from the control level to the next level such that the difference $\delta_2^i = \eta(\beta_0 + \beta_i^c)$ between these levels is discernible. Then the following equation is the consequence of (0.18):

$$\beta_i^c((1 + \ldots + (lev_i - 1))\eta + lev_i) = -(1 + \ldots + (lev_i - 1))\eta\beta_0 \quad \text{(Equation 0.22)}$$

Simplify (0.22) to get, $$\left(1 + \frac{lev_i - 1}{2}\eta\right)\beta_i^c = -\frac{lev_i - 1}{2}\eta\beta_0 \quad \text{(Equation 0.23)}$$

where we used the identity $$1 + \ldots + (lev_i - 1) = \frac{lev_i(lev_i - 1)}{2}.$$

From (0.23), $$\beta_i^c = -\frac{(lev_i - 1)\eta}{2 + (lev_i - 1)\eta}\beta_0 \quad \text{(Equation 0.24)}$$

Method 3: Alternatively, assume that conversion rates $y_i$ of all experiments other than control and optimal are equal and all control effects are equal, $\beta_1^c = \beta_2^c = \beta_{12}^c = \beta^c$. Then (0.9) becomes, $$y_c = \beta_0 + k\beta^c \quad \text{(Equation 0.25)}$$

where k is the number of the factor level effects and the overall mean $\beta_0$ is computed from (0.10). In this case, the control factor-level effect influence is computed from (0.25), $$\beta^c = \frac{y_c - \beta_0}{k} \quad \text{(Equation 0.26)}$$

Thus, by the three above-discussed methods, one can estimate the values of the factor-level effects βs from either a known control conversion rate $Y_0$ and an expected lift from an optimal experiment and/or from an estimated median effect $\beta_0$. This allows the factor-level effects β to be estimated along any point of the timeline shown in FIG. 24 representing any point before launching of a test or during a test run. Of course, once a reliable estimate for $\beta_0$ can be obtained, from the phase-change point onward, then the reliability and accuracy of the estimates of the factor-level effects β significantly increase, with time, as more page-view results are collected. Again, the purpose of the above-described methods for estimating the factor-level effects is to allow a sample size to be computed before undertaking a test and during a test run, from which the remaining amount of time needed to achieve a particular significance level can be determined, by methods next discussed.

Sample Size Computation Using Dunnett's Procedure

Dunnett's selection procedure allows for selection of the best factor level effects (for specific factors) compared to the control experiment. As a side effect, the procedure provides a way for computing needed sample sizes. More precisely, let $\pi_1, \ldots, \pi_k$ be Bernoulli populations with the unknown parameters (probabilities of success) $\theta_i$, i=1, . . . , k. Let also $\pi_0$ be a Bernoulli (control) population with an unknown parameter $\theta_0$, a probability of success of the control population. Assume that $\theta_1 \leq \ldots \leq \theta_k$. The goal is to select the population $\pi_k$ if $\theta_0 < \theta_k$ or the population $\pi_0$ otherwise. Then $\theta_i$, i=1, . . . , k are the conversion rates of levels i=1, . . . , k, and $\theta_0$ is the conversion rate of the control level. Suppose the following constants are specified before the test, $\delta_0$, $\delta_1$, and $\delta_2$, $-\infty<\delta_0<\delta_1$, $0<\delta_1, \delta_2<\infty$, and the probability values $P_0$ and $P_1$, $2^{-k}<P_0<1$ and $(1-2^{-k})<P_1<1$, such that $$\text{Prob(select } \pi_0) \geq P_0 \text{ when } \theta_k \leq \theta_0+\delta_0$$

$$\text{Prob(select } \pi_k) \geq P_1 \text{ when } \theta_k \geq \theta_0+\delta_1 \text{ and } \theta_k \geq \theta_{k-1}+\delta_2 \quad \text{(Equation 0.27)}$$

The probabilities $P_0$ and $P_1$ correspond to estimates of the significance level, or probability of rejecting the Null hypothesis when the Null hypothesis is true, and the power, or the probability of accepting the Null hypothesis when the Null hypothesis is false, that, in turn, correspond to a specified significance level desired for the test. In this context, the levels with conversion rates $\theta_i \geq \theta_0+\delta_1$ are considered to be large enough to be distinguished from control, and the constant $\delta_2$ represents the minimum difference between the best and the second best conversion rates.

Dunnett's Selection Procedure:

1. Take $n_0$ observations from the control and $n_i$ observations from the i-th, i=1, . . . , k level population.
2. Let $X_{ij}$, i=0, . . . , k, j=1, . . . , $n_i$, $$X_{ij} = \begin{cases} 1 & \text{if conversion} \\ 0 & \text{otherwise} \end{cases},$$

be observations.

3. Compute the observed conversion rates $$\hat{\theta}_0 = \frac{1}{n_0}\sum_{j=1}^{n_0} X_{0j},\ \hat{\theta}_i = \frac{1}{n_i}\sum_{j=1}^{n_i} X_{ij},$$

i=1, . . . , k.

4. Define $z_0=\arcsin(\sqrt{\hat{\theta}_0})$ and $z_i=\arcsin(\sqrt{\hat{\theta}_i})$, i=1, . . . , k.
5. If $$z_i < z_0 + c\sqrt{\sigma^2\left(\frac{1}{n_i}+\frac{1}{n_0}\right)},$$

i=1, . . . , k, select the control level. Otherwise, select the level corresponding to the largest value of $$\frac{z_i - z_0}{\sqrt{\left(\frac{1}{n_i}+\frac{1}{n_0}\right)}}$$

i=1, . . . , k.

Remarks:

1. Notice that the Normal approximation to the binomial probability distribution has been used. This approximation is appropriate for large sample sizes. In addition, the arcsin variance-stabilizing transformation (3) has been applied. The resulting variance $\sigma^2$ is given by $$\sigma^2 = \frac{0.25}{n_p}(4).$$

2. Frequently, $n_i$ are chosen to be equal, $n_1=n_2=\ldots=n_k$, and $n_0$ is chosen to satisfy $n_0=Rn_i$, where the ratio $$R = \frac{n_0}{n_i}$$

is specified by the user. Then the total sample size is $n_t=n_0+kn_i$.

3. The parameters $n_0$, $n_1$, i=1, . . . k, and c are chosen so that the probability requirements (0.27) are guaranteed. It can be shown (1) that the parameters satisfy the following identities:

$$c = h + \frac{\delta_0^*}{\sqrt{\sigma^2\left(\frac{1}{n_i}+\frac{1}{n_0}\right)}} \quad \text{(Equation 0.28)}$$

where h is the solution to, $$\int_{-\infty}^{\infty}\prod_{i=1}^{k}\Phi\left(z\sqrt{\frac{n_i}{n_0}}+h\sqrt{1+\frac{n_i}{n_0}}\right)\phi(z)dz = P_0 \quad \text{(Equation 0.29)}$$

and where $\Phi(\bullet)$ and $\phi(\bullet)$ are the cumulative distribution function and the probability density function, respectively, of the standard normal distribution.

And, using definitions of Remark 2, $$\int_{-\infty}^{\infty}\Phi^m\left(z+\frac{\delta_2^*\sqrt{n_i}}{\sqrt{\sigma^2(R+k)}}\right)\Phi^{k-m-1}\left(z+\frac{\delta_1^*\sqrt{n_i}}{\sqrt{\sigma^2(R+k)}}\right)\Phi\left(\sqrt{R}\left(z-h\sqrt{1+\frac{1}{R}}+\frac{\delta_1^*\sqrt{n_i}}{\sqrt{\sigma^2(R+k)}}\left(1-\frac{\delta_0^*}{\delta_1^*}\right)\right)\right)\phi(z)dz = P_1 \quad \text{(Equation 0.30)}$$

where parameter m, $(0 \leq m \leq k-1)$, gives the number of levels, other than the optimal one, that can achieve the value $\theta_k-\delta^*_2$, the remaining k−m−1 levels are assumed to have values equal to the control conversion rate $\theta_0$.

4. The definitions of the constants $\delta^*_0$, $\delta^*_1$, and $\delta^*_2$ that appear in (0.28), (0.29), and (0.30) in terms of the constants $\delta_0$, $\delta_1$, and $\delta_2$ are as follows $$\delta^*_0=\arcsin(\sqrt{\theta_0+\delta_0})-\arcsin(\sqrt{\theta_0})$$

$$\delta^*_1=\arcsin(\sqrt{\theta_0+\delta_1})-\arcsin(\sqrt{\theta_0})$$

$$\delta^*_2=\arcsin(\sqrt{\theta_k})-\arcsin(\sqrt{\theta_k-\delta_0}) \quad \text{(Equation 0.31)}$$

Remark 3 and identities (0.28), (0.29), and (0.30) can be used to construct a procedure for computing sample sizes at the beginning of the test (fixed sample sizes).

Thus, in order to determine the required sample size to obtain a predefined statistical confidence or significance, the identity shown as equation 0.30, above, is used to solve for the sample size $n_t$, which provides a sample size sufficiently large to reject the Null hypothesis, namely that the conversion rates attributable to differences in the levels of a particular factor are too small to conclude, with a predefined statistical significance or power, that selecting one level from among the factor levels for the factor will produce a higher conversion rate. This method produces an estimated sample size $n_t$ for each factor.

Dunnett's Fixed Sample Sizes Computation Procedure:

1. Specify the control level conversion rate $\theta_0$, constants $\delta_0$, $\delta_1$, and $\delta_2$, size ratio R, and the probabilities $P_0$ and $P_1$.
2. Compute $\delta^*_0$, $\delta^*_1$, and $\delta^*_2$ according to (0.31).
3. Compute c from (0.28) such that h satisfies (0.29).
4. Find $n_t$ so that (0.30) is satisfied.

Remarks:

1. The control level conversion rate $\theta_0$ is either known from baseline tests or is given based on the design considerations.
2. Constant $\delta_0$ is usually set to 0.
3. Constant $\delta_1$ is computed from (0.16), and then constant $\delta_2$ is computed from the ratio $$\frac{\delta_2}{\delta_1}.$$

4. Variable h in (0.29) is the equicoordinate $100P_0$ % point of multivariate normal distribution with correlation matrix with entries $$\frac{1}{1+R}, \; i \neq j.$$

Then, if $P_0$ is given, h can be computed using R function qmvnorm, h=qmvnorm(P0, sigma=cov.mtx, tail="lower"); alternatively if a significance level $\alpha$ is given, h=qnorm(1−$\alpha$).

5. In order to accomplish step 4 of the procedure, a root finding algorithm (e.g. secant method) can be used to find roots of the non-linear equation $F(n_t)=0$ where $F(n_t)=P_1-\mathrm{Int}(\,)$, where Int( ) is the integral in the left-hand side of (0.30). Then the $n_t$ found in this way is a lower bound on an integer $n_t$ such that $n_t=n_0+kn_i$, $n_0=Rn_i$ with $n_0$ and $n_t$ integers. An integer-programming problem can then be formulated as:

min $x_1+kx_2$ subject to $$x_1+kx_2 \geq n_t$$

$$x_1-Rx_2=0,$$

where $x_1$ and $x_2$ are integers.

Sample Size Computation Using Stochastic Curtailment

The procedure described in this section can be applied to two-level effects only. It is based on the idea of stochastic curtailment. This procedure allows for computation of the fixed-size sample size per level and for updates of the sample size based on the data obtained during the test. In general, per-arm sample size formula is $$n = \frac{\left(z_{\alpha/2}\sqrt{2p(1-p)} + z_\beta\sqrt{p_c(1-p_c)+p_1(1-p_1)}\right)^2}{(p_c-p_1)^2} \quad \text{(Equation 0.32)}$$

where $p_c$ is the conversion rate of the control level, $p_1$ is the conversion rate of level 1, $$p = \frac{p_c+p_1}{2}$$

is the pooled conversion rate, $z_{\alpha/2}$ is the two sided $(1-\alpha)$ standard normal quintile, and $z_\beta$ is the one-sided $(1-\beta)$ standard normal quintile. It is assumed that the significance level $\alpha$, power $(1-\beta)$, and the lift $$\gamma = \frac{p_1}{p_c},$$

are given. Suppose now that, after some testing, a new set of data is obtained that gives the pooled conversion rate (computed as a ratio between all conversion and all pageviews) $\hat{p}$. Continue to assume that the lift is $\gamma$. The following system of equations for $p_c$ and $p_1$ is the solved:

$$\frac{p_c+p_1}{2} = \hat{p} \qquad \frac{p_1}{p_c} = \gamma \quad \text{(Equation 0.33)}$$

The solution to (0.33) is:

$$p_c = \frac{2\hat{p}}{2+\gamma} \qquad p_1 = (1+\gamma)p_c \quad \text{(Equation 0.34)}$$

The values obtained from (0.34) in (0.32) can be used to compute the per-arm sample sizes.

Computation of Sample Size per Experiment

In order to compute corresponding duration of the test, sample sizes are computed per experiment and then, based on these computed sample sizes, for the overall test, and then that number is divided by the average page views per day to generate an expected duration time. More specifically, the following procedure accomplishes this task.

Run Duration Computation Procedure

Given:

1. A number of experiments, N.
2. A list of sample sizes per factor, s.eff.
3. A list of number of appearances of effect levels, num.appear.
4. An average page views per time increment, ave.pageviews.

Step 1. Compute a sample size per experiment by considering the sample sizes per effect levels relevant to the experiment, as follows, $$s.\mathrm{exp} = \max\left(\mathrm{round}\left(\frac{s.eff}{\mathrm{num.appear}}\right)\right) \quad \text{(Equation 0.35)}$$

Step 2. Compute a sample size for the overall test as follows $$s.\mathrm{test} = N \times s.\mathrm{exp} \quad \text{(Equation 0.36)}$$

where s.exp is computed from (0.35).

Step 3. Choose an appropriate sample size for the overall test, s.test. The options are: min, max, median.

Step 4. Compute test duration as follows, $$\text{test.duration} = \frac{s.\text{test}}{\text{ave.}\,pageviews}$$

Although the present invention has been described in terms of particular embodiments, it is not intended that the invention be limited to these embodiments. Modifications will be apparent to those skilled in the art. For example, test-duration estimation procedures can be implemented in many different ways, by varying any of the many implementation parameters, including programming language, control structures, data structures, modular organization, operating-system platform, and other such implementation variables.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for estimating, by a test-service computer system, a duration of an automated web-page test that is displayed on a computer display device, the method comprising:

finding, by the test-service computer system, a sample size for the web-page test necessary to achieve a pre-specified level of statistical significance by computing a sample size such that estimates of factor-level effects satisfy a specified significance level; and dividing, by the test-service computer system, the sample size by an average rate of page access.

2. The method of claim 1 wherein finding, by the test-service computer system, the sample size further comprises:

computing a sample size per experiment; and computing the sample size for the web-page test and the product of the sample size per experiment and the number of experiments.

3. The method of claim 2 wherein computing a sample size per experiment further comprises:

from a list of sample sizes per factor, determining a maximum rounded value from a set of values generated by dividing each sample size per factor by a number of appearances of effect levels.

4. The method of claim 1 further including:

displaying the duration of an automated web-page test within an administrative web page displayed to a test-service-computer-system user prior to selection of the automated web-page test for execution and prior to execution of the automated web-page test; and displaying the duration of an automated web-page test within a run-time administrative web page displayed to a test-service-computer-system user during execution of the automated web-page test.

5. A testing service comprising:

a computer system; and a testing-service application that runs on the computer system and that displays, on a computer display screen, a run-time administrative web page that includes information related to a currently executing test and a test-progress feature that displays an indication of a remaining time needed to complete the test, the testing-service application estimating the time needed to complete the test by finding a sample size for the web-page test necessary to achieve a pre-specified level of statistical significance by computing a sample size such that estimates of factor-level effects satisfy a specified significance level, and dividing the sample size by an average rate of page access.

6. The testing service of claim 5 wherein the test information further includes cumulative conversion rates for particular experiments;

factor levels;

factors; and continuously updated graphs of cumulative page views.

7. The testing service of claim 5 wherein test-progress feature comprises:

a horizontal bar having a left-hand portion that represents a total elapsed time over which the test has already executed and having a right-hand portion that represents a remaining time needed to complete the test according to parameters that specify a desired statistical confidence for the test.

8. The testing service of claim 7 wherein the test-progress feature further comprises:

an indication of a time at which the test began;

an indication of a current time; and an indication of the estimated time of test completion.

9. The testing service of claim 5 wherein the testing-service application computes the remaining time needed to complete the test by:

modeling observed conversion rates for particular experiments, $y_i$, as the sum of a number of feature-level effects and first-order feature-level-interaction effects $$\begin{aligned} y_i = \beta_0 &+ \beta_1^0 x_1^0(i) + \beta_1^1 x_1^1(i) + \ldots\ \beta_1^{L_1} x_1^{L_1}(i) + \\ &\beta_2^0 x_2^0(i) + \beta_2^1 x_2^1(i) + \ldots\ \beta_2^{L_2} x_2^{L_2}(i) + \\ &\vdots \\ &\beta_M^0 x_M^0(i) + \beta_M^1 x_M^1(i) + \ldots\ \beta_M^{L_M} x_M^{L_M}(i) + \\ &\beta_{1,2}^{0,0} x_{1,2}^{0,0}(i) + \beta_{1,2}^{0,1} x_{1,2}^{0,1}(i) + \ldots\ \beta_{1,2}^{L_1,L_2} + \\ &\beta_{1,3}^{0,0} x_{1,3}^{0,0}(i) + \beta_{1,3}^{0,1} x_{1,3}^{0,1}(i) + \ldots\ \beta_{1,3}^{L_1,L_3} + \\ &\vdots \\ &\beta_{M-1,M}^{0,0} x_{M-1,M}^{0,0}(i) + \\ &\beta_{M-1,M}^{0,1} x_{M-1,M}^{0,1}(i) + \ldots\ \beta_{M-1,M}^{L_{M-1},L_M} x_{M-1,M}^{L_{M-1},L_M}(i) \end{aligned}$$

where $\beta_0$ is a constant effect;

$\beta_i^j$ is an effect for level j of factor i;

$B_{i,k}^{j,l}$ is a first-order interaction between level j of factor i and level l of factor k;

M is a number of factors, and $L_i$ is one less than a number of levels for factor i;

providing estimates of the feature-level effects $\beta_m$ and first-order feature-level-interaction effects $B_{l,m}^{p,q}$ for each of the feature levels and first-order feature-level interactions within the test design by analyzing observed conversion rates $y_i$ for each of the experiments $Y_i$ already run during the course of the test; and estimating the remaining time as a difference between a computed time that the estimated values of the feature-level effects and first-order feature-level-interaction effects will have all stabilized and will subsequently exhibit lower than a threshold variability and the current time.

10. The testing service of claim 5 wherein the testing-service application computes the remaining time needed to complete the test by:

computationally transforming input parameters from the experiment domain to the factor-levels domain;

computing a sample size to achieve a pre-specified level of statistical significance; and dividing the sample size by an average rate of page access.

11. The testing service of claim 10 wherein the testing-service application transforms input parameters from the experiment domain to the factor-levels domain by:

applying a statistical model for estimation of factor-level effects expressed as $$y_i=\beta_0+\beta_1^0x_1^0(i)+\beta_1^1x_1^1(i)+\beta_1^2x_1^2(i)+\beta_2^0x_2^0(i)+\beta_2^1x_2^1(i)+\beta_{12}^{00}x_{12}^{00}(i)+\dots+\beta_{12}^{21}x_{12}^{21}(i)+\epsilon_i$$

where $y_i$ is a conversion rate for the i-the experiment, $\beta_0$ is an overall mean, $\beta_i^j$, i=1, 2 are factor level effects, $\beta_{ij}^{l_i l_j}$, i=1, 2 are first-order factor-level interactions effects, and $\epsilon_i$ is an error that includes a variability in test data and a modeling error, the statistical model alternatively expressed as $$\hat{y}=X\beta$$

where $\hat{y}$ is a vector of expectations of $y_i$, X is a matrix of and $x_k^j(i)$, and β is a vector of $\beta_k^j$ effect values; and estimating the β vector of $\beta_k^j$ effect values.

12. The testing service of claim 11 wherein the testing-service application additionally determines model constraints to be satisfied, expressed as:

$$\beta_1^0+\beta_1^1+\beta_1^2=0$$

$$\beta_2^0+\beta_2^1=0$$

$$\beta_{12}^{00}+\beta_{12}^{10}+\beta_{12}^{20}=0$$

$$\beta_{12}^{01}+\beta_{12}^{11}+\beta_{12}^{21}=0$$

$$\beta_{12}^{00}+\beta_{12}^{01}=0$$

$$\beta_{12}^{10}+\beta_{12}^{11}=0$$

$$\beta_{12}^{20}+\beta_{12}^{21}=0$$

which indicate that the different factor-level effects, for a given factor, sum to 0.

13. The testing service of claim 12 wherein the testing-service application determines additional model constraints to be satisfied and incorporates the constraints and statistical model together as:

$$\begin{bmatrix} \hat{y} \\ 0 \end{bmatrix} = \begin{bmatrix} X \\ H \end{bmatrix} \beta$$

where 0 is a vector of zeros of the appropriate dimension and H is a constraint matrix.

14. The testing service of claim 13 wherein the testing-service application estimates β by a least squares process:

$$\hat{\beta}=(\tilde{X}^T\tilde{X})^{-1}\tilde{X}^Ty \qquad \text{(Equation 0.7)}$$

where columns of matrix $$\tilde{X} = \begin{bmatrix} X \\ H \end{bmatrix}.$$

15. The testing service of claim 13 wherein the testing-service application estimates β by a least squares process:

$$\hat{\beta} = \frac{N}{N^F}(\tilde{X}^T\tilde{X})^{-1}(X^F)^Ty$$

where $X^F$ is an X matrix that corresponds to a fractional factorial design which includes fewer rows corresponding to fewer experiments, $N^F$ is the number of rows in the fractional factorial design, and N is a number of rows in the full factorial design.

16. The testing service of claim 15 wherein the testing-service application computes estimated values of level effects β by one of:

assuming that the conversion rates of all experiments but control and optimal are equal;

assuming that the difference between optimal and control level effects are equal for all factors; and assuming that conversion rates $y_i$ of all experiments other than control and optimal are equal and all control effects $\beta^c$ are equal.

17. The testing service of claim 15 wherein the testing-service application computes a sample size for an experiment by one of:

Dunnett's procedure; and a stochastic curtailment method.

18. The testing service of claim 10 wherein the testing-service application computes the sample size to achieve a pre-specified level of statistical significance by:

computing a sample size per experiment; and computing the sample size for the web-page test and the product of the sample size per experiment and the number of experiments.

19. The testing service of claim 12 wherein computing a sample size per experiment further comprises:

from a list of sample sizes per factor, determining a maximum rounded value from a set of values generated by dividing each sample size per factor by a number of appearances of effect levels.

* * * * *